(12) United States Patent
Scott et al.

(10) Patent No.: US 8,746,459 B2
(45) Date of Patent: Jun. 10, 2014

(54) AUTOMATIC VIBRATORY SEPARATOR

(75) Inventors: Eric Landon Scott, Conroe, TX (US); George Edward Smith, Missouri City, TX (US); Lyndon Ray Stone, Porter, TX (US); Norman Frank Padalino, Montgomery, TX (US); Kevin Thomas McDonough, The Woodlands, TX (US); Kenneth Wayne Seyffert, Houston, TX (US); William Leo Koederitz, Cedar Park, TX (US); Mallapa Ishwarappa Guggari, Austin, TX (US); Guy Lamonte McClung, III, Rockport, TX (US)

(73) Assignee: National Oilwell Varco, L.P., Houston, TX (US)

(*) Notice: Subject to any disclaimer, the term of this patent is extended or adjusted under 35 U.S.C. 154(b) by 348 days.

(21) Appl. No.: 12/481,959

(22) Filed: Jun. 10, 2009

(65) Prior Publication Data

US 2009/0242466 A1 Oct. 1, 2009

Related U.S. Application Data

(60) Division of application No. 11/977,727, filed on Oct. 25, 2007, now abandoned, which is a division of application No. 11/096,192, filed on Mar. 31, 2005, now abandoned, which is a continuation-in-part of application No. 10/949,882, filed on Sep. 25, 2004, now Pat. No. 7,278,540, and a continuation-in-part of application No. 10/835,256, filed on Apr. 29, 2004, now Pat. No. 7,331,469, and a continuation-in-part of application No. 10/512,372, filed on Oct. 25, 2004, now Pat. No. 7,581,647, which is a continuation-in-part of application No. 10/373,216, filed on Feb. 24, 2003, now Pat. No. 6,907,375.

(60) Provisional application No. 60/424,262, filed on Nov. 6, 2002.

(30) Foreign Application Priority Data

Oct. 17, 2002 (GB) .................................. 0224158.0
Jan. 23, 2003 (GB) .................................. 0301508.8
Oct. 16, 2003 (WO) ................ PCT/GB2003/004469

(51) Int. Cl.
*B07C 5/00* (2006.01)
(52) U.S. Cl.
USPC .......................................................... 209/555
(58) Field of Classification Search
USPC .............. 209/319, 365.4, 404, 405, 412, 413, 209/552, 555
See application file for complete search history.

(56) References Cited

U.S. PATENT DOCUMENTS 2,082,513 A 6/1937 Roberts ........................... 210/76
2,089,548 A 8/1937 Frantz et al. ................... 210/389

(Continued)

FOREIGN PATENT DOCUMENTS

DE 4127929 A1 2/1993
FR 2 611 559 9/1988

(Continued)

OTHER PUBLICATIONS

Adams et al., "The Advanced Technology Linear Separator Model ATL-1000," Drexel Oilfield Services, STC 03, 18 pages (1991).

(Continued)

*Primary Examiner* — Joseph C Rodriguez
*Assistant Examiner* — Kalyanavenkateshware Kumar
(74) *Attorney, Agent, or Firm* — Amerson Law Firm, PLLC

(57) ABSTRACT

Methods for automatically controlling a vibratory separator, e.g., but not limited to a shale shaker for processing drilling fluid, the methods in certain aspects including: introducing material to a vibratory separator; sensing with sensor apparatus a state parameter indicative of operation of the vibratory separator; providing a signal indicative of a value of said state parameter to control apparatus; and, with the control apparatus, automatically controlling the vibratory separator based on the level of the state parameter. This abstract is provided to comply with the rules requiring an abstract which will allow a searcher or other reader to quickly ascertain the subject matter of the technical disclosure and is submitted with the understanding that it will not be used to interpret or limit the scope or meaning of the claims, 37 CFR 1.72(b).

20 Claims, 31 Drawing Sheets

(56) References Cited

U.S. PATENT DOCUMENTS

| | | | | |
|---|---|---|---|---|
| 2,112,784 | A | 3/1938 | McNitt | 99/105 |
| 2,418,529 | A | 4/1947 | Stern | 51/309 |
| 2,716,493 | A | 8/1955 | Hutchison | 209/269 X |
| 2,750,043 | A | 6/1956 | Thompson | 210/340 |
| 2,919,898 | A | 1/1960 | Marwil et al. | |
| 2,938,393 | A | 5/1960 | Dunn et al. | |
| 3,012,674 | A | 12/1961 | Hoppe | 209/401 |
| 3,053,379 | A | 9/1962 | Roder et al. | |
| 3,226,989 | A | 1/1966 | Robins | |
| 3,302,720 | A | 2/1967 | Brandon | 166/42 |
| 3,605,919 | A | 9/1971 | Bromell et al. | |
| 3,640,344 | A | 2/1972 | Brandon | 166/307 |
| 3,659,465 | A | 5/1972 | Oshima et al. | 74/61 |
| 3,796,299 | A * | 3/1974 | Musschoot | 198/753 |
| 3,855,380 | A | 12/1974 | Gordon et al. | 264/97 |
| 3,874,733 | A | 4/1975 | Poundstone et al. | 299/17 |
| 3,900,393 | A | 8/1975 | Wilson | 209/399 |
| 3,993,146 | A | 11/1976 | Poundstone et al. | 175/206 |
| 4,033,865 | A | 7/1977 | Derrick, Jr. | 209/275 |
| 4,038,152 | A | 7/1977 | Atkins | 201/2.5 |
| 4,082,657 | A | 4/1978 | Gage | 209/311 |
| 4,212,731 | A | 7/1980 | Wallin et al. | 209/366.5 |
| 4,222,988 | A | 9/1980 | Barthel | 422/309 |
| 4,233,181 | A | 11/1980 | Goller et al. | 252/425.3 |
| 4,411,074 | A | 10/1983 | Daly | 34/32 |
| 4,446,022 | A | 5/1984 | Harry | 210/388 |
| 4,482,459 | A | 11/1984 | Shiver | 210/639 |
| 4,526,687 | A | 7/1985 | Nugent | 210/202 |
| 4,546,783 | A | 10/1985 | Lott | 134/109 |
| 4,549,431 | A | 10/1985 | Soeiinah | 73/152.49 |
| 4,553,429 | A | 11/1985 | Evans et al. | 73/152.21 |
| 4,575,336 | A | 3/1986 | Mudd et al. | 432/72 |
| 4,606,415 | A | 8/1986 | Gray, Jr. et al. | |
| 4,624,417 | A | 11/1986 | Gangi | 241/17 |
| 4,634,535 | A | 1/1987 | Lott | 210/780 |
| 4,650,687 | A | 3/1987 | Willard et al. | 426/438 |
| 4,685,329 | A | 8/1987 | Burgess | 73/151 |
| 4,696,353 | A | 9/1987 | Elmquist et al. | 175/206 |
| 4,696,751 | A | 9/1987 | Eifling | 210/780 |
| 4,729,548 | A | 3/1988 | Sullins | 266/44 |
| 4,751,887 | A | 6/1988 | Terry et al. | 110/246 |
| 4,770,711 | A | 9/1988 | Deal, III et al. | 134/18 |
| 4,783,057 | A | 11/1988 | Sullins | 266/44 |
| 4,791,002 | A | 12/1988 | Baker et al. | 426/641 |
| 4,793,421 | A | 12/1988 | Jasinski | 175/27 |
| 4,795,552 | A | 1/1989 | Yun et al. | 209/319 |
| 4,799,987 | A | 1/1989 | Sullins | 156/425 |
| 4,807,469 | A | 2/1989 | Hall | 73/155 |
| 4,809,791 | A * | 3/1989 | Hayatdavoudi | 175/40 |
| 4,832,853 | A | 5/1989 | Shiraki et al. | 210/781 |
| 4,882,054 | A | 11/1989 | Derrick et al. | 210/389 |
| 4,889,733 | A | 12/1989 | Willard et al. | 426/438 |
| 4,889,737 | A | 12/1989 | Willard et al. | 426/550 |
| 4,895,665 | A | 1/1990 | Colelli et al. | 210/710 |
| 4,895,731 | A | 1/1990 | Baker et al. | 426/641 |
| 4,896,835 | A | 1/1990 | Fahrenholz | 241/74 |
| 4,911,834 | A | 3/1990 | Murphy | 210/167 |
| 4,915,452 | A | 4/1990 | Dibble | 299/17 |
| 4,940,535 | A | 7/1990 | Fisher et al. | 209/366.5 |
| 4,942,929 | A | 7/1990 | Malachosky et al. | 175/66 |
| 5,053,082 | A | 10/1991 | Flanigan et al. | 134/25.1 |
| 5,066,350 | A | 11/1991 | Sullins | 156/187 |
| 5,080,721 | A | 1/1992 | Flanigan et al. | 134/26 |
| 5,107,874 | A | 4/1992 | Flanigan et al. | 134/60 |
| 5,109,933 | A | 5/1992 | Jackson | 175/66 |
| 5,129,469 | A | 7/1992 | Jackson | 175/66 |
| 5,131,271 | A | 7/1992 | Haynes et al. | 73/290 |
| 5,145,256 | A | 9/1992 | Wiemers et al. | 366/336 |
| 5,156,749 | A | 10/1992 | Williams | 210/770 |
| 5,181,578 | A | 1/1993 | Lawler | 175/424 |
| 5,190,645 | A | 3/1993 | Burgess | 210/144 |
| 5,200,372 | A | 4/1993 | Kuroyama et al. | 501/96 |
| 5,221,008 | A | 6/1993 | Derrick, Jr. et al. | 209/269 |
| 5,227,057 | A | 7/1993 | Lundquist | 210/174 |
| 5,232,099 | A | 8/1993 | Maynard | 209/311 |
| 5,253,718 | A | 10/1993 | Lawler | 175/20 |
| 5,265,730 | A | 11/1993 | Norris et al. | 209/326 |
| 5,273,112 | A | 12/1993 | Schultz | 166/374 |
| 5,314,058 | A * | 5/1994 | Graham | 198/753 |
| 5,319,972 | A | 6/1994 | Oblak et al. | 73/290 |
| 5,337,966 | A | 8/1994 | Francis et al. | 241/46.06 |
| 5,385,669 | A | 1/1995 | Leone, Sr. | 210/488 |
| 5,400,376 | A | 3/1995 | Trudeau | 377/21 |
| 5,465,798 | A | 11/1995 | Edlund et al. | 175/24 |
| 5,474,142 | A | 12/1995 | Bowden | 175/27 |
| 5,488,104 | A | 1/1996 | Schulz | 536/86 |
| 5,489,204 | A | 2/1996 | Conwell et al. | 432/153 |
| 5,516,348 | A | 5/1996 | Conwell et al. | 51/309 |
| 5,534,207 | A | 7/1996 | Burrus | 264/150 |
| 5,547,479 | A | 8/1996 | Conwell et al. | 51/309 |
| 5,566,889 | A | 10/1996 | Preiss | 241/19 |
| 5,567,150 | A | 10/1996 | Conwell et al. | 432/14 |
| 5,570,749 | A | 11/1996 | Reed | 175/66 |
| 5,597,042 | A | 1/1997 | Tubel et al. | 166/250.01 |
| 5,662,165 | A | 9/1997 | Tubel et al. | 166/250.01 |
| 5,669,941 | A | 9/1997 | Peterson | 51/295 |
| 5,706,896 | A | 1/1998 | Tubel et al. | 166/313 |
| 5,730,219 | A | 3/1998 | Tubel et al. | 66/250.01 |
| 5,732,776 | A | 3/1998 | Tubel et al. | 166/250.15 |
| 5,732,828 | A | 3/1998 | Littlefield, Jr. | 209/365.1 |
| 5,791,494 | A * | 8/1998 | Meyer | 209/368 |
| 5,793,705 | A | 8/1998 | Gazis et al. | 367/98 |
| 5,816,413 | A | 10/1998 | Boccabella et al. | |
| 5,819,952 | A | 10/1998 | Cook et al. | 209/400 |
| 5,868,125 | A | 2/1999 | Maoujoud | 125/15 |
| 5,896,998 | A * | 4/1999 | Bjorklund et al. | 209/326 |
| 5,944,197 | A | 8/1999 | Baltzer et al. | 209/400 |
| 5,952,569 | A | 9/1999 | Jervis et al. | |
| 5,955,666 | A | 9/1999 | Mullins | 73/152.18 |
| 5,971,307 | A | 10/1999 | Davenport | 241/259.1 |
| 5,992,519 | A | 11/1999 | Ramakrishnan et al. | 166/250.15 |
| 6,013,158 | A | 1/2000 | Wootten | 202/99 |
| 6,021,377 | A | 2/2000 | Dubinsky et al. | |
| 6,045,070 | A | 4/2000 | Davenport | 241/60 |
| 6,062,070 | A | 5/2000 | Maltby et al. | 73/61.49 |
| 6,102,310 | A | 8/2000 | Davenport | 241/21 |
| 6,105,689 | A | 8/2000 | McGuire et al. | 175/48 |
| 6,138,834 | A | 10/2000 | Southall | 209/17 |
| 6,155,428 | A | 12/2000 | Bailey et al. | 209/315 |
| 6,170,580 | B1 | 1/2001 | Reddoch | 175/66 |
| 6,173,609 | B1 | 1/2001 | Modlin et al. | 73/293 |
| 6,176,323 | B1 | 1/2001 | Weirich et al. | 175/40 |
| 6,192,742 | B1 | 2/2001 | Miwa et al. | 73/40 |
| 6,223,906 | B1 | 5/2001 | Williams | 210/400 |
| 6,233,524 | B1 | 5/2001 | Harrell et al. | |
| 6,234,250 | B1 * | 5/2001 | Green et al. | 166/250.03 |
| 6,237,404 | B1 | 5/2001 | Crary et al. | 73/152.03 |
| 6,279,471 | B1 | 8/2001 | Reddoch | 100/37 |
| 6,283,302 | B1 | 9/2001 | Schulte et al. | 209/399 |
| 6,333,700 | B1 * | 12/2001 | Thomeer et al. | 340/854.8 |
| 6,346,813 | B1 | 2/2002 | Kleinberg | 324/303 |
| 6,349,834 | B1 | 2/2002 | Carr et al. | 209/366.5 |
| 6,356,205 | B1 | 3/2002 | Salvo et al. | 340/853.3 |
| 6,367,633 | B1 | 4/2002 | Douglas | 209/311 |
| 6,412,644 | B1 | 7/2002 | Crabbe et al. | 209/309 |
| 6,429,653 | B1 | 8/2002 | Kruspe et al. | 324/303 |
| 6,438,495 | B1 | 8/2002 | Chau et al. | |
| 6,439,391 | B1 | 8/2002 | Seyffert | 209/238 |
| 6,474,143 | B1 | 11/2002 | Herod | 73/54.01 |
| 6,484,088 | B1 | 11/2002 | Reimer | 701/123 |
| 6,485,640 | B2 | 11/2002 | Fout et al. | 210/188 |
| 6,505,682 | B2 | 1/2003 | Brockman | 166/250.15 |
| 6,506,310 | B2 | 1/2003 | Kulbeth | 210/780 |
| 6,513,664 | B1 | 2/2003 | Logan et al. | 209/367 |
| 6,517,733 | B1 | 2/2003 | Carlson | 210/785 |
| 6,553,336 | B1 | 4/2003 | Johnson et al. | 702/188 |
| 6,575,304 | B2 | 6/2003 | Cudahy | 209/365.3 |
| 6,581,455 | B1 | 6/2003 | Berger et al. | 73/152.55 |
| 6,679,385 | B2 | 1/2004 | Suter et al. | 209/367 |
| 6,691,025 | B2 | 2/2004 | Reimer | 701/123 |
| 6,715,612 | B1 | 4/2004 | Krystof | 209/331 |
| 6,746,602 | B2 | 6/2004 | Fout et al. | 210/188 |
| 6,763,605 | B2 | 7/2004 | Reddoch | 34/58 |
| 6,766,254 | B1 | 7/2004 | Bradford et al. | 702/9 |

(56) References Cited

U.S. PATENT DOCUMENTS

| | | | |
|---|---|---|---|
| 6,769,550 B2 | 8/2004 | Adams et al. | 209/399 |
| 6,783,088 B1 | 8/2004 | Gillis et al. | 241/19 |
| 6,783,685 B2 | 8/2004 | Huang | 210/690 |
| 6,793,814 B2 | 9/2004 | Fout et al. | 210/188 |
| 6,827,223 B2 | 12/2004 | Colgrove et al. | 209/365.3 |
| 6,838,008 B2 | 1/2005 | Fout et al. | 210/780 |
| 6,868,920 B2 | 3/2005 | Hoteit et al. | 175/25 |
| 6,873,267 B1 | 3/2005 | Tubel et al. | 340/853.3 |
| 6,892,812 B2 | 5/2005 | Niedermayr et al. | 166/250.15 |
| 6,896,055 B2 | 5/2005 | Koithan | 166/250.15 |
| 6,899,178 B2 | 5/2005 | Tubel | 166/313 |
| 6,907,375 B2 | 6/2005 | Guggari et al. | 702/113 |
| 7,195,084 B2 | 3/2007 | Burnett et al. | 175/66 |
| 7,284,665 B2 | 10/2007 | Fuchs | 209/270 |
| 7,303,079 B2 * | 12/2007 | Reid-Robertson et al. | 209/405 |
| 7,316,321 B2 | 1/2008 | Robertson et al. | 209/400 |
| 7,373,996 B1 | 5/2008 | Martin et al. | 175/206 |
| 7,514,011 B2 | 4/2009 | Kulbeth | 210/780 |
| 7,581,569 B2 | 9/2009 | Beck | 139/425 R |
| 7,770,665 B2 | 8/2010 | Eia et al. | 175/66 |
| 2001/0032815 A1 | 10/2001 | Adams et al. | 210/388 |
| 2002/0000399 A1 | 1/2002 | Winkler et al. | 209/399 |
| 2002/0033278 A1 | 3/2002 | Reddoch | 175/57 |
| 2002/0112888 A1 | 8/2002 | Leuchtenberg | 175/48 |
| 2002/0134709 A1 | 9/2002 | Riddle | 209/238 |
| 2003/0015351 A1 | 1/2003 | Goldman et al. | 175/39 |
| 2003/0220742 A1 | 11/2003 | Niedermayr et al. | 702/9 |
| 2004/0040746 A1 * | 3/2004 | Niedermayr et al. | 175/38 |
| 2004/0051650 A1 * | 3/2004 | Gonsoulin et al. | 340/853.1 |
| 2004/0156920 A1 | 8/2004 | Kane | 424/725 |
| 2004/0245155 A1 | 12/2004 | Strong et al. | 209/405 |
| 2005/0236305 A1 | 10/2005 | Schulte, Jr. et al. | 209/403 |
| 2005/0255186 A1 | 11/2005 | Hiraga | 425/542 |
| 2006/0034988 A1 | 2/2006 | Bresnahan et al. | 426/502 |
| 2008/0078704 A1 | 4/2008 | Carr et al. | 209/399 |
| 2008/0179090 A1 | 7/2008 | Eia et al. | 175/5 |
| 2008/0179096 A1 | 7/2008 | Eia et al. | 175/66 |
| 2008/0179097 A1 | 7/2008 | Eia et al. | 175/66 |
| 2009/0071878 A1 | 3/2009 | Bosse | |
| 2009/0286098 A1 | 11/2009 | Yajima et al. | 428/507 |
| 2009/0316084 A1 | 12/2009 | Yajima et al. | 349/96 |
| 2010/0084190 A1 | 4/2010 | Eia et al. | 175/5 |
| 2010/0119570 A1 | 5/2010 | Potter et al. | 424/422 |

FOREIGN PATENT DOCUMENTS

| | | |
|---|---|---|
| FR | 2 636 669 | 3/1990 |
| GB | 2 030 482 A | 4/1980 |
| GB | 2 327 442 A | 1/1999 |
| GB | 2408006 B | 4/2007 |
| JP | 55112761 | 8/1980 |
| JP | 59069268 | 4/1984 |
| JP | 63003090 | 1/1988 |
| JP | 63283860 | 11/1988 |
| JP | 63290705 | 11/1988 |
| JP | 02127030 | 5/1990 |
| JP | 02167834 | 6/1990 |
| JP | 03240925 | 10/1991 |
| JP | 03264263 | 11/1991 |
| JP | 04093045 | 3/1992 |
| JP | 04269170 | 9/1992 |
| JP | 05043884 | 2/1993 |
| JP | 05301158 | 11/1993 |
| JP | 06063499 | 3/1994 |
| JP | 07304028 | 11/1995 |
| JP | 08039428 | 2/1996 |
| JP | 08270355 | 10/1996 |
| JP | 09109032 | 4/1997 |
| WO | WO96/08301 | 3/1996 |
| WO | WO98/10895 | 3/1998 |
| WO | 2008/042844 A1 | 4/2008 |

OTHER PUBLICATIONS

AMS 2000 Description, Thule Rigtech, Rig Technology, 18 pages (2000).

Automated Chemical Additive System, Thule Rigtech, Rig Technology Ltd., 4 pages (2000).

Brandt Automated Shaker Control, Varco, 1 page (2002).

Brandt®, A Varco Company, King Cobra Series, Installation, Operation, and Maintenance Manual, M12444 R5, 65 pages (2003).

Brandt®, A Varco Company, LCM-2D LP Installation and Operation Manual, 84 pages (1998).

Brandt et al., Mud Equipment Manua —Handbook 3: Shale Shakers, Gulf Pub. Co., 18 pages (1982).

The Derrick LP Sandwich Shaker, Derrick Equipment Company, 4 pages (1981).

Fluid Systems Inc., The Prodigy Series I™ Dynamic Control Shaker, 2 pages (Apr. 27, 2004).

Sweco® Oilfield Services, LM-3 Full-Flo™ Shale Shaker, 4 pages (1991).

U.S. Appl. No. 12/469,851 Final Office Action dated Nov. 9, 2010.
U.S. Appl. No. 12/469,851 Office Action dated Jun. 28, 2010.
U.S. Appl. No. 12/227,462 Office Action dated Nov. 15, 2010.
U.S. Appl. No. 11/897,976 Final Office Action dated Sep. 1, 2010.
U.S. Appl. No. 11/897,976 Office Action dated Apr. 1, 2010.
U.S. Appl. No. 11/897,975 Final Office Action dated Jul. 21, 2010.
U.S. Appl. No. 11/897,975 Office Action dated Feb. 19, 2010.
U.S. Appl. No. 11/637,615 Final Office Action dated Aug. 2, 2010.
U.S. Appl. No. 11/637,615 Office Action dated Mar. 2, 2010.

Polyamide 6/6—Nylon 6/6—PA 6/6 60% Glass Fibre Reinforced, Data Sheet [online], AZoM™, The A to Z of Materials and AZojomo, The "AZo Journal of Materials Online" [retrieved on Nov. 23, 2005] (2005) (Retrieved from the Internet: <URL: http://web.archive.org/web/20051123025735/http://www.azom.com/details.asp?ArticleID=493>.

Partial International Search Report from PCT/GB2011/050975 dated Nov. 15, 2012.

* cited by examiner

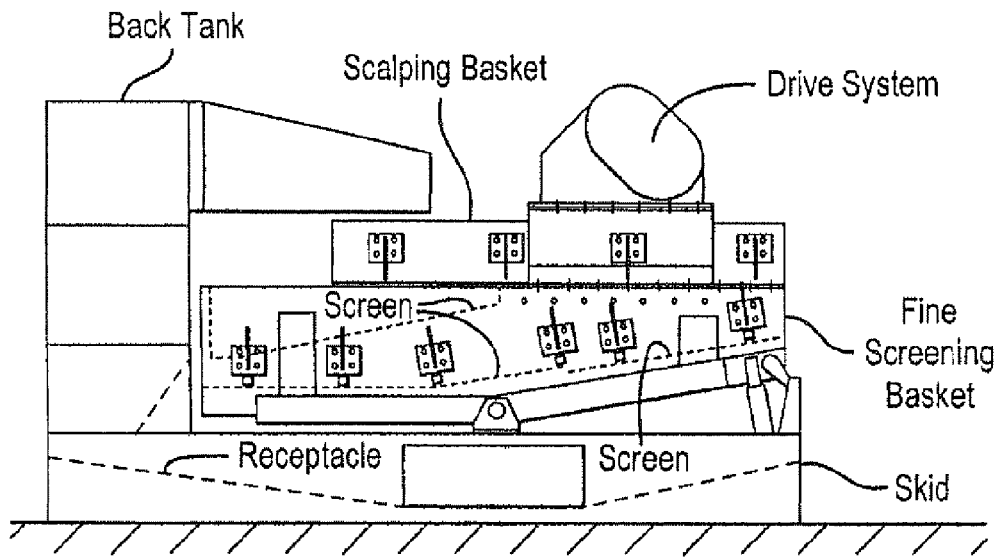
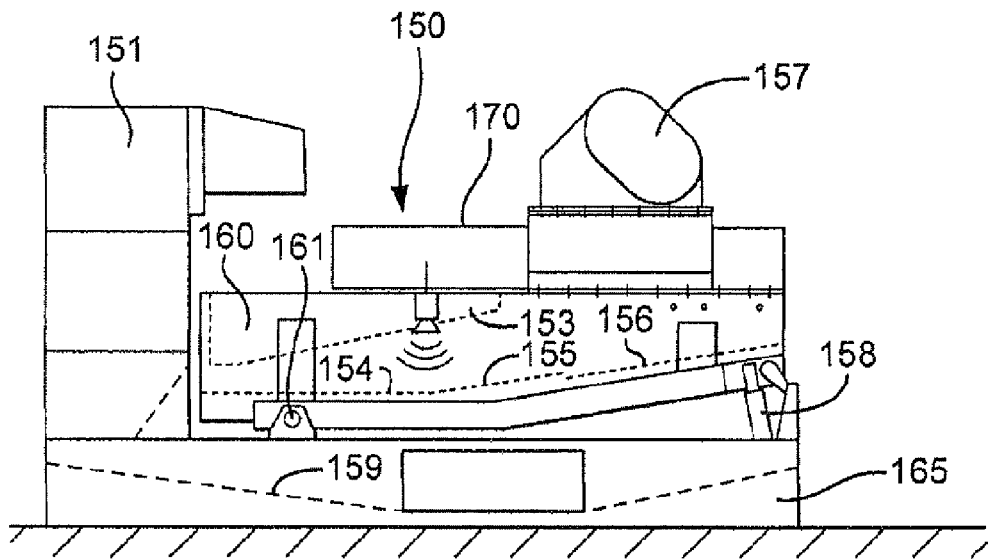

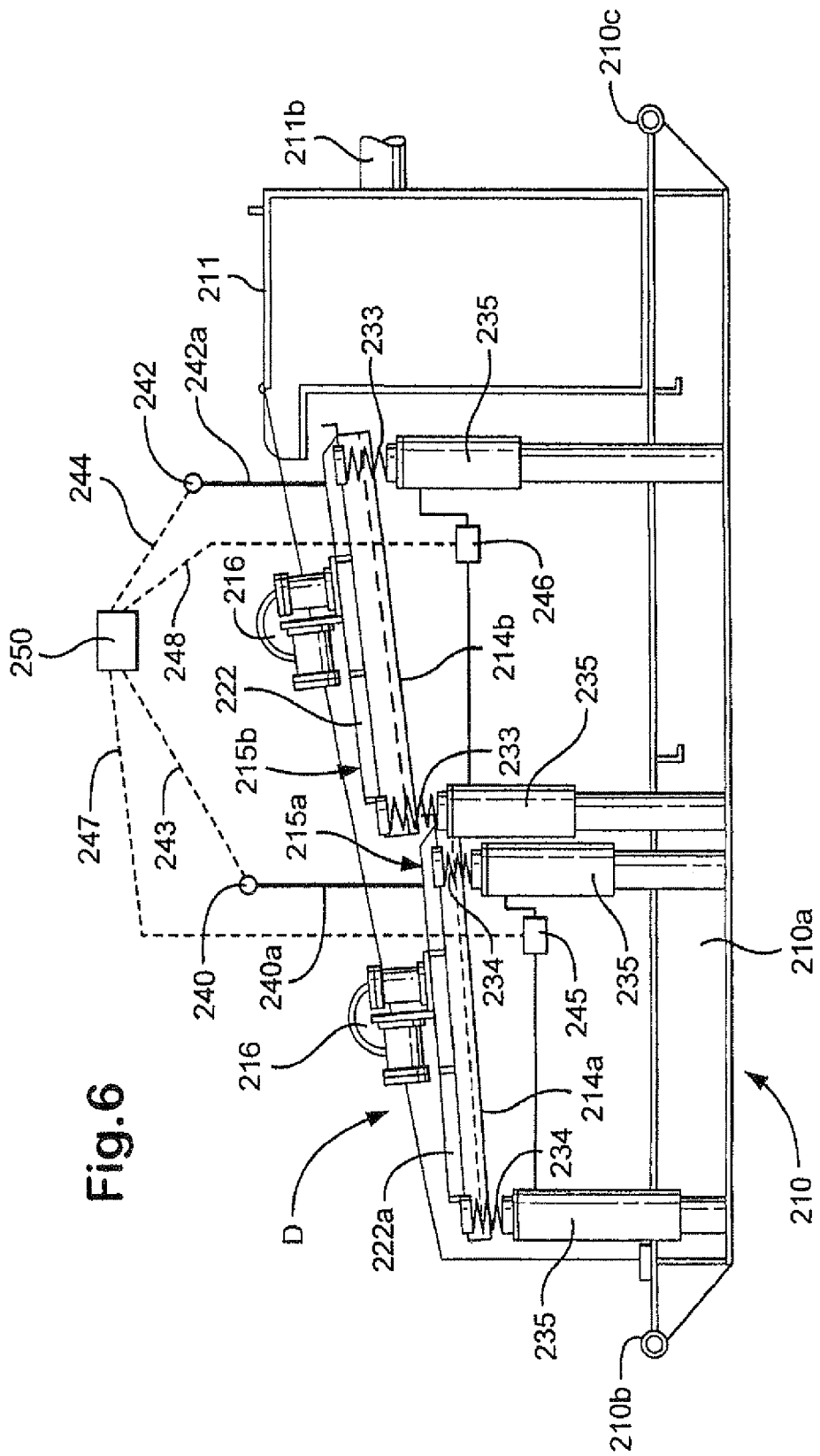

Fig. 20

Current Status of Rigs

| Rigs | Link | Status |
|---|---|---|
| 561 | O | O |
| 562 | O | O |
| 563 | O | O |
| 564 | O | O |
| 565 | O | O |
| 566 | O | O |
| 567 | O | O |
| 568 | O | O |
| 569 | O | O |
| 570 | O | O |
| 571 | O | O |
| 572 | O | O |

○ OK
○ Failed
○ Caution
○ Inconclusive
◨ Rig Stacked

Status of Rig-569

Health Checks

System Health Check Summary Results as on : 9/6/2002

| Joystick | Override | Tunning Changes | BCS | RigSense |
|---|---|---|---|---|
| O | O | O | O | O |

Summary Rig Report for 9/6/2002

Rig Status. At 0648 Mike reported that the rig was drilling ahead. The equipment was working as designed with no problems to report. Encoder Failure Alarm. At 1645 Clarence reported an encoder failure alarm and minor problem with the block surging during reaming. Trend indicated that both Encoders (A&B) were still tracking correctly but was unable to identify any surge evidence. CC called Marcus who was already on his way to the rig. At 0113 Marcus reported that he checked the status on the rig and did not find any encoder failure alarm or block surging issues.

AutoDriller Performance on OTC

| Parameter | %Time Enabled | %Time in Control | Avg. for 24 Hours | %Time Within Acceptable Zone | +/- Target Control Range |
|---|---|---|---|---|---|
| ROP ft/hr | 100 | 28.79 | 102.77 | 90.58 | 10% of SP |
| WOB klbs | 100 | 71.17 | -14.74 | 0.17 | 1 klb |
| Torque | 0 | 0 | | Insignificant Data | 10% of SP |
| Delta-P psi | 0 | 0 | | Insignificant Data | 100 psi |

Driller Adjustable Parameters

| Parameter Name | Current Value | Changed? | Outside Range |
|---|---|---|---|
| Drill Lo Set Point | 0 | | |

Fig. 21B

Health Checks on Rig - 569

○ RigSense System

| Details Link | Device Name | Device Status | Operation | Device Message |
|---|---|---|---|---|
| 🔍 | Sensor Group | ○ | Click on Magnifying Glass for more details — 746 | |
| 🔍 | RS AppServer | ○ | | |
| | RS NTTracer | ○ | OK | |
| | RS Client | ○ | OK | |

○ Well Data Net

| Details Link | Device Name | Device Status | Operation | Device Message |
|---|---|---|---|---|
| | Satellite System | ○ | OK | |
| | Data Server | ○ | OK | |
| | Web Application | ○ | Unknown | |

Driller Adjustable Parameters

| Parameter Name | Current Value | Changed ? | Outside Range ? | |
|---|---|---|---|---|
| Date of Data | 2/22/2002 | | | ← 710 |
| Drill Lo Set Point | 10.5 | | O | ← 712 |
| Lo Set Point | 1.7 | | | |
| Upper Set Point | 101 | | O | ← 714 |
| Swab Speed | 355 | | | |
| Tripin Surge Speed | 100 | | | |
| Stand Lowering Time | 10 | | | |
| Casing Surge Speed | 100 | | | |
| Joint Lowering Time | 2 | | | |
| Connection Lowering Speed | 15 | | | |
| Connection Hoist Speed | 20 | | | |
| Kickout Height | 87.2 | | | |
| Tripout High Alert | 85 | | | |
| ROP Set Point | 160 | | | |
| WOB Set Point | 40 | | | |
| Torque Set Point | 1500 | | | |
| DeltaP Set Point | 280 | | | |
| Cut & Slip Engine RPM | 700 | | | |
| Lines Strung | 10 | | | |
| Ball Height | 11 | | | |

Driller Tuning Parameters — 716

| Parameter Name | Current Value | Changed ? | Outside Range ? |
|---|---|---|---|
| Date of Data | 2/22/2002 | | |
| Large Piston Drilling Bias | 0 | | |
| Large Piston Tripping Bias | -5 | | |
| ROP Gain Factor-Driller | 0.5 | | |

Fig. 24

VICIS-ED Configuration Parameters

Driller Adjustment Parameters

Legend: Changed in last 24 Hours ○ | Outside Permissable Range ◉ | Invalid Data ○

| Parameter Name \ Rig # | 178 | 179 | 180 | 181 | 182 | 183 | 184 | 185 | 186 | 187 | 188 | 189 |
|---|---|---|---|---|---|---|---|---|---|---|---|---|
| Date of Data | 2/22/2002 | 2/22/2002 | 2/22/2002 | 2/22/2002 | 2/22/2002 | No Data | 2/22/2002 | 2/22/2002 | 2/22/2002 | 2/22/2002 | 2/22/2002 | 2/22/2002 |
| Drill Lo Set Point | 9 | 7 | 10.5 ◉ | 9 | 9 | N/A | 9.6 | -1.5 ◉ | 6.5 ◉ | 8.3 | 8.227 ◉ | 11.4 ◉ |
| Lo Set Point | 1 | 1.5 | 1.7 | 0.5 | 8.996 ◉ | N/A | 0.1 ◉ | -1.5 ◉ | 1 | 1.6 | 1.3 | 3 |
| Upper Set Point | 99 ◉ | 100 ◉ | 101 | 95 | 96 | N/A | 90 | 99 | 99 ◉ | 99 ◉ | 105.1 ◉ | 95.5 ◉ |
| Swab Speed | 180 | 255 | 355 | 50 | 100 | N/A | 200 | 200 | 30 | 300 | 200 | 30 |
| Tripin Surge Speed | 60 | 160 | 100 | 100 | 50 | N/A | 40 | 200 | 30 | 70 | 200 | 140 |
| Stand Lowering Speed | 25 | 40 | 10 | 60 | 5 | N/A | 100 | 27 | 5 | 20 | 25 | 20 |
| Casing Surge Speed | 20 | 155 | 100 | 30 | 50 | N/A | 10 | 100 | 15 | 25 | 100 | 140 |
| Joint Lowering Time | 12 | 60 | 2 | 40 | 40 | N/A | 90 | 14 | 5 | 5 | 5 | 9 |
| Connection Lowering Speed | 20 | 32 | 15 | 50 | 10 | N/A | 50 | 40 | 20 | 20 | 25 | 50 |
| Connection Hoist Speed | 50 | 45 | 20 | 50 | 50 | N/A | 50 | 40 | 30 | 30 | 50 | 50 |
| Kickout Height | 60 | 60 | 87.2 | 47 | 60 | N/A | 75 | 71.2 | 61 | 65 | 88 | 80 |
| Tripout High Alert | 85 | 85 | 85 | 28 ◉ | 150 | N/A | 75 | 65 | 60 | 65 | 88 | 85 |
| ROP Set Point | 150 | 55 | 150 | 50 | 150 | N/A | 250 | 150 | 21 | 175 | 50 | 70 |
| WOB Set Point | 10 | 40 | 40 | 8 | 11 | N/A | 20 | 112 | 13 | 8 | 15 | 43 |
| Torque Set Point | 650 | 300 | 1500 | 500 | 280 | N/A | 660 | 1500 | 650 | 220 | 400 | 400 |
| DeltaP set Point | 500 | 200 | 280 | 200 | 400 | N/A | 500 | 139 | 500 | 200 | 250 | 200 |
| Cut & Slip Engine RPM | 700 | 715 ◉ | 700 | 700 | 700 | N/A | 700 | 700 | 700 | 700 | 700 | 700 |
| Lines Strung | 10 | 10 | 10 | 10 | 8 | N/A | 10 | 10 | 10 | 10 | 0 | 12 |

AUTOMATIC VIBRATORY SEPARATOR

CROSS-REFERENCE TO RELATED APPLICATIONS

This is a division of U.S. application Ser. No. 11/977,727, filed Oct. 25, 2007, now abandoned which is a division of U.S. application Ser. No. 11/096,192, filed Mar. 31, 2005, now abandoned which is: a continuation-in-part of U.S. application Ser. No. 10/949,882, filed Sep. 25, 2004, issued as U.S. Pat. No. 7,278,540 on Oct. 9, 2007; a continuation-in-part of U.S. application Ser. No. 10/835,256, filed Apr. 29, 2004, issued as U.S. Pat. No. 7,331,469 on Feb. 19, 2008; a continuation-in-part of U.S. Ser. No. 10/512,372, filed Oct. 25, 2004, now U.S. Pat. No. 7,581,647 which is a 371 of Application Ser. No. PCT/IB03/01031, filed Mar. 12, 2003, which claims priority from U.S. Ser. No. 10/134,027, filed Apr. 26, 2002; and a continuation-in-part of U.S. Ser. No. 10/373,216, filed Feb. 24, 2003, now U.S. Pat. No. 6,907,375 which claims priority from U.S. Provisional Application Ser. No. 60/424,262, filed Nov. 6, 2002—all of which are incorporated fully herein and with respect to all of which the present invention and application claims priority under the Patent Laws.

BACKGROUND OF THE INVENTION

1. Field of the Invention

This invention is directed to vibratory separators and shale shakers; to apparatuses and methods for sensing various parameters related to the use of separators and shakers, including, but not limited to, fluid levels in such separators; and to apparatuses and methods for adjusting such levels and for adjusting the extent of a beach area on a screen.

2. Description of the Related Art

In many prior art vibratory separators and shale shakers a pool or mass of fluid or material is formed on top of one or more screens or screen assemblies which are used to filter material introduced to the separator or shaker. The depth of this fluid or material can affect efficient operation of the separator or shaker. Fluid or material that is too deep may not be adequately filtered. Fluid or material that is too shallow may flow across a screen too quickly or without sufficient weight to be filtered adequately.

Shale shakers assist in maintaining certain desired properties of drilling fluid by using vibrating screens to remove certain large particles while allowing certain smaller particles to remain in the fluid. The large undesirable particles may include drilling cuttings and debris picked up in the drilling process. The smaller particles may include drilling fluid additives that are required for maintaining desired drilling fluid density and viscosity. The screens on these shakers have a limited life, and can be expensive and time consuming to replace. The shaker is turned off and, preferably, rinsed clean prior to screen replacement.

One factor in screen life is how well the beach area is maintained. "Beach" area is the distance from a fluid-dry interface-with-fluid line on a final screen to the end of the screen. Thus, a zero beach length describes a shaker operating with drilling fluid covering the entire screen area of the final screen and running over to discharge. This can be costly due to the loss of drilling fluid which flows off, rather than through, a screen. A beach length of 20" in certain shakers indicates a shaker operating fairly dry, with the last sections of screen potentially vibrating against completely dry particles. Such dry particles vibrating on the beach of the last screen can tear holes in the screen and shorten the screen life. The beach length is affected by variables such as fluid flow rates and drilling fluid properties including viscosity, density, temperature, and solids content.

In many prior art separators and shakers tilting or raising mechanisms are provided to adjust the angle of screen(s) with respect to the horizontal. For example, a prior art shaker S (shown in FIG. 1) has a tilting mechanism which permits a screen-containing basket to be tilted around a pivot point P up to 5 from the horizontal.

U.S. Pat. No. 4,082,657 discloses a separator apparatus which has individual height adjustable mounting structures for each screen unit which permit adjustment of the screen unit angle with respect to the horizontal.

U.S. Pat. No. 6,575,304 B2 discloses a hydraulic ram apparatus beneath a screen body which is used to adjust the angle of incline of the screen body.

In many prior art systems, a determination of the level of material or fluid on a screen or screen assembly of a separator or shaker is done visually and then adjustments of screen incline angle or of screen support incline angle are done manually.

There has long been a need, recognized by the present inventors, to provide an efficient and accurate measurement of the depth of fluid or material on a screen or screen assembly of a vibratory separator or shale shaker. There has long been a need, recognized by the present inventors, for such separators and shakers with accurate adjustment of such depth based on measurement thereof. There has long been a need, recognized by the present inventors, for a shale shaker or vibratory separator with screen pool depth adjustability to efficiently adjust last-screen beach extent to enhance screen efficiency and to prolong screen life.

BRIEF SUMMARY OF THE INVENTION

The present invention, in certain embodiments, a shale shaker or vibratory separator with a base; a basket movably mounted on the base and for supporting screen apparatus for treating material introduced at a first end of the basket into the vibratory separator, the basket on a base and the first end pivotable with respect thereto, the basket having a second end spaced apart from the first end, material exiting the basket at the second end; vibratory apparatus connected to the basket for vibrating the basket; screen apparatus supported by the basket, the material flowing onto the screen apparatus for treatment; angle adjustment apparatus connected to the basket for adjusting angle of the basket by pivoting the basket's first end; sensor apparatus connected to the vibratory separator for sensing a parameter indicative of basket angle and for providing a signal corresponding to said basket angle; control apparatus for receiving signals from the sensor apparatus and for controlling basket angle based on said signals; and the angle adjustment apparatus including movement apparatus for moving the second end up and down to change basket angle, the movement apparatus controlled by the control apparatus.

The present invention, in certain aspects, discloses a vibratory separator with a base; a basket movably mounted on the base and for supporting screen apparatus for treating material introduced into the vibratory separator, the basket on a base and pivotable with respect thereto; vibratory apparatus connected to the basket for vibrating the basket; screen apparatus supported by the basket, the material flowing onto the screen apparatus for treatment; angle adjustment apparatus connected to the basket for adjusting angle of the basket; sensor apparatus for sensing a parameter indicative of basket angle and for providing a signal corresponding to said basket angle;

control apparatus for receiving signals from the sensor apparatus and for controlling basket angle based on said signals; the angle adjustment apparatus including a rocker arm assembly with a first end and a second end, the first end pivotably mounted to the base adjacent and beneath a material input area of the vibratory separator and the second adjacent and beneath a material exit end of the vibratory separator; and the angle adjustment apparatus including movement apparatus with a part thereof in contact with the second end of the rocker arm assembly for moving the second end up and down to change basket angle, the movement apparatus controlled by the control apparatus.

The present invention discloses, in certain embodiments, beach adjustment apparatus for adjusting extent of a beach on a screen of a vibratory separator, the screen mounted to a vibratable basket of the vibratory separator, the beach adjustment apparatus having an end-pivotable basket support for supporting the basket, the end-pivotable basket support pivotable at a pivot end thereof, the end pivotable basket support having a second end spaced-apart from the pivot end, the second end positionable near an exit end of a vibratory separator, apparatus for pivoting the end-pivotable basket support at its pivot end, and the apparatus for pivoting the end-pivotable basket support including movement apparatus for moving the second end of the end-pivotable basket support for facilitating pivoting movement of the end-pivotable basket support to raise and lower the second end to adjust the extent of the beach.

The present invention, in certain embodiments, teaches a vibratory separator (in one particular aspect, a shale shaker) which has sensing apparatus for sensing parameters indicative of the level of fluid or material on a screen or screen assembly supported by the separator and, therefore, for indicating the extent of a beach area on the screen or screen assembly. In one aspect, a screen or screen assembly itself (or a screen on holding structure) is able to be inclined to a desired angle to adjust the extent of a beach area adjacent an exit end of a screen. A beach area is an area adjacent a screen's exit end with two boundary sides—a first side (or rear side) is the side of a pool of material on the screen (analogous to the seashore) and the second side or front side is at or near the exit end of the screen. It is important in some systems to maintain a beach area of desired extent which is sufficiently large so that the pool does not extend to or beyond the screen's exit end—which would result in some material not being treated (filtered, separated) by the screen and simply flowing off the end of the screen. It is also important in some systems to insure that the beach area is not too large which could adversely affect screening efficiency and effectiveness.

In certain aspects, such a separator also has adjustment apparatus (powered electrically, hydraulically, or pneumatically) for receiving information from one or more sensing apparatuses regarding distance to fluid or material at a certain location on a screen or screen assembly (which corresponds to pool depth at the location) and for then adjusting incline angle of the screen or screen assembly to adjust and maintain the extent of a beach area adjacent an exit end of a screen In certain aspects, any suitable basket pivot point is used from a basket center to a basket end. In one particular aspect a basket for supporting a screen or screen assembly is positioned and configured so that it pivots at a pivot point relatively near one of its ends; and, in one particular aspect, such a pivot is beneath a rear line which is the rear boundary of a desired beach area ("rear" meaning the beach boundary farthest away from the exit end of a screen).

The present invention, in certain aspects, discloses a shale shaker or vibratory separator with a screen support or basket for supporting screen apparatus for treating material introduced into the vibratory separator, the basket on a base and pivotable with respect thereto; vibratory apparatus connected to the basket for vibrating the basket; screen apparatus supported by the basket, the material flowing onto the screen apparatus and forming a pool on the screen apparatus, and a beach on the screen apparatus adjacent the pool; measurement sensor apparatus connected to the vibratory separator and positioned above the screen apparatus for measuring a distance from the measurement sensor apparatus to a top surface of the pool, the measurement sensor apparatus including a signal production portion for producing signals indicative of said distance and for transmitting said signals; a control system for controlling and in communication with the measurement sensor apparatus for receiving signals from the measurement sensor apparatus indicative of said distance and for processing said signals to calculate a pool depth corresponding to said distance, said pool depth related to a location of an edge of said pool adjacent said beach; and angle adjustment apparatus connected to the basket and controlled by the control system for adjusting angle of the basket, thereby adjusting extent of the beach.

In one particular aspect, a shale shaker according to the present invention consists of a vibrating basket which supports multiple screens. Drilling fluid is directed to flow over the screens from a weir tank. As fluid flows over the screens, drilling fluid and smaller particles pass through the screens and are returned to the drilling fluid system. The larger particles and pieces remain on top of the screens, and vibratory action moves them off an end of the shaker. Within the shaker, the angle at which the basket sits can be changed to maintain the desired beach area. One or more ultrasonic transducer sensor measuring apparatuses mounted above a screen or screens, (in one aspect above the last screen) measures the fluid level on screen(s) or on the last screen.

In one particular aspect a single sensor is used above the pool above a last screen which is a pool area that is less turbulent than previous screen areas and, in one aspect, a basket pivot point is located beneath a beach's rear line so that the single sensor provides all needed information to adjust beach extent as desired. The level of the fluid on the screen(s) is related to the rear or inner beach boundary. A signal from the sensor(s) indicative of sensor-to-pool-surface distance is sent to a control system, e.g. a computerized control system, a programmable logic controlled control system, a digital signal processor and/or a microprocessor based control system which interprets the signal and sends a control signal to a height adjustment apparatus, e.g., but not limited to, a system with a directional control valve which controls pressurized hydraulic fluid flow to pistons attached via linkages between the shaker base and basket and/or any basket raising apparatus (mechanical, pneumatic, or hydraulic; e.g. but not limited to hydraulically-powered piston/cylinder apparatuses) of the prior art. In certain aspects, multiple distance measurements are made and the controller is programmed to average the measurements. As the basket is raised or lowered, the basket angle changes. When the beach width is too long, the height adjustment apparatus decreases the angle of the basket, and when the beach width is too short, the angle of the basket is increased. Thus, the desired beach extent is automatically maintained. A desired sensor-to-pool-surface distance, and thus a desired beach width can be programmed into the control system for a particular separator, shaker, screen, or screen assembly.

In one particular aspect a power system for providing hydraulic fluid under pressure to apparatus for raising and lowering a basket uses double rod hydraulic cylinders so that dual apparatuses on two sides of a basket operate in unison. One or more sensors may be connected to or over a basket, to a rear tank, to a skid or base, or to a motor tube or mount. In one aspect a fluid reservoir (hydraulic fluid or gas) and/or fluid pump apparatus is part of a vibratory separator system or part of a shale shaker. In one particular aspect, a skid, base, or support of a shaker or part of a shaker supports a fluid reservoir; and pump apparatus on the shaker provides fluid to height adjustment apparatus.

In certain aspects a fluid flow sensor is employed on a vibratory separator or shale shaker which gives an indication when the flow of material ceases so that a basket end near a material input point can be lowered so that upon recommencement of the material flow the basket angle is such that material does not flow off a last screen's exit end without being treated.

In certain aspects the present invention provides a vibratory separator (e.g. but not limited to a shale shaker) with a basket for supporting screen apparatus for treating material introduced into the vibratory separator, the basket on a base and pivotable with respect thereto; vibratory apparatus connected to the basket for vibrating the basket and the screen apparatus in the basket; screen apparatus supported by the basket, the material flowing onto the screen apparatus and forming a pool on the screen apparatus, and a beach formed on the screen apparatus adjacent the pool; measurement sensor apparatus connected to the vibratory separator and positioned above the screen apparatus for measuring a distance from the measurement sensor apparatus to a top surface of the pool, the measurement sensor apparatus including a signal production portion for producing signals indicative of said distance and for transmitting said signals; a control system for controlling and in communication with the measurement sensor apparatus for receiving signals from the measurement sensor apparatus indicative of said distance and for processing said signals to calculate a pool depth corresponding to said distance, said pool depth related to a location of an edge of said pool adjacent said beach; and angle adjustment apparatus connected to the basket and controlled by the control system for adjusting angle of the basket, thereby adjusting extent of the beach.

Accordingly, the present invention includes features and advantages which are believed to enable it to advance vibratory separator technology. Characteristics and advantages of the present invention described above and additional features and benefits will be readily apparent to those skilled in the art upon consideration of the following detailed description of preferred embodiments and referring to the accompanying drawings.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide new, unique, useful, and nonobvious systems and methods of their use—all of which are not anticipated by, rendered obvious by, suggested by, or even implied by any of the prior art, either along or in any possible legal combination; and it is, therefore, an object of at least certain preferred embodiments of the present invention to provide:

New, useful, unique, efficient, non-obvious vibratory separators and shale shakers and methods of their use;

Such separators and shakers with one or more sensing apparatuses for sensing parameters indicative of the depth of fluid or material on screen(s) or screen assemblies supported by the separator or shaker, which depth is related to the extent of a beach area on the screen(s) or screen assemblies;

Such separators or shakers with a screen support which is pivotable at or near one of its ends for screen inclination angle adjustment thereby adjusting beach area;

Such separators or shakers with adjustment apparatus for adjusting screen inclination angle based on information received from the sensing apparatus or apparatuses;

Such separators or shakers with sensor(s) to sense sensor-to-pool-surface distance on screen(s) and to automatically adjust said distance to maintain a desired beach extent on a screen; and, in one aspect, on a last or material-exit screen; and, in one aspect, a single sensor which, in certain embodiments, is located above a basket pivot point;

Such separators or shakers with material flow sensing apparatus so that basket angle can be adjusted and readjusted depending on the material flow status; and New, useful, unique, efficient, non-obvious beach adjustment apparatus for adjusting beach extent on a screen of a vibratory separator or shake shaker.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is to enable the U.S. Patent and Trademark Office and the public generally, and scientists, engineers, researchers, and practitioners in the who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention in any way.

It will be understood that the various embodiments of the present invention may include one, some, or all of the disclosed, described, and/or enumerated improvements and/or technical advantages and/or elements in claims to this invention.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 5A is a schematic view of a prior art shale shaker.

FIG. 5B is a side schematic view of a system according to the present invention.

FIG. 6 is a side schematic view of a system according to the present invention.

FIG. 20 is an illustration of a preferred status display for an oil recovery system showing status for individual rigs and panel results showing text descriptions and color-coded status for a single oil rig.

FIG. 21B is an illustration of an alternative status display for an oil recovery system and a sub status for an individual rig.

FIG. 24 is an alternative tabular status display for an oil recovery system.

FIG. 25 is an alternative tabular status display for an oil recovery system.

FIG. 32B is a screen display for a system according to the present invention.

Figure 1:
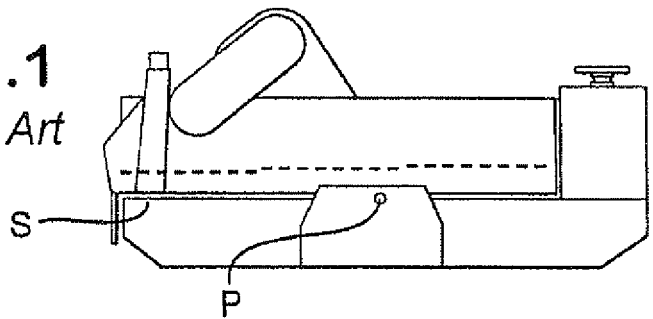
FIG. 1 is a schematic side view of a prior art shale shaker.

Presently preferred embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein.

DETAILED DESCRIPTION OF THE INVENTION

Figure 2A:
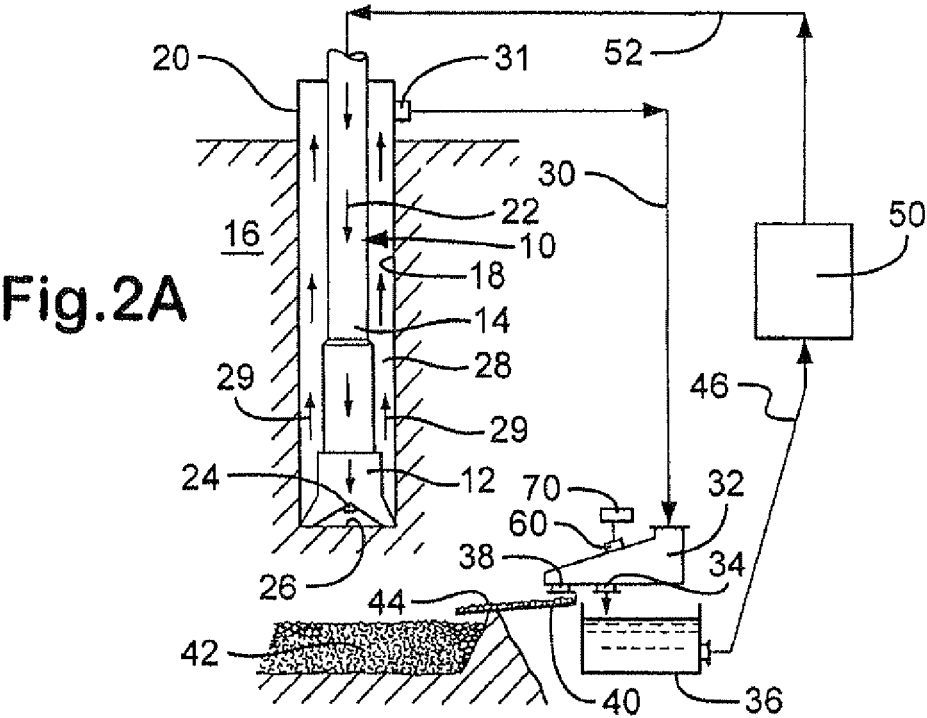
FIG. 2A is a schematic view of a system according to the present invention.
Figure 2B:
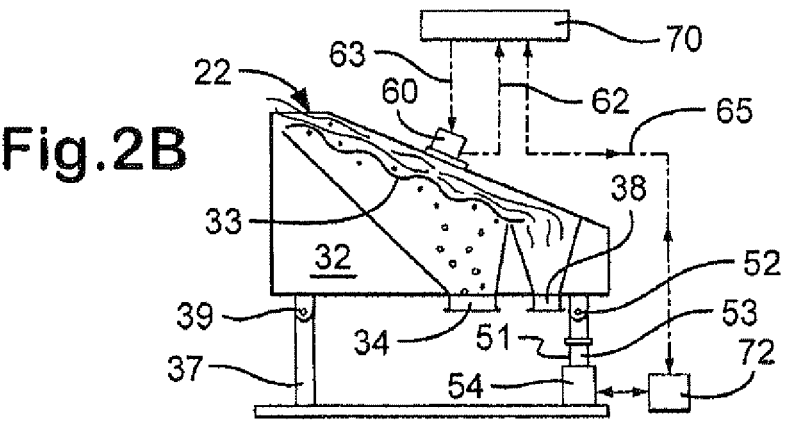
FIG. 2B is a schematic side view of shale shaker apparatus of the system of FIG. 2A.

Referring now to FIGS. 2A and 2B, a drilling system 10 according to the present invention includes a rotary bit 12 attached to the lower end of a length of hollow drill pipe 14 suspended from a drilling derrick (not shown).

The drill pipe 14 and attached drill bit 12 are rotated to cut into the subsurface formation 16 to form a wellbore 18. The drill pipe 14 passes through a wellhead assembly 20 located at the surface. The wellhead assembly 20 controls flow of drilling fluid into the well. During the drilling of the well, a drilling fluid 22 commonly referred to as drilling mud is pumped down the interior of the hollow drill pipe 14. The drilling mud exits jets such as jet 24 in drill bit 12 and impinges upon a bottom 26 of the well bore 18. The drilling fluid exiting the jets 24 flushes away from the bottom 26 of the wellbore 18 the cuttings or particles generated as the drill bit 12 cuts into the earthen formation 16. A stream of drilling mud 22 then carries the cuttings and particles upward through a well annulus 28 (arrows 29) to the wellhead 20. The drilling mud 22 with the particles and cuttings carried or suspended therein, exits the wellhead 20 at outlet 31 and passes through a conduit 30 to a shaker system according to the present invention which includes a shale shaker 32.

In the shaker 32, the drilling mud and particles are deposited upon one or more screens which are vibrated so that the larger particles are sifted out of the drilling mud and carried off the top of the screen(s).

A liquid portion of the drilling mud along with very fine suspended particles exits a first shaker outlet 34 and is received in a mud pit 36.

Larger particles 44 which are sifted out of the stream of drilling mud exit a second shaker outlet or trough 38 and are conveyed on a conveyor or slide 40 for deposit into a reserve pit 42 or into storage tanks for haulage to another location. The drilling mud is pumped from the mud pit 36 through a line 46 by a mud pump 50. The mud pump 50 then pumps the mud through a discharge line 52 which returns it to the interior bore of drill pipe 14.

As shown in FIGS. 2A and 2B the shale shaker 32 has a fluid level sensing apparatus 60 which is in communication with a control apparatus 70. The sensing apparatus 60 senses a distance to a top surface of the drilling mud 22 on a screen 33 of the shaker 32, which is indicative of mud depth. Via a signal transmission line 62 (or multiple such lines if needed) the sensing apparatus sends a signal to the computer apparatus 70 indicative of this distance. The apparatus 70 controls the sensing apparatus 60 via a line 63 (or multiple such lines if needed).

The shale shaker 32 (or a screen supporting basket thereof) is supported by a first support 37 which has a pivotal connection 39 and by a second support 51 which has a pivotal connection 52 and a movable post 53 which is selectively movable up and down by moving apparatus 54 to pivot the shale shaker 32 (or its basket alone) on the pivotal connection 39 to affect the angle of the shaker or basket 32, the depth of drilling fluid beneath the sensing apparatus 60, and the extent of a beach area on the screen 33. Via a line 65 the computer apparatus 70 controls a control apparatus 72 that selectively operates the moving apparatus 54 (which may be pneumatically, hydraulically or electrically powered as may be any such apparatus or height adjustment apparatus of any system according to the present invention).

The sensing apparatus 60 may be (and as may be the case for any sensor of any system disclosed herein) any suitable known level and/or distance sensing apparatus including, but not limited to, the following types: electrical, optical, electromagnetic, ultrasonic, acoustic, and pulse-echo, and may be like the level sensing systems disclosed in U.S. Pat. Nos. 6,691,025 B2; 5,793,705; 5,319,972; 6,484,088 B1; 6,062,070; and 5,131,271 (all said patents incorporated fully herein for all purposes) and the systems referenced, referred to or mentioned in these patents. The apparatus 70 may be (and as may be for any system disclosed herein) any suitable computer, computers, computer system, microprocessor-based system and/or programmable logic controller(s).

Figure 3:
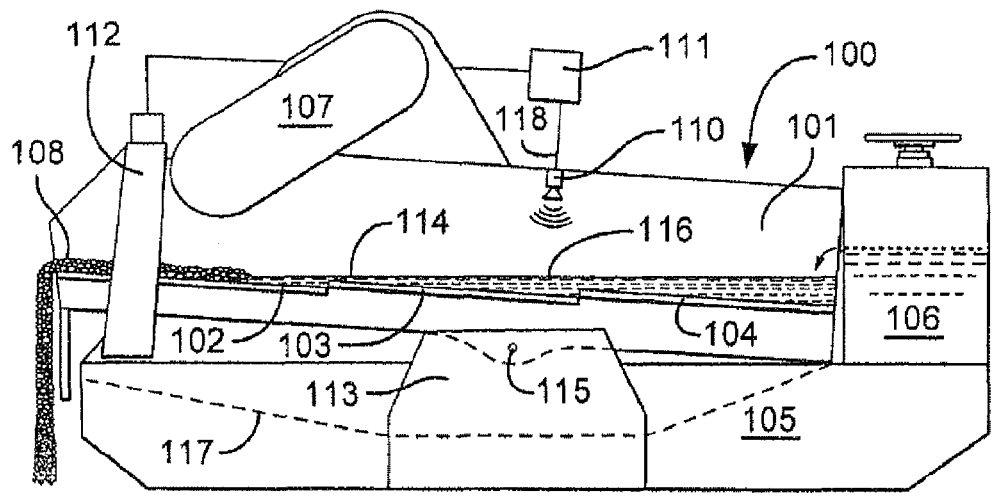
FIG. 3 is a side schematic view of a system according to the present invention.

FIG. 3 shows a shale shaker 100 according to the present invention which has a basket 101 vibrated by interconnected vibrating apparatus 107. The basket 101 supports three screens 102, 103, 104 for treating material introduced onto screen 104 from a tank 106.

An ultrasonic level sensor 110 is connected to the basket 101 and selectively senses the distance to, and, therefore the level of the material 114 (e.g., drilling fluid with solids entrained therein) at a location 116 above the screen 103. A control apparatus 111 controls the sensor 110 via a cable 118 and also, via the cable 118, the sensor 110 sends signals to the control apparatus 111 indicative of a measurement of the level at the location 116. In one aspect the control apparatus 111 includes suitable apparatus (e.g. like the apparatus 70 described above) which calculates the depth at the location 116 and, based on suitable programming in suitable programming media in the control apparatus 111, adjusts the inclination of the basket 101 using adjustment apparatus 112 so that the depth at the location 116 is maintained at a desired level.

In one aspect the basket 101 is pivotally connected to a support 113 at a pivot point 115. The support 113 is secured to a base 105, as is the tank 106 and adjustment apparatus 112. Fluid and/or solid material flowing through the screens 102-104 flows down into a receptacle 117. Separated material 108 flows off an exit end of the last screen 102.

Figure 4:
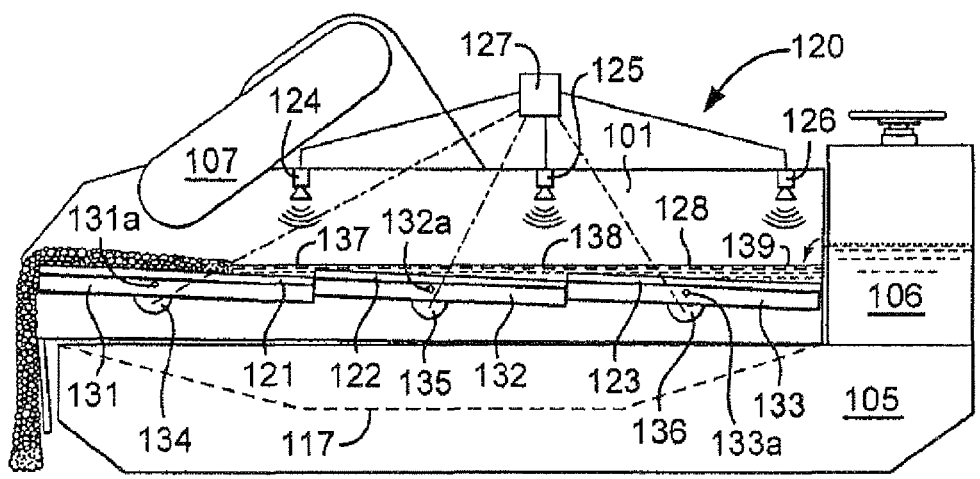
FIG. 4 is a side schematic view of a system according to the present invention.

FIG. 4 shows a shale shaker 120 according to the present invention similar to the shale shaker 100, FIG. 3 (and like numerals indicate like parts); but the shale shaker 120 has individual tilting mechanisms 131, 132, 133 (each with a respective pivot point 131a, 132a, 133a) each beneath a respective screen 121, 122, 123. Levels of drilling fluid 128 at various locations on the screens 121-123 can be adjusted by selectively changing the inclination of the screens 121-123. Control apparatuses 134-136 correspond, respectively, to the mechanisms 131-133. A control system 127 with suitable control apparatus (e.g. like the apparatus 70, FIG. 2B) communicates with the control apparatuses 131-133 and also with individual level sensors 124, 125, and 126. Each sensor 124-126 senses the level of drilling fluid 128 at, respectively, locations 137, 138 and 139. The control apparatus in one aspect is pre-programmed to maintain the drilling fluid levels at locations 137-139 at predetermined levels by monitoring the levels with the sensors 124-126 and adjusting the depths at those locations by pivoting the screens 121-123 by pivoting the individual tilting mechanisms 131-133. Any one or any two of the sensors 124-126 may be deleted and the corresponding tilting mechanism(s) and associated control(s) may be deleted.

FIG. 5A shows a prior art shale shaker with a pivot point at or near a mid-point of a shaker basket ("fine screening basket"). FIG. 5B shows a shale shaker 150 according to the present invention which has a basket pivot point 161 at or near one end of a basket 160. The shaker 150 has a back tank 151 from which material to be treated flows into a scalping basket 170 which removes massive and/or gross size pieces and particles and from which material then flows down onto screens 153-156. Height adjustment apparatus 158 (controlled as is any adjustment apparatus disclosed herein) selectively pivots the basket 160 about the point 161. Vibrating apparatus 157 vibrates the basket 160. Material passing through the screens flows into a receptacle 159 on a skid 165.

In one aspect the present invention provides a separator like that disclosed in U.S. Pat. No. 4,082,657 (incorporated fully herein for all purposes); but with improvements according to the present invention. As shown in FIG. 6 a separating device D according to the present invention for separating particulate from a fluid stream includes a frame 210 having mounted thereon an inlet tank 211 for receiving a fluid to be filtered or cleaned. Screen units 214a and 214b are mounted in cascaded alignment on the frame 210 by vibration mount means generally designated as 215a and 215b which each includes a vibrating means 216 mounted therewith for vibrating screen units 214a and 214b simultaneously.

The frame 210 includes first and second side members 210a (only one is illustrated) which are connected together by a front end connecting rod 210b and a rear connecting rod 210c. The front and rear connecting rods 210b and 210c cooperate with the side members such as 210a to provide a generally rectangular form having an opening therethrough through which the cleaned fluid stream may pass to a recovery area positioned therebelow. The side frame members such as 210a may be I-beams or other suitable frame members for supporting the structure to be disclosed here.

The inlet tank 211 has connected therewith an inlet line 211b for receiving the fluids to be cleaned. In one aspect the screen unit 214a and 214b includes a metal frame with screening material thereon.

The screen units are releasably mounted in screen unit mounting assembly supports 222 and 222a.

Each screen unit is supported by four adjustable posts 235 (two shown on each side of each screen; e.g. as described in U.S. Pat. No. 4,082,657). Optionally, interposed between the screen units' supports 222, 222a are spring mechanisms 233 and 234. Vibratory apparatuses 216 vibrate the screen units.

A sensor 240 on a support 240a senses the depth of fluid on the screen unit 214a and a sensor 242 on a support 242a senses the depth of fluid on the screen unit 214b. A control apparatus 250 (like any disclosed herein) is in signal communication with the sensors 240, 242 via cables 243, 244. The control apparatus 250 is also in communication via cables 247, 248 with control apparatuses 245, 246 which control the height-adjustable posts 235. The control apparatuses 250, 245, 246 may be like any control apparatus and/or computer apparatus described above.

Figure 7:
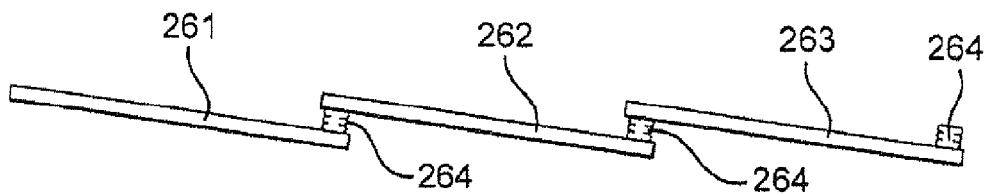
FIG. 7 is a side schematic view of screen assemblies according to the present invention.

FIG. 7 shows three screen assemblies 261, 262, 263 according to the present invention which may be used in any system according to the present invention in which screen assemblies, screens, or individual screen supports are tilted or moved to adjust fluid depth at a location on a screen assembly or screen. Each screen assembly 261-263 has an expandable member 264 (e.g., but not limited to, an expandable bellows or seal) which insures that sealing contact is maintained between adjacent screen assemblies (or between a screen assembly end and a member on a basket against which a screen assembly end abuts). In one aspect as shown the expandable members 264 are bellows seals; but it is within the scope of this invention for any suitable seal or sealing material to be used which can expand and contract sufficiently to maintain a seal between adjacent screens.

Figure 8A:
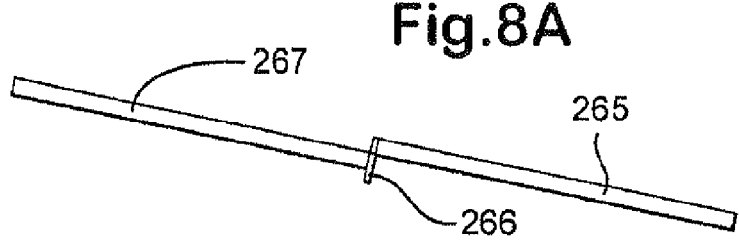
FIG. 8A is a side schematic view of a screen assembly according to the present invention.
Figure 8B:
FIG. 8B is an end view of a screen assembly of FIG. 8A.
Figure 8C:
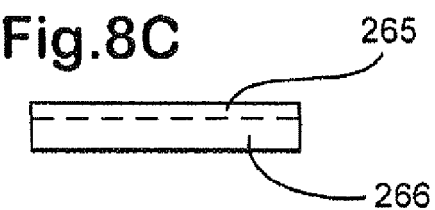
FIG. 8C is an end view of a screen assembly of FIG. 8A.

FIGS. 8A-8C illustrate a screen assembly 265 according to the present invention which has a flexible end seal 266 which seals against an end of an adjacent screen 267. The seal 266 is sufficiently wide that it will seal against the end of the screen assembly 267 when the inclination of the screen assembly 267 is changed (and/or when the inclination of the screen assembly 265 is changed (e.g. in response to a signal from a fluid level sensor above either or both screen assemblies 265, 267. Optionally, the screen assembly 267 may also have an end seal 264.

Figure 9:
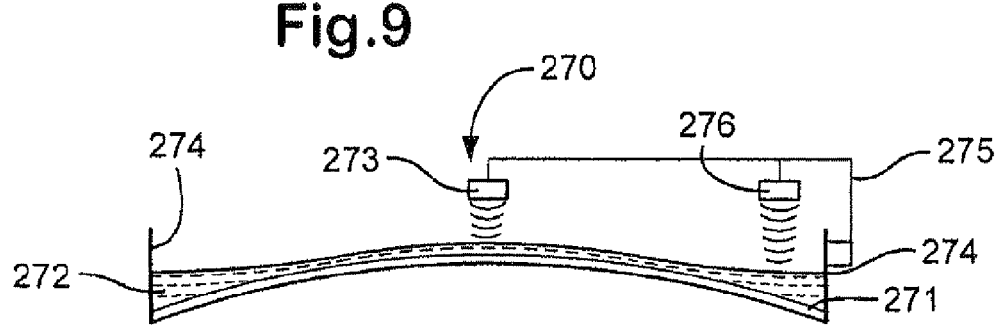
FIG. 9 is an end view of a system according to the present invention.

FIG. 9 shows a vibratory separator 270 according to the present invention with walls 274 and a screen assembly 271 in a crowned configuration with fluid 272 to be treated thereon. A fluid level sensor 273 connected to a wall 274 of the separator 270 with a connector 275 senses fluid level near a center point of the screen assembly 271 (as viewed in FIG. 9). A fluid level sensor 276 senses fluid level near the wall 274. It is within the scope of the present invention to locate one or more fluid sensors at any point above a screen assembly in a vibratory separator or shaker. Optionally, either sensor 273 or 276 may be deleted.

FIGS. 10A-10D show a shale shaker 300 according to the present invention which is like a King Cobra Shale Shaker commercially available from Varco International, Inc., but which has improvements according to the present invention. The shale shaker 300 has a skid or base 302 on which is a basket 306 which is vibrated by vibration apparatus 304. From a weir tank 308 fluid, e.g. drilling fluid with drilled cuttings and debris therein, flows onto a first screen 310 which is supported by a screen support 310a connected to the basket 306. Part of the fluid then flows onto a second screen 311 supported by a screen support 311a connected to the basket 306 and then part of the fluid flows onto a last screen 312 supported by a screen support 312a connected to the basket 306. Part of the fluid flows off an exit end 312b of the screen 312 onto an optional lower screen 313 which is supported by a screen support 313a connected to the basket 306.

The fluid forms a pool 315 above the screens 310-312. Depending on the fluid, on the fluid viscosity, on the fluid's solids content, on the rate of fluid flow, and the through-put of the screens, a beach 316 is created at the exit end 312b of the screen 312. It is desirable to optimize the extent of this beach 316 and, in certain aspects, it is preferred that the beach, as viewed in FIG. 10B, be sufficiently large that no fluid flows untreated off the last screen 312.

An ultrasonic transducer sensor measurement apparatus 320 is connected to the basket 306 (e.g. to a motor tube 309 and/or such a sensor apparatus 320b is connected to a weir tank 308) and is, optionally, positioned above the pool 315, e.g. over an entry end 310b of the screen 310 or over an entry end 312c of the screen 312. Such locations for the apparatus 320 provide measurement at locations providing the greatest range of pool depth and therefore, the greatest range for adjusting beach extent; i.e., such a location insures that the apparatuses 320a and/or 320b will have a sensor-to-pool-surface distance to measure since in most cases there will be fluid at some depth at this point beneath the apparatus or apparatuses 320. The apparatuses 320a and/or 320b are in communication with a control apparatus 330. The sensor apparatuses generates a signal indicative of sensor-to-pool distance which indicates depth of the pool 315 beneath the sensor apparatus(es). Optionally, either the sensor 320a or the sensor 320b is deleted.

The control apparatus 330 (e.g. a computer, PLC, PID controller, or other device with programmable media) selectively controls a control valve 336 which allows hydraulic fluid under pressure from a reservoir 338 pumped by an hydraulic pump 337 to move to and from two hydraulic cylinder apparatuses (one shown, FIG. 10A) which are on opposite sides of the shaker 300. A flow control valve 332 controls the flow of fluid into/out of the pistons and adjusts the rate of stroke in the cylinder apparatuses 333, 334 and a flow control valve 335 limits the flow of fluid to/from the pistons and adjusts the rate of stroke out of the cylinder apparatuses 333, 334. An hydraulic cylinder apparatus 350 has an extendable piston 351 pivotably connected to a pivot plate 353 at a pivot point 365. The plate 353 is pivotably connected at a pivot point 357 to the basket 306. A housing 350 of the apparatus 334 is secured to a mount 359 which is pivotably connected to the basket 306. A link 355 is pivotably connected to the plate 353 at a pivot point 366 and the link 355 is connected to a link 356 that is pivotably connected at a pivot point 354 to a basket support 340. The basket support 340 is supported by the hydraulic cylinder apparatuses and by bases 341. Shafts 367 of the basket supports 340 are pivotably mounted on the bases 341. A scale 339 indicates the angle of the support 340 with respect to horizontal (i.e. assuming the skid or base 302 is level). The support 340 is connected to springs 346, 343 which support basket mounts 345 and 342, respectively; and similar springs and mounts are on the other side of the basket.

In another aspect the plate 365 is deleted and the hydraulic cylinder apparatuses are oriented almost vertically and the hydraulic cylinder apparatuses' pistons 351 are pivotably connected to the basket support 340 for selectively raising and lowering it to adjust beach extent.

Figure 10A:
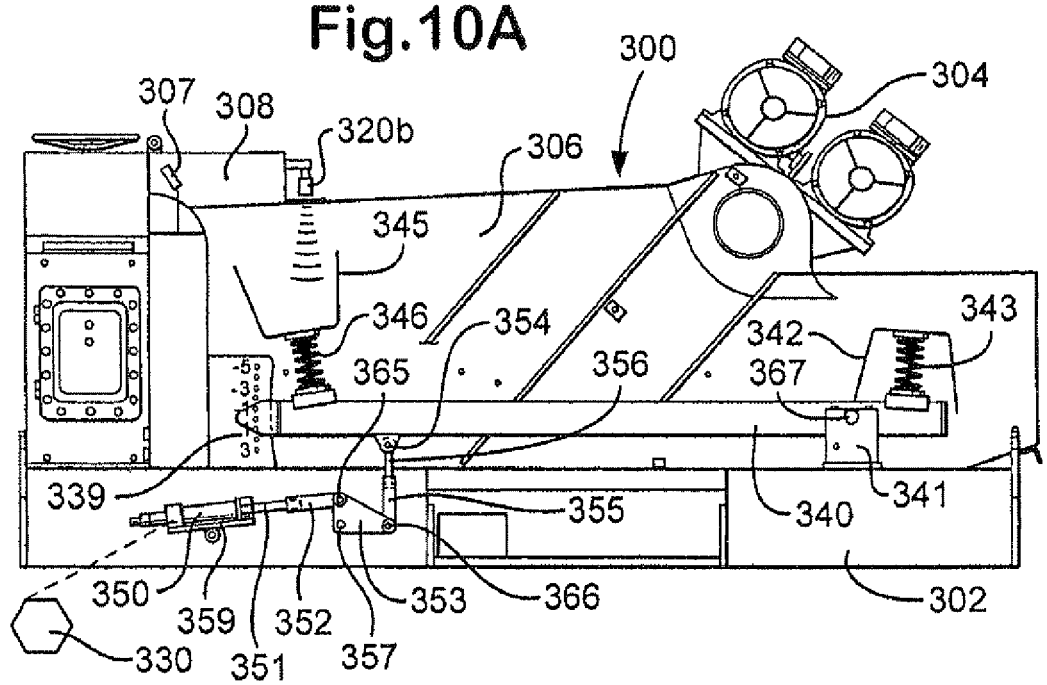
FIG. 10A is a side view of a shale shaker according to the present invention.
Figure 10B:
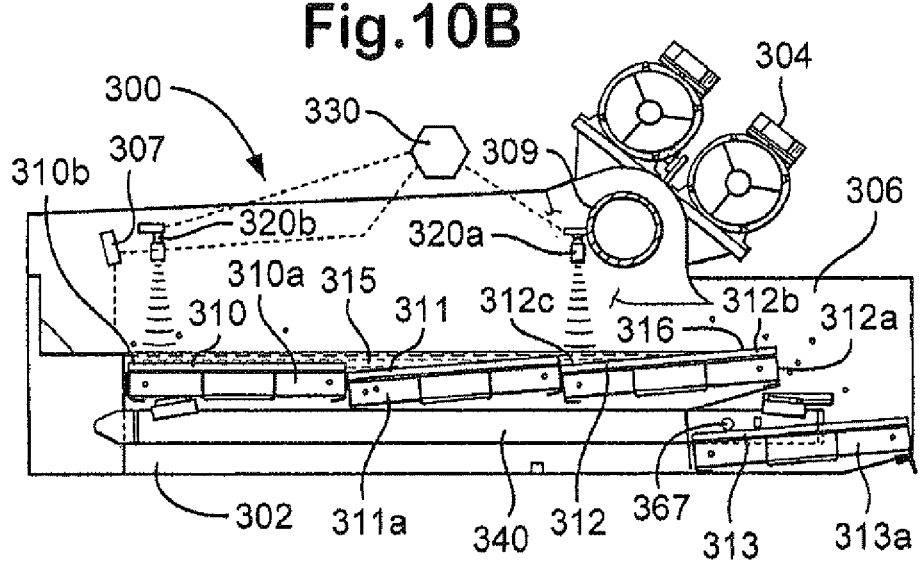
FIG. 10B is a side cross-section view of the shaker of FIG. 10A.
Figure 10C:
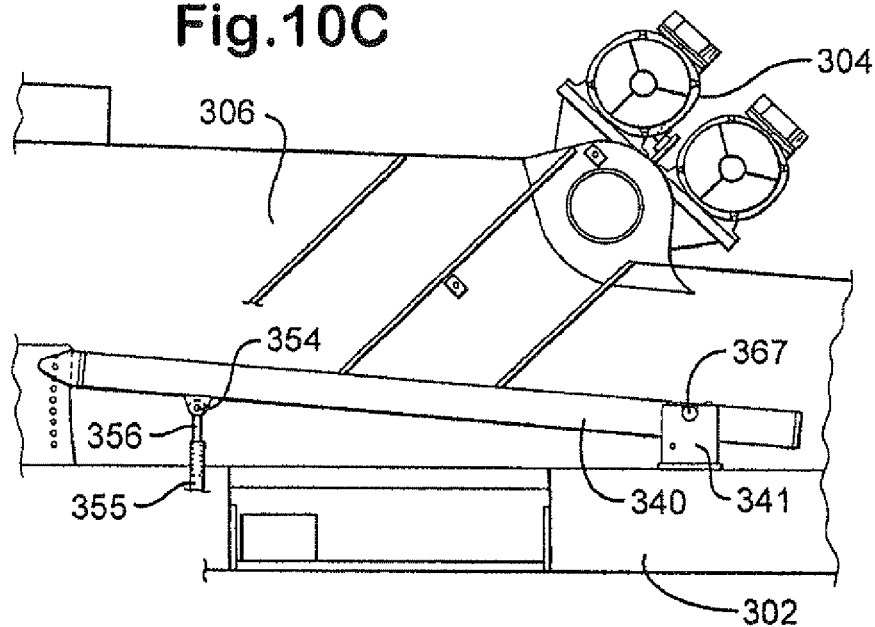
FIG. 10C is a side cross-section view which shows the shaker of FIG. 10A with its basket tilted.
Figure 10D:
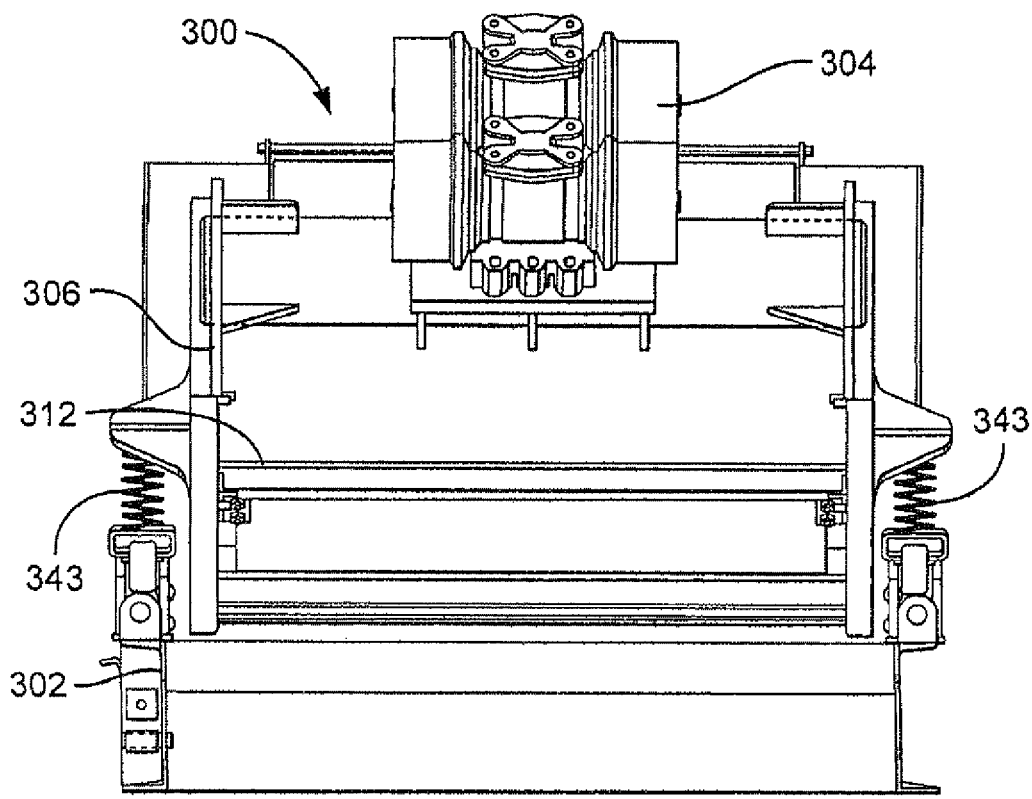
FIG. 10D is a front end view of the shaker of FIG. 10A.

FIG. 10C shows the basket 306 tilted as compared to the basket 306 as shown in FIG. 10A.

In one aspect a vibratory separator or shale shaker according to the present invention may employ a material flow sensor which produces a signal indicative of the presence or absence of material flowing onto screen apparatus; e.g., but not limited to, drilling fluid with drilled solids flowing onto screen apparatus of a shale shaker. Such an indication is valuable in insuring that, upon flow commencing again following cessation of material flow which is common when drilling is stopped, a screen or a basket is not inclined at such an angle that a relatively low depth pool is formed resulting in the loss of untreated drilling fluid flowing off a screen exit end. By adjusting screen or basket angle so that flow recommencement is accommodated, a pool is formed of sufficient depth and extent that all or the great majority of material is treated and an optional amount of drilling fluid flows through the screen and is recovered.

Optionally, a shaker 300 as shown in FIGS. 10A and 10B (with or without a sensor or sensors like the sensor 320a and/or 320b) has a material flow switch device 307 connected to vibratory separator adjacent a material input tank like the tank 308 for sensing when material is flowing. The device 307 may be any suitable known flow sensor apparatus, including, but not limited to paddle switch systems, including, but not limited to, FS-550 Series paddle switches from Gems Sensors Co.

The device 307 is in communication with and controlled by the controller 330 and, in one aspect, signals from the device 307 override signals from sensors like the sensors 320a and 320b so that the controller 330 knows that material flow has ceased (rather than an indication from the sensors 320a, 320b that the pool is very shallow). In response to signals from the device 307 the controller 330 can activate the apparatus for adjusting basket angle.

Once material flow into the basket is again proceeding, the controller 330 (acting upon signals from the sensor 320a and/or the sensor 320b) adjusts the basket angle to maintain the desired beach extent. Although one particular flow sensor has been mentioned, it is to be understood that any suitable known flow sensor device or system may be used, including, but not limited to, ultrasonic transducer systems.

The controller 330 may be any suitable known commercially available controller apparatus, including, but not limited to computerized systems, digital signal processor systems, programmable logic controller systems, and/or microprocessor systems. One suitable sensor apparatus and associated control system is the model XPS-10 and Hydro Ranger 200 from Siemens.

Figure 10E:
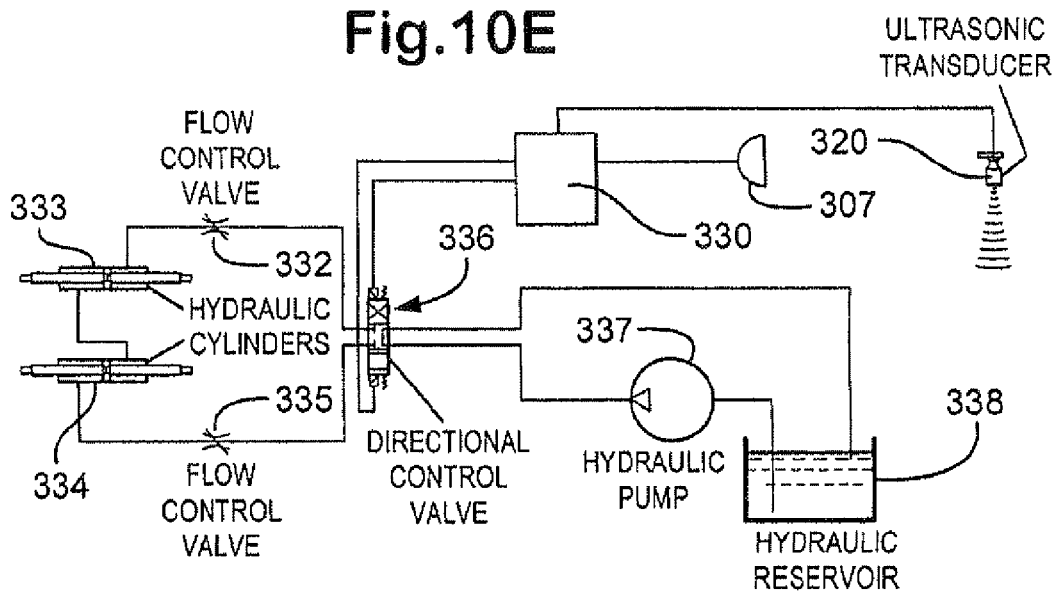
FIG. 10E is a schematic diagram of a control apparatus for the shaker of FIG. 10A.
Figure 10F:
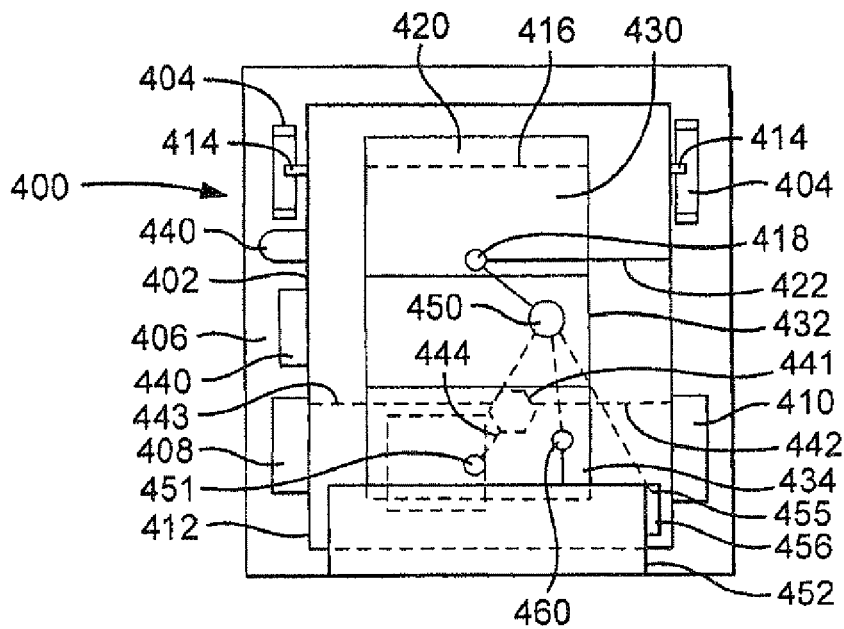
FIG. 10F is a top schematic view of a vibratory separator according to the present invention.

FIG. 10F shows schematically a vibratory separator or shake shaker 400 according to the present invention which has a screen-supporting basket 402 with pivot members 414 pivotally mounted on supports 404 on a skid or base 406. Adjustment apparatuses 408, 410 on either side of the basket 402 (like any adjustment apparatus described herein) raise and lower an end 412 of the basket 402, pivoting it about the pivot members 414. In one aspect a rear line 416 of a beach area 420 of a screen 430 supported in the basket 402 coincides with a line between the pivot members 414.

A sensor 418 (like any sensor disclosed herein, including but not limited to those in FIGS. 1-10A) is positioned above a fluid entry end of the screen 430 on a connecting member 422 connected to the basket 402. A sensor 451 (like any sensor herein) is positioned above a fluid entry end of the screen 434 and may be conveniently connected to a bar or beam which is connected to the tank 450 and/or to the basket 402. Material flows from a screen 432 to the screen 430 and from a screen 434 to the screen 432. Any suitable tank 452 and/or fluid introduction apparatus may be used. Vibrating apparatus 440 vibrates the basket 402.

A power apparatus 441 connected to the shaker 400 powers the adjustment apparatuses 408, 410 and may be located at any suitable location on the shaker 400 including, but not limited to, on the basket 402 or on the skid 406. Optionally the power apparatus 441 is any such apparatus or system disclosed herein. In one aspect the power apparatus 441 includes an hydraulic pump in fluid communication with an hydraulic fluid reservoir 440 via a line 444 and the apparatuses 408, 410 are hydraulically-powered apparatus in fluid communication with the pump via lines 442, 443. Control apparatus 450 (as any disclosed herein) controls the apparatus 441, the sensor 418, a sensor 460, a controller 456, and/or the sensor 451. Optionally, a material flow sensor 460 connected to the tank 452 (or at any suitable location in the separator 400) which is like the sensor 307, FIG. 10A, senses the presence or absence of material flowing from the tank 452 onto the screen 434. The sensor 460 is in communication with the control apparatus 450 and, in response to signals from the sensor 460, the control apparatus 450 adjusts the basket angle to accommodate material flow and to adjust for recommencement of flow following flow cessation. Optionally, a flow rate controller 456 controls the amount of fluid introduced onto the screen 434 from the weir tank 452 and a control switch 455 of the controller 456 is in communication with the control apparatus 450.

It is within the scope of this invention for the apparatuses 408, 410 to be located at any desirable effective location with respect to the basket, as may be the case with any adjustment apparatus disclosed herein.

The present invention, therefore, in some and not necessarily all embodiments, provides a vibratory separator having a screen support or basket for supporting screen apparatus for treating material introduced into the vibratory separator, the basket on a base and pivotable with respect thereto, vibratory apparatus connected to the basket for vibrating the basket, screen apparatus supported by the basket, the material forming a pool on the screen apparatus, and a beach on the screen apparatus adjacent the pool, measurement sensor apparatus connected to the vibratory separator and positioned above the screen apparatus for measuring a distance from the measurement sensor apparatus to a top surface of the pool, the measurement sensor apparatus including a signal production portion for producing signals indicative of said distance and for transmitting said signals, a control system for controlling and in communication with the measurement sensor apparatus for receiving signals from the measurement sensor apparatus indicative of said distance and for processing said signals to calculate a pool depth corresponding to said distance, and angle adjustment apparatus connected to the basket and controlled by the control system for adjusting angle of the basket, thereby adjusting extent of the beach. Such a vibratory separator may have one or some, in any possible combination, of the following: wherein the vibratory separator is a shale shaker and the material is drilling fluid with drilled cuttings therein; wherein the screen apparatus includes at least an exit screen with an exit end from which material separated by the screen apparatus flows off the screen apparatus for discharge from the vibratory separator, wherein the basket is at an angle such that the beach is formed adjacent an edge of the pool adjacent said exit end, and wherein the control system controls extent of the beach; wherein the control system controls extent of the beach to maintain the beach on the exit screen; wherein the screen apparatus is a plurality of screens placed adjacent each other in the basket, each screen with an associated screen support connected to the basket; wherein the angle adjustment apparatus includes a basket support pivotably mounted to the base and moving apparatus for selectively moving the basket up and down; wherein the basket has a fluid entry end and a fluid exit end and wherein the basket is pivotably mounted adjacent the fluid exit end, and wherein the angle adjustment apparatus moves the basket's fluid entry end; wherein the moving apparatus includes hydraulic cylinder apparatus for moving the basket; wherein the hydraulic cylinder apparatus includes two hydraulically powered piston apparatuses, each on a side of the basket for moving the basket; wherein each hydraulically powered piston apparatus is pivotably interconnected with corresponding linkage apparatus, the linkage apparatus pivotably connected to the basket support adjacent the fluid entry end of the basket; wherein the measurement sensor apparatus is ultrasonic apparatus; wherein the ultrasonic apparatus is at least one ultrasonic apparatus; wherein the measurement sensor apparatus is a plurality of distance sensor apparatuses; wherein the plurality of sensor apparatuses includes a first ultrasonic sensor apparatus spaced-apart from a second ultrasonic sensor apparatus, the first ultrasonic sensor apparatus above one side of the screen apparatus and the second ultrasonic sensor apparatus above an opposite side of the screen apparatus; wherein the measurement sensor apparatus is from the group consisting of electrical, optical, electromagnetic, ultrasonic, acoustic, and pulse-echo apparatus; wherein a rear boundary of the beach is along a rear beach line and the basket is pivotably connected to the base beneath the rear beach line; and/or wherein the angle adjustment apparatus is powered by power apparatus.

FIGS. 11A-11D show a shale shaker 500 according to the present invention which is like a King Cobra Shale Shaker commercially available from Varco International, Inc., but which has improvements according to the present invention. The shale shaker 500 has a skid or base 502 on which is a basket 506 which is vibrated by vibration apparatus 504. From a tank 508 fluid, e.g. drilling fluid with drilled cuttings and debris therein, flows onto a first screen 510 which is supported by a screen support 510a connected to the basket 506. Part of the fluid then flows onto a second screen 511 supported by a screen support 511a connected to the basket 506 and then part of the fluid flows onto a last screen 512 supported by a screen support 512a connected to the basket 506. Part of the fluid flows off an exit end 512b of the screen 512 onto an optional lower screen 513 which is supported by a screen support 513a connected to the basket 506. Fluid flows into a lower sump or receptacle 503.

The fluid forms a pool 515 above the screens 510-512. A beach 516 is at the exit end 512b of the screen 512. It is desirable to control and/or optimize the extent of this beach 516 and, in certain aspects, it is preferred that the beach, as viewed in FIG. 11B, be sufficiently large that no fluid flows untreated off the last screen 512.

An ultrasonic transducer sensor measurement apparatus 520 is connected to the shale shaker, e.g. to a skid, base, tank or as shown to the basket 506 and is, optionally, positioned above the pool 515, e.g. over an entry end 510b of the screen 510. The apparatus 520 is in communication with a control apparatus 530 (e.g., but not limited to, a computer). The sensor apparatus generates a signal indicative of sensor-to-pool distance which indicates depth of the pool 515 beneath the sensor apparatus(es).

The control apparatus 530 selectively controls a bladder apparatus 536 which selectively raises and lowers a rocker arm assembly 540 which, in turn, raises and lowers the basket 506 to which the rocker arm assembly 540 is connected. Optionally the rocker arm assembly's angle with respect to the horizontal is selectively adjustable by a mechanical mechanism, e.g. any suitable known mechanical mechanism for moving the rocker arm assembly up and down, e.g., but not limited to, a screw mechanism or an hydraulic or pneumatic piston device.

A top part 536a of the bladder apparatus 536 contacts a lower surface 541a of a plate 541 of the rocker arm assembly 540. The bladder apparatus 536 inflates to raise the rocker arm assembly 540 and deflates to lower it. A gas, e.g. air, or a liquid, e.g. a water-glycol mixture, can be used to inflate the bladder apparatus 536. The control apparatus 530 controls the bladder apparatus 536. It is within the scope of the present invention to use, instead of the air bladder apparatus 536, to move the rocker arm assembly up and down: a linear actuator device or other electronically-operated device; a hydraulically-powered device, e.g. an hydraulic cylinder system; or an air-over-hydraulic apparatus, e.g. a system with a liquid-filled tank with air pressure. In one particular embodiment the air bladder apparatus 536 is a commercially available Model 20-2 from Firestone Company. Although only one air bladder apparatus 536 is shown, it is within the scope of the present invention to use two such apparatuses, one on each side of the basket 506.

The rocker arm assembly 540 has pivot shafts 542 which pivot in corresponding recesses 543 of mounts 544 on the skid 502. The rocker arm assembly 540 has two side members 545 interconnected with an end member 546. Spring mounts 54, welded to the basket 506, support springs 548 which are connected to the brackets 549.

An optional ultrasonic sensor apparatus 522, in communication with the control apparatus 530, senses whether or not there is fluid flow from the tank 508 to the pool 515. If a "no-flow" signal is generated by the apparatus 522 and sent to the control apparatus 530, then the basket is tilted to its maximum uphill angle in anticipation of a next rush of mud. An optional ultrasonic sensor apparatus 524 senses the location (height) of the plate 541, and produces a signal indicative of this location, which is a signal whose value corresponds to the angle of the rocker arm assembly 540 and, therefore, to the angle of the basket 506 (and which correlates with signal values from the apparatus 522). In one aspect, the control apparatus 530 computes the basket angle based on the signal from the ultrasonic sensor apparatus 524 and correlates this computed angle with the value for the pool depth based on the signal from the ultrasonic sensor apparatus 520. If these two values correlate, this indicates the system is working properly. If there is a discrepancy between the values (from the ultrasonic sensors) (e.g. a discrepancy caused by high flow, downhill basket orientation or low fluid level) this indicates a measurement problem and the control apparatus 530 then adjusts the basket to a fully uphill angle until there is no such discrepancy.

Figure 11A:
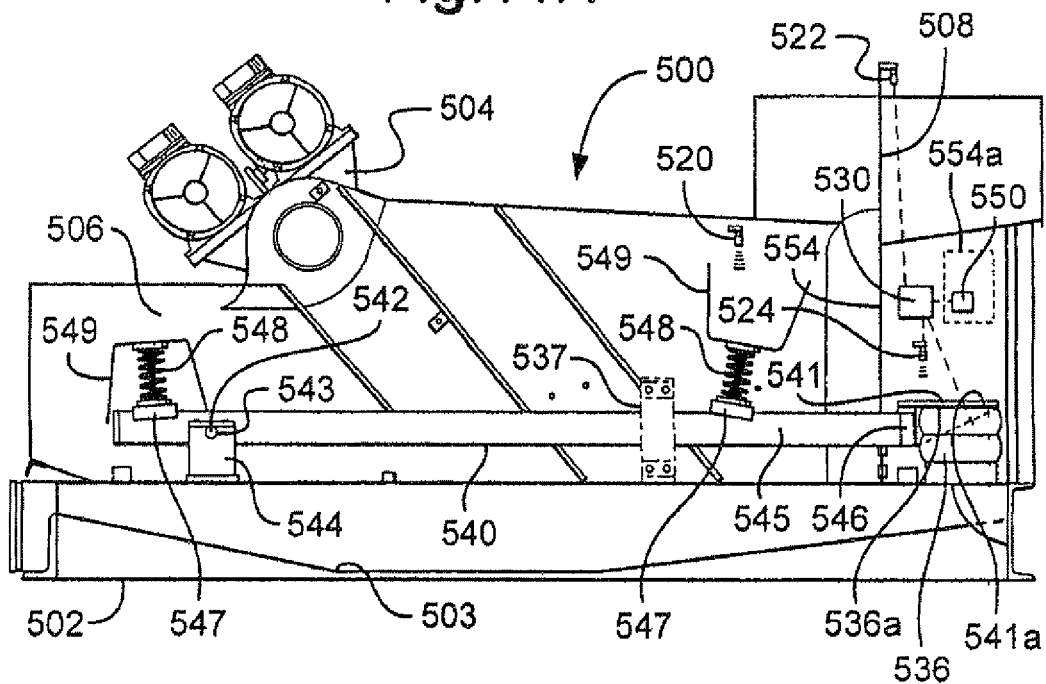
FIG. 11A is a side end view of a shale shaker according to the present invention.
Figure 11B:
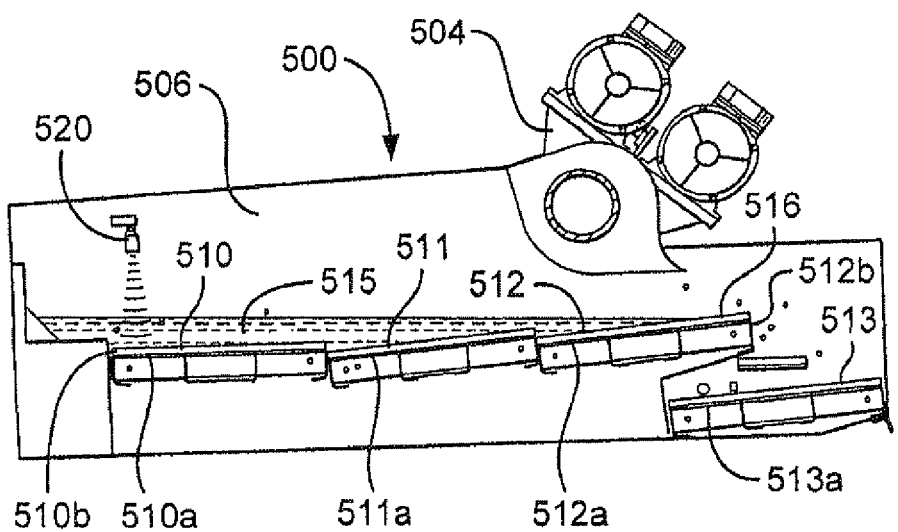
FIG. 11B is a partial cross-section view of the shale shaker of FIG. 11A.
Figure 11C:
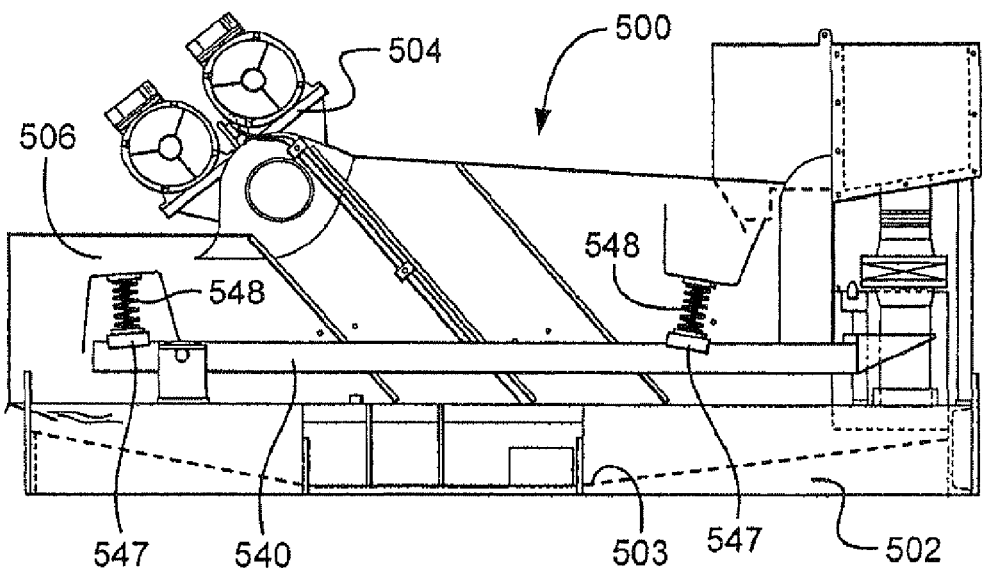
FIG. 11C is a partial cross-section view of the shale shaker of FIG. 11A.
Figure 11D:
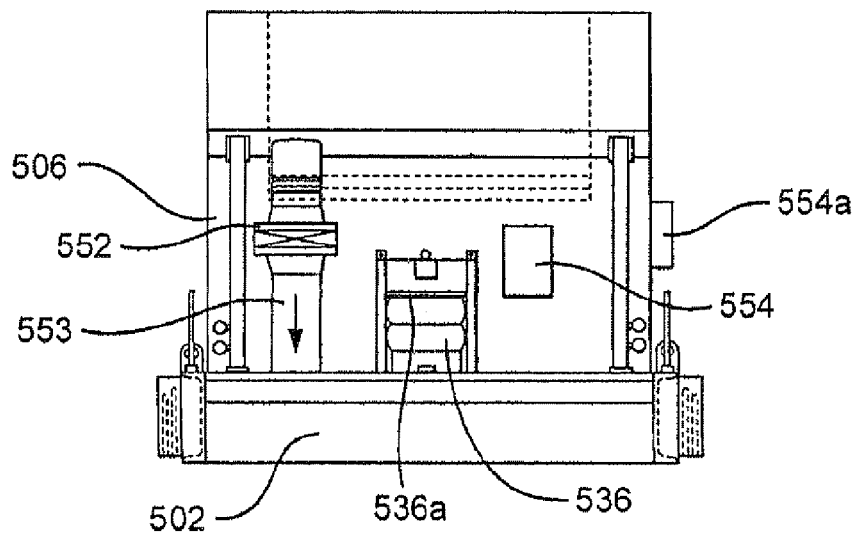
FIG. 11D is an end view of the shale shaker of FIG. 11A.
Figure 12A:
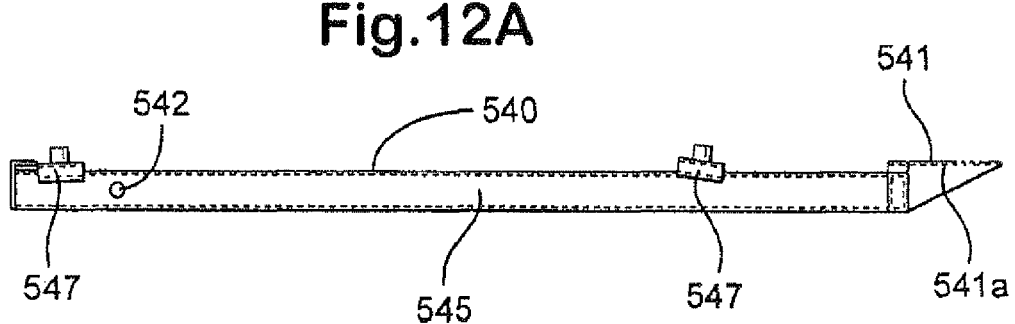
FIG. 12A is a side view of a rocker arm assembly of the shale shaker of FIG. 11A.
Figure 12B:
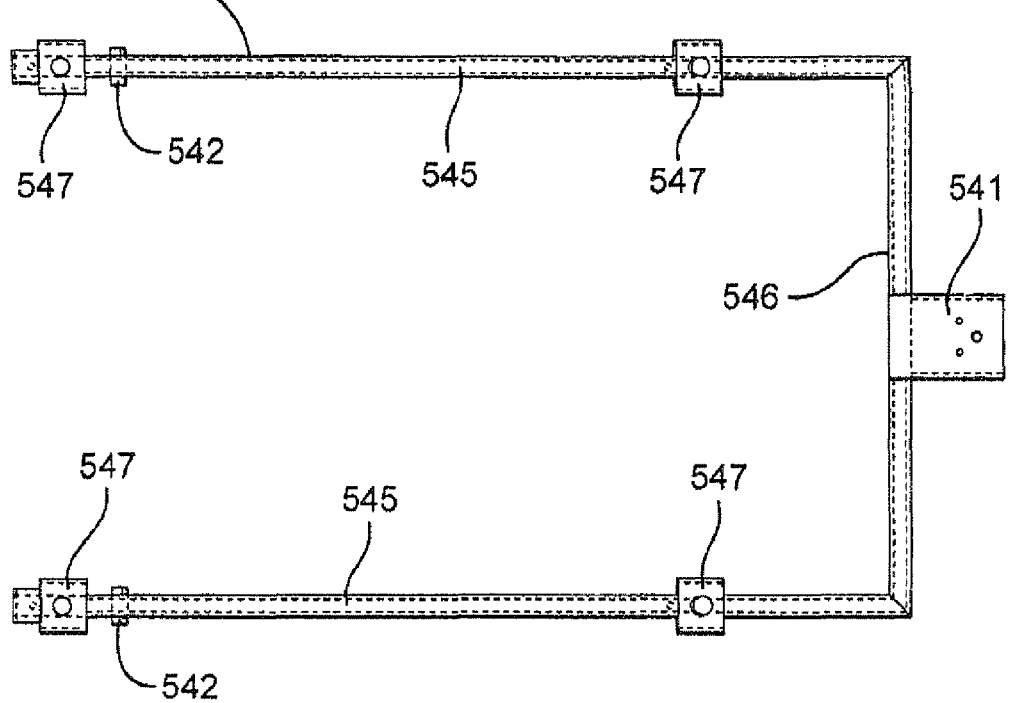
FIG. 12B is a top view of the rocker arm assembly of FIG. 12A.

Optionally, the shale shaker 500 includes a variable frequency drive 550 (optionally in an enclosure rated for a Class 1, Division 1, or Zone 1 hazardous area) whose functions include varying the rpm's of the vibration apparatus 504 and thus varying the G-forces (acceleration) imparted to the basket 506 by the vibration apparatus 504; and changing the direction of rotation of the vibration apparatus 504 thereby changing the motion of the basket 506, e.g. from linear motion to elliptical motion. In one particular aspect the vibration apparatus 504 includes a Model VMX 18-8300-80 vibrator or a Model VMX 18-8300-110 from Martin Engineering which have dual motion motors with the capability of changing an imbalance of weights based on rotation direction to change motion, e.g. from linear to elliptical (or vice versa). The control apparatus 530, and/or the ultrasonic sensor apparatus 524 and/or the apparatus 550 may be located at any convenient location on the shale shaker 500. As shown in FIG. 11A they are protected within an enclosure 554 formed of parts of the tank made of resilient material, e.g. metal or composite. Alternatively the drive 550 is located in a separate enclosure 554a (shown by dotted lines).

Apparatus 552 provides a channel 553 for fluid in the tank 508 to bypass the screens 510-512 and flow directly into the receptacle 503.

Figure 13:
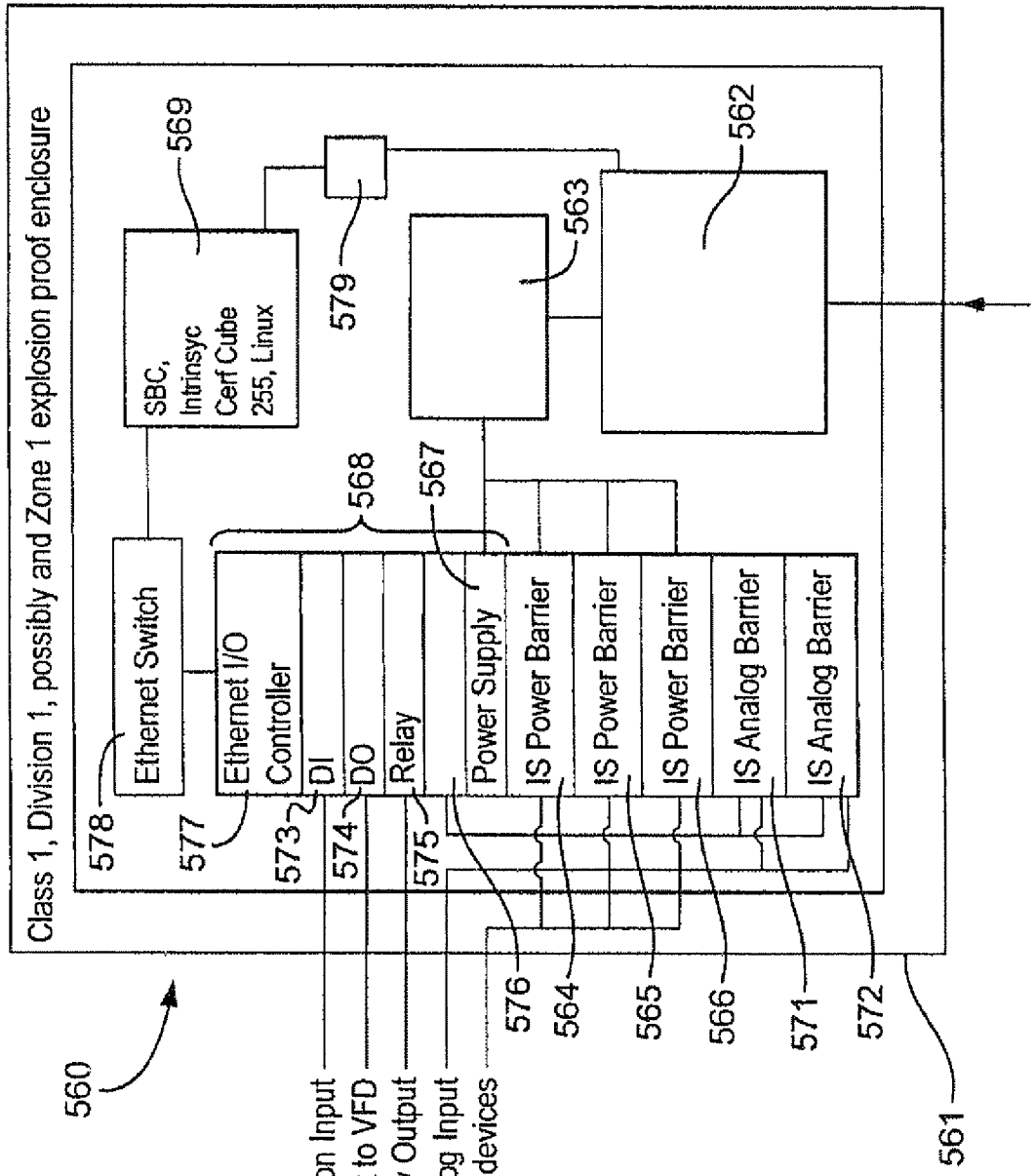
FIG. 13 is a schematic view of a control system according to the present invention for a vibratory separator according to the present invention.

FIG. 13 shows a computer 560 which can be used, in one aspect, for the control apparatus 530. Optionally, the computer 560 is positioned within an enclosure 561 which is suitable for installation in a Class 1, Division 1 or Zone 1, hazardous area. AC Power is input to an AC to DC transformer 562 which provides power to a power supply 579 and to a power supply 563 (which in turn supplies power to barrier devices 564, 565, and 566). The power supply 563 provides power, e.g. 24 VDC, to a power supply 567 of an Input/Output device 568. The power supply 579 provides power (e.g. VDC) to a single board computer 569 which runs a control program and reads the I/O device, and sends control signals to electrically actuated valves (e.g. 670, 671, FIG. 14) to control the shaker's basket angle. The power barrier devices 564-566 provide power, e.g. 24 VDC, to various intrinsically safe ("IS") devices, e.g. the ultrasonic sensor apparatuses. The computer 569 can be programmed to provide a basket angle reset to reset a value of the ultrasonic sensor apparatuses' measurement of a "home" position of the basket (e.g. a maximum uphill angle).

Analog barrier devices 571 and 572 limit the power of signals on analog devices, i.e. the ultrasonic sensors. Supply 567 provides power to the devices 573-576. A digital input card 573 receives digital input signals from other devices, e.g. the VFD and user push buttons. A digital output card 574 outputs digital signals to other devices, e.g. to the VFD. A relay card 575 provides switch openings and closures for sending control signals from the computer to other devices, e.g. control valves. An analog input card 576 receives analog signals from other devices; e.g. from the ultrasonic sensor apparatuses.

Optionally the Input/Output device 568 may have a switch or connection 578 for communication with a system (e.g. a computer or computer system) apart from and/or remote from a shale shaker or vibratory separator, e.g., but not limited to an Ethernet Input/Output Controller which, in turn, provides to connection to other systems, e.g. the Internet.

Figure 14:
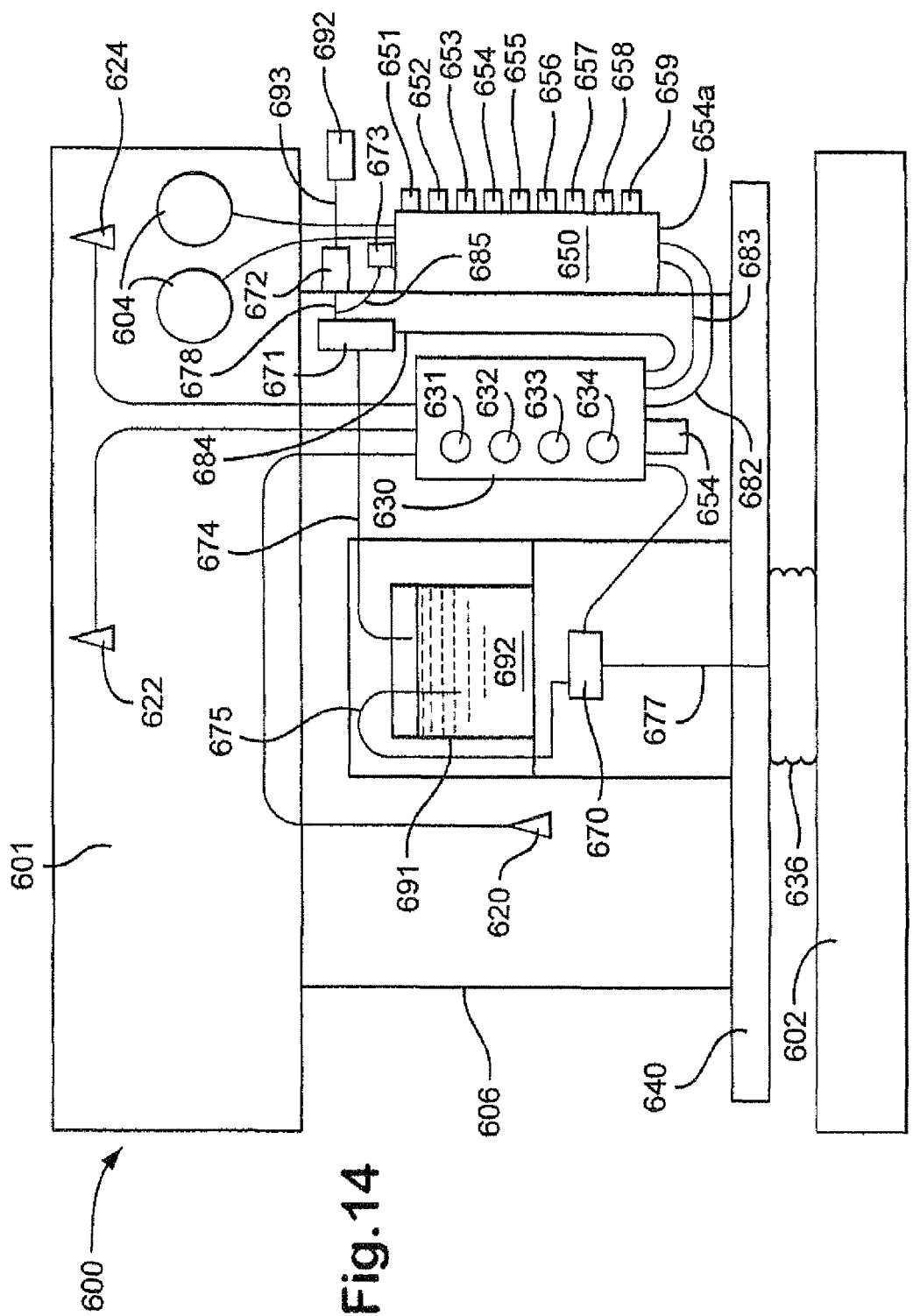
FIG. 14 is a schematic view of a system according to the present invention.

FIG. 14 illustrates schematically a system 600 according to the present invention which is like the systems shown in FIGS. 11A-13. A shaker 601 (e.g. like the shaker 500 or any shaker disclosed or referred to herein) has a rocker arm assembly 640 (e.g. like the assembly 540) which can be raised and lowered by a bladder apparatus 636 (e.g. like the apparatus 536) which is mounted on a skid 602. Vibratory motors 604 (e.g. like the motors 504) vibrate a basket 606 (e.g. like the basket 506).

Ultrasonic sensor apparatuses 620, 622, 624 (e.g. like the apparatuses 520, 522 524) provide signals to a control system 630 (e.g. like the control apparatus 530) for sensing system parameters and for controlling the rocker arm assembly to adjust basket angle and to control the motors 604. The control apparatus 630 is housed within an enclosure 654 (e.g. like the enclosure 554).

An optional variable frequency drive system ("VFD") 650 (e.g. like the system 550) in an enclosure 654a (e.g. like the enclosure 554a) is in communication with the system 630 and provides control of the motors 604 (i.e. control of G forces on the screens and/or control of type of motion) and control of the basket angle. In one particular aspect the system 630 has manually-operable push buttons 631-634. The buttons 631-633 provide for calibration of the ultrasonic sensor apparatuses 620, 622, 624, respectively. The button 634 is a system re-set button. In one aspect the buttons are tied to a digital input card in the enclosure.

The VFD 650 has manually-operable push buttons 651-656 and 658-659 which function as follows:
652 Off
653 Switch between linear/elliptical motor motion
654 Power to system 630
655 Switch between automatic and manual mode
656 System 650 re-set
658 Move basket up (increase basket angle)
659 Move basket down (decrease basket angle)

Valves 670 and 671 are electronically-operated valves. Power is provided to the valve 670 via a power line 681 from the system 630 and to the valve 671 via a power line 684. The basket is raised or lowered by selectively opening or closing the valve 670 which permits fluid 692 (e.g. a water-glycol mixture) to flow to or from the bladder apparatus 636 from a controlled pressure reservoir 691 in a line 675 and to or from the valve 670 in a line 677.

The valve 671 controls air flow between an air inlet 672 and the reservoir 691. Air under pressure from a source 692 flows in a line 693 to the air inlet 672 and then via the lines 678 and 674 to and from the reservoir 691 to move the fluid 692 for raising and lowering of the basket to adjust basket angle.

A cooler 673, e.g. a vortex cooler apparatus in fluid communication with the air inlet 672 via lines 678 and 685, cools the interior of the enclosure 654a.

Figure 15:
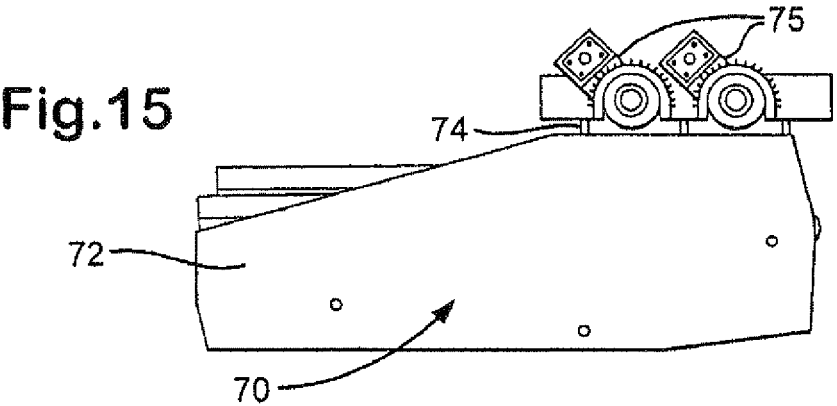
FIG. 15 is a side view of a shale shaker according to the present invention.
Figure 16:
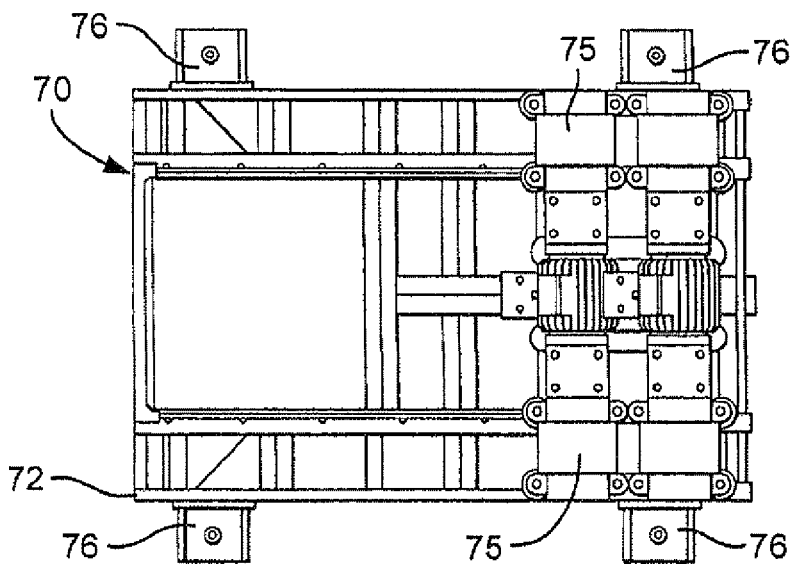
FIG. 16 is a top view of the shale shaker of FIG. 15.
Figure 17:
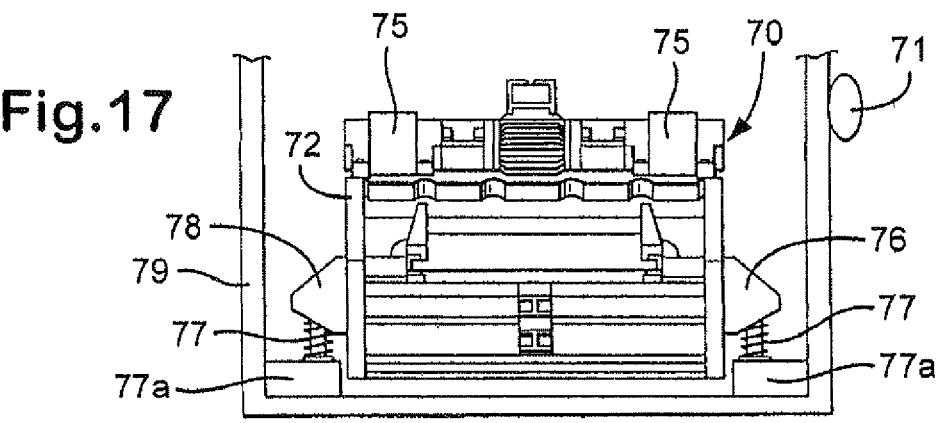
FIG. 17 is an end view of the shale shaker of FIG. 15.

FIGS. 15-17 show a shale shaker 70 according to the present invention which has a screen-mounting basket 72 and a bridge 74 on which are mounted two vibrating apparatuses 75. The basket 72 has brackets 76 to which are secured helical springs 77. Each spring 77 is secured to a base member 77a.

As shown in FIG. 17, an optional housing 79 may be used on sides of and beneath the shale shaker 70. Optionally (and as may be the case with any shale shaker disclosed herein according to the present invention or with any known prior art shaker or vibratory separator) an electronic tracking apparatus 71 is on the housing 79, but may, according to the present invention, be within any suitable member or part of a shale shaker; and, optionally, such a tracking apparatus has a container or housing made of composite material and/or is encased within or coated with composite material. Any known tracking device, apparatus, or system may be used, including, but not limited to known satellite tracking systems.

The present invention, therefore, provides, in at least certain embodiments, a vibratory separator or shale shaker with a base; a basket movably mounted on the base and for supporting screen apparatus for treating material introduced into the vibratory separator, the basket on the base and pivotable with respect thereto; vibratory apparatus connected to the basket for vibrating the basket; screen apparatus supported by the basket, the material flowing onto the screen apparatus for treatment; angle adjustment apparatus connected to the basket for adjusting angle of the basket; sensor apparatus, e.g., ultrasonic, for sensing a parameter indicative of basket angle and for providing a signal corresponding to said basket angle; control apparatus for receiving signals from the sensor apparatus and for controlling basket angle based on said signals; the angle adjustment apparatus including a rocker arm assembly with a first end and a second end, the first end pivotably mounted to the base adjacent and beneath a material input area of the vibratory separator and the second end adjacent and beneath a material exit end of the vibratory separator; and the angle adjustment apparatus including movement apparatus with a part thereof in contact with the second end of the rocker arm assembly for moving the second end up and down to change basket angle, the movement apparatus controlled by the control apparatus. Such an apparatus may have one or some, in any possible combination, of the following: wherein the vibratory separator is a shale shaker and the material is drilling fluid with drilled cuttings therein; wherein the vibratory apparatus comprises two motors for vibrating the basket, the two motors providing dual motion capability; wherein the screen apparatus includes at least an exit screen with an exit end from which material separated by the screen apparatus flows off the screen apparatus for discharge from the vibratory separator, wherein the basket is at an angle such that a beach is formed adjacent an edge of a pool of material adjacent said exit end, and wherein the control system controls extent of a beach; wherein the sensor apparatus is ultrasonic sensor apparatus; wherein the ultrasonic sensor apparatus is at least one ultrasonic sensor apparatus; wherein the sensor apparatus is a plurality of sensor apparatuses; wherein said plurality of sensor apparatuses includes a first ultrasonic sensor apparatus spaced-apart from a second ultrasonic sensor apparatus, the first ultrasonic sensor apparatus for sensing material level in the basket and the second ultrasonic sensor apparatus for sensing rate of material flow into the basket; wherein the measurement sensor apparatus is from the group consisting of electrical, optical, electromagnetic, ultrasonic, acoustic, and pulse-echo apparatus; flow sensor apparatus connected to the vibratory separator for sensing the flow of material onto the screen apparatus, the flow sensor apparatus controlled by and in communication with the control apparatus, and the control apparatus for adjusting basket angle in response to signals from the flow sensor apparatus; wherein said plurality includes a third ultrasonic sensor apparatus for sensing basket angle; wherein the angle adjustment apparatus is powered by power apparatus from the group consisting of pneumatic power apparatuses, hydraulic power apparatuses and electric power apparatuses; and/or wherein the movement apparatus of the angle adjustment apparatus includes inflatable bladder apparatus which is selectively inflatable to raise and lower the rocker arm assembly.

The present invention, therefore, provides, in at least certain embodiments, a vibratory separator or shale shaker with a base; a basket movably mounted on the base and for supporting screen apparatus for treating material introduced into the vibratory separator, the basket on the base and pivotable with respect thereto; vibratory apparatus connected to the basket for vibrating the basket; screen apparatus supported by the basket, the material flowing onto the screen apparatus for treatment; angle adjustment apparatus connected to the basket for adjusting angle of the basket; sensor apparatus connected to the basket for sensing a parameter indicative of basket angle and for providing a signal corresponding to said basket angle; control apparatus for receiving signals from the sensor apparatus and for controlling basket angle based on said signals; the angle adjustment apparatus including a rocker arm assembly with a first end and a second end, the first end pivotably mounted to the base adjacent and beneath a material input area of the vibratory separator and the second end adjacent and beneath a material exit end of the vibratory separator; the angle adjustment apparatus including movement apparatus with a part thereof in contact with the second end of the rocker arm assembly for moving the second end up and down to change basket angle, the movement apparatus controlled by the control apparatus; wherein the vibratory separator in one aspect is a shale shaker and the material is drilling fluid with drilled cuttings therein; wherein the vibratory apparatus has two motors for vibrating the basket, the two motors providing a dual motion capability; wherein the screen apparatus includes at least an exit screen with an exit end from which material separated by the screen apparatus flows off the screen apparatus for discharge from the vibratory separator; wherein the basket is at an angle such that a beach is formed adjacent an edge of a pool of material adjacent said exit end; wherein the control system controls extent of a beach; wherein the sensor apparatus is ultrasonic sensor apparatus; wherein the sensor apparatus is a plurality of sensor apparatuses which includes a first ultrasonic sensor apparatus, second ultrasonic sensor apparatus, and third ultrasonic sensor apparatus for sensing basket angle, the first ultrasonic sensor apparatus for sensing material level in the basket and the second ultrasonic sensor apparatus for sensing material flow rate into the basket; the control apparatus for adjusting basket angle in response to signals from the sensor apparatuses; and correlation apparatus for correlating signals from the three ultrasonic sensor apparatuses to check system adjustment.

The present invention, therefore, provides, in at least certain embodiments, a vibratory separator with a base; a basket movably mounted on the base and for supporting screen apparatus for treating material introduced at a first end of the basket into the vibratory separator, the basket on the base and the first end pivotable with respect thereto, the basket having a second end spaced apart from the first end, material exiting the basket at the second end; vibratory apparatus connected to the basket for vibrating the basket; screen apparatus supported by the basket, the material flowing onto the screen apparatus for treatment; angle adjustment apparatus connected to the basket for adjusting angle of the basket by pivoting the basket's first end; sensor apparatus for sensing a parameter indicative of basket angle and for providing a signal corresponding to said basket angle; control apparatus for receiving signals from the sensor apparatus and for controlling basket angle based on said signals; and the angle adjustment apparatus including movement apparatus for moving the second end up and down to change basket angle, the movement apparatus controlled by the control apparatus.

Such an apparatus may have one or some, in any possible combination, of the following: wherein the vibratory separator is a shale shaker and the material to be treated is drilling fluid with drilled cuttings therein; wherein said plurality of sensor apparatuses includes a first ultrasonic sensor apparatus spaced-apart from a second ultrasonic sensor apparatus, the first ultrasonic sensor apparatus for sensing material level in the basket and the second ultrasonic sensor apparatus for sensing rate of material flow into the basket and wherein said plurality of sensor apparatuses includes a third ultrasonic sensor apparatus for sensing basket angle, and correlation apparatus for correlating signals from all three ultrasonic sensor apparatuses to check system adjustment; a variable frequency drive connected to the basket for controlling the vibratory apparatus; computer apparatus for controlling the vibratory separator; wherein the computer apparatus performs the functions of a variable frequency drive; and/or boost push button apparatus for manually changing forces applied by the vibratory apparatus.

The present invention, therefore, provides, in at least certain embodiments, a method for treating material introduced to a vibratory separator, the method including introducing material to a vibratory separator, the vibratory separator like any according to the present invention, treating the material in the vibratory separator, and adjusting the angle of the basket with angle adjustment apparatus. Such an apparatus may have one or some, in any possible combination, of the following: wherein the vibratory separator is a shale shaker and the material is drilling fluid with drilled cuttings therein; and wherein the vibratory apparatus comprises two motors for vibrating the basket, the two motors providing dual motion capability, the method further including changing motion using the two motors.

The present invention, therefore, provides, in at least certain embodiments, beach adjustment apparatus for adjusting extent of a beach on a screen of a vibratory separator, the screen mounted to a vibratable basket of the vibratory separator, the beach adjustment apparatus including an end-pivotable basket support for supporting the basket, the end-pivotable basket support pivotable at a pivot end thereof, the end pivotable basket support having a second end spaced-apart from the pivot end, the second end positionable near an exit end of a vibratory separator; apparatus for pivoting the end-pivotable basket support at its pivot end; and the apparatus for pivoting the end-pivotable basket support including movement apparatus having a part thereof for contacting the second end of the end-pivotable basket support for facilitating pivoting movement of the end-pivotable basket support to raise and lower the second end to adjust the extent of the beach.

In certain aspects an automatic boost minimizes fluid loss over the end of a shaker during a flooding situation. Several standard prior art shakers operate with a fixed shaking force and frequency, and a manually adjustable basket angle and vibrate with a nominal acceleration (g-force) that is measured without drilling fluid. The addition of drilling fluid adds mass to the system, which decreases the system acceleration. In addition, the angle of the basket is often manually adjusted according to the fluid level. Adjusting the basket angle keeps the fluid extent (beach) at a desired point, e.g. in triple screen shakers at about the end of a third screen. However, when fluid flow rates change frequently in the field, the basket angle is often not adjusted to its optimum position. If the basket angle is left in the fully uphill position, several screens may be running dry, which can decrease screen life. If the basket angle is left in a downhill position for correct beach length, whole mud can be lost over the end of the shaker when flow rates increase.

In certain embodiments, a shaker according to the present invention automatically adjusts the basket angle according to the fluid level. Thus, the basket is tilted downhill when there is little flow coming into the shaker. When the flow increases, the basket is automatically tilted uphill to keep the beach at approximately the same position. If the basket has been tilted fully uphill, and the fluid level is measuring high for a certain period of time (programmable into the shaker computer and/or controller), then the computer automatically signals the VFD (variable frequency drive, or inverter) to drive the motors faster, referred to as an "automatic boost" feature. Increasing the motor speed increases the force applied to the basket and fluid system. This in turn increases the basket acceleration, which increases the flow capacity of the shaker. Thus, this automatic boost feature helps prevent a shaker from flooding and losing whole mud.

Many traditional prior art shakers operate with a fixed motion profile. These motion profiles are either linear, elliptical, or circular. Each motion tends to be best suited for a particular mud condition. For instance, circular motion can perform well with sticky clays, linear motion performs well in high flow conditions, and elliptical motion can offer a compromise between linear and circular. Some current prior art shakers can manually switch motion profiles between linear and elliptical. These shakers include the Brandt King Cobra+, Brandt King Cobra II, and Swaco Mongoose. Certain shakers according to the present invention may have a custom shaker motion profile which is elliptical with varying aspect ratio. A motion profile is the motion shape at different points on the shaker, a motion imparted to material moving on the shaker. For example, overall shaker performance can, in certain aspects, be improved by having a different motion shape at the discharge end of a shaker than at the feed end or in the middle of a shaker. In one aspect, the tuned motion in the feed end of the shaker is a thin ellipse (approximately 5% aspect ratio), which can appear to be linear; the tuned motion near the center of the basket is a medium shaped ellipse (approximately 15% aspect ratio); and the tuned motion near the discharge end of the shaker is a fatter ellipse (approximately 30% aspect ratio). The acceleration level and angle of attack remain reasonably consistent and uniform front to back. In one aspect, this motion profile enhances performance in drilling mud with sticky clays. With this configuration, the conductance is increased (faster elimination of liquid from the mud) with the thin ellipse at the feed end of the shaker. The conveyance is enhanced at the discharge end of the shaker by the more pronounced elliptical motion. The more linear motion at the feed end of the shaker processes a higher maximum fluid flow rate, while the more elliptical motion at the discharge end of the shaker conveys sticky clays better. Elliptical motion is effected by using different weights on vibratory motors creating a force differential which results in motion perpendicular to the line of force on the basket and a torque imbalance which makes the basket rotate about the center of mass producing elliptical motion; and/or such motion is produced by varying motor position with respect to the center of mass. In a shaker according to the present invention an operator can manually switch the shaker motion profile between linear, elliptical, and circular motion (with appropriate motor location and/or spacing and/or with a motor at the basket center of mass). In another aspect, a shaker according to the present invention has the ability to produce all three standard motions (linear, elliptical, and circular), and a custom motion (change shape front to back on the basket), then the best motion profile can be chosen based on the mud state and shaker state. For instance, if the mud flow rate is very high, linear might be the best motion profile. If very sticky clays are encountered, then circular motion might be preferred. If the mud does not have a large amount of sticky clays, and the flow rate is not extremely high, then elliptical motion might be best. Other conditions may point towards one motion as being the best at a certain time. For instance, an intelligent shaker according to the present invention can choose the appropriate motion, and turn motors on and off, or run the motors forward or reverse to achieve the best motion. Motors can have brakes applied to stop the rotation of the motor weights in order to achieve the desired motion.

Currently, many prior art shakers run at a fixed or at least infrequently changing state. The shaker state can be described by such parameters as screen mesh, acceleration amplitude, motion profile, basket angle, angle of attack, and vibration frequency. In addition, many typical shakers operate without knowledge of the state of the drilling mud. Some of the parameters that contribute to the mud state include viscosity, temperature, flow rate, fluid level in the shaker, specific gravity, solids content, and stickiness of the solids. Typically, many prior art shakers are designed to operate at a nominal shaker state that works reasonably well over a range of mud states. Experienced operators change the shaker state periodically to increase performance for the current mud state. Prior art mud sensors sense such parameters. Inexperienced operators may operate the shaker at a sub-optimal state for the conditions of the mud. Even experienced operators may not have the time to change the state of the shaker to match changing mud conditions. A shaker supplied with information about its own state and the state of the drilling mud can operate closer to optimum for given conditions. Certain shakers according to the present invention measure their own performance to assist in optimizing operation.

In order to operate intelligently, a shaker according to the present invention has a computer or other programmable apparatus of some form to read state information, make decisions to optimize performance, and implement the decisions (e.g., but not limited to, a controller 330, FIG. 10E; control apparatus 550, FIG. 11A, computer 560, FIG. 13; or control apparatus 630, FIG. 14). The computer, in one aspect, is connected to an I/O (input/output) device or devices that read values from various sensors and send outputs to actuators, motor drivers, and/or other equipment. Sensors (e.g. sensors within a shaker, container, tank and/or in a flow line or conduit; e.g. sensors 60 and 273, 276 of FIGS. 2A and 9, respectively) indicate and measure some or all of the mud state parameters.

With information about the mud state, the current shaker state, and/or other performance measurements, an intelligent shaker according to the present invention controls its own state to enhance and/or to optimize performance. Shaker states that can be controlled (with user selectable controls and/or automatically based on sensor readings) include basket angle, acceleration magnitude, motion profile (linear, elliptical, or circular; e.g. detect non-sticky free-flowing material and use linear motion; e.g. detect sticky clays, change to elliptical motion or detect flow is low for a long time and change to elliptical motion), vibration frequency, angle of attack (angle of basket motion relative to its horizontal position; e.g. change center of mass of basket and/or motor location).

In certain aspects, the automatic boost feature is a specific instance of controlled acceleration. In this case, the shaker acceleration is temporarily increased to a pre-determined value, e.g. in order to accommodate unusually high mud flow. More generally, when the shaker acceleration is controlled, then it can be varied over a continuous range [e.g. for such control a monitoring device monitors an accelerometer on or connected to a shaker basket and the monitoring device (e.g. a computer, PLC, or PID controller) sends a signal to a VFD). For instance, the acceleration can be controlled to be constant under varying mud flow/loading. This is accomplished by measuring the basket acceleration with an accelerometer located on the basket, in one aspect near the center of mass, e.g. accelerometer AC in FIG. 11C; feeding back the signal from the accelerometer to a shaker computer (or PID controller, or to a remote computer); comparing the actual acceleration with the desired value; and changing the motor frequency or other driving force until the actual acceleration matches the desired acceleration.

If a desired acceleration value is changed according to the states of the shaker and mud, then performance is further enhanced and/or optimized. For instance, the acceleration level is adjusted to minimize energy consumption, or to use the minimum necessary acceleration based on the fluid level in the shaker. This is useful since high acceleration can lead to decreased screen life and solids degradation. If the fluid level in the basket increases above the desired level, then the basket angle is decreased to tilt the basket uphill. This can only be done to a certain point. Once the basket is fully uphill, the acceleration is increased, which processes more fluid and lowers the fluid level in the shaker basket.

For condition-based maintenance, the shaker machine state and/or shaker history are used to predict when to perform maintenance on the machine. The maintenance schedule of a standard shaker often requires adding grease to the vibrator motor bearings after a period of time. Depending on how much the shaker was actually operating over this time causes the actual maintenance time frame to differ from the static, documented schedule. Proper greasing is especially important to motor bearings (e.g. bearing apparatus BA shown in dotted lines in FIG. 11C). Too little grease can cause increased friction, increased temperature, and premature bearing failure. Too much grease can cause increased pressure in the bearings, increased temperature, and premature bearing failure. Further, the ambient temperature that the motor operates in will affect the maintenance schedule. Other factors include motor force.

One factor that can be used to predict when bearing grease needs to be added is the operating temperature of the bearing. According to the present invention the bearing operating temperature is sensed with a sensor (e.g. sensors in the motor adjacent the bearings, e.g. sensor SR, FIG. 11C) and is then sent to a computer that compares it to the ambient temperature and the desired temperature level for greasing, then the operator can be notified (e.g. by any controller as described herein) when it is time to grease the motor bearings. Also, a computer (on the shaker, on site, or remote) or other device is used to keep track of the motor's operational time. When the operational time reaches the desired maintenance time, the operator is notified of the required maintenance. This operational time can be adjusted according to the ambient temperature and current bearing temperature.

Certain shakers according to the present invention have interfaces and communications with on-site and remote controllers, computers, systems, networks, and/or the Internet. An automatic shaker according to the present invention has a web (e.g. Internet) interface between on-site personnel at the shakers location and personnel and/or computerized information remote therefrom for maintenance and/or re-programming operations. This enables technicians during setup, maintenance, or troubleshooting to monitor the status of the shaker, including all program parameters, and adjust the program parameters on the fly, while the shaker is shaking and the software is running. Additionally, the technicians can load software updates to the shaker. The software updates can be accomplished either through the web interface, or by physically changing a programmable media, e.g. a removable Compact Flash card. Such a shaker can have a local Ethernet network in its computer enclosure on the shaker. With a wireless radio attached to the shaker computer network, the shaker computer can communicate wirelessly through the closed explosion-proof enclosure with the Internet and/or to a laptop (see, e.g. laptop LAP shown schematically in FIG. 26) with a wireless network connection. In one aspect, this works up to about 20 feet from the shaker while the shaker is running. The range can be extended with the use of a window in the computer enclosure, or with the use of an antenna in an explosion-proof enclosure with a glass dome. Additionally, the technician can connect to the computer network with a network cable.

In certain aspects, a shaker according to the present invention wirelessly connects to the Internet through a drilling rig's network connection. This enables remote monitoring, troubleshooting, and control. For instance, if a rig has a problem, technical support is contacted and is able to view the shaker state, view program variables, change settings, and update the software remotely, from anywhere in the world with an Internet connection.

The software in the shaker computer, in certain aspects, has the ability to be upgraded to communicate with other Drilling Equipment (DE) machines such as tele-operated drilling chairs, Drawworks, rackers, mud control equipment, and top drives. Optionally, local and/or remote user interfaces with touchscreens are provided. These allow an operator to view more information about the state of the shaker, including alarms, warnings, health checks, and suggested changes to the shaker. Suggested changes to the shaker can include increasing or decreasing the screen mesh, greasing motor bearings, replacing sensors, or checking basket angle actuators.

In certain embodiments, (see, e.g. FIGS. 18-28) systems according to the present invention provide tests, checks, and intelligent diagnostics specific to oil rig operational scenarios, to vibratory separator operation and, in particular aspects, to shale shaker operational scenarios which enhance oil rig safety and efficiency of oil field drilling operations, in certain particular aspects when applied to an automatically operated shale shaker with an electronic and/or computerized control system to ensure continuous and proper system availability during downhole operations. In certain systems according to the present invention failures, performance degradation and/or predicted failures are reported to service personnel that perform additional diagnostics or dispatch field personnel to replace or repair the systems as necessary.

The present invention provides a method and apparatus for remotely monitoring, analyzing and affirmatively notifying appropriate personnel of problems and events associated with an oil recovery system comprising one or more, e.g. hundreds, of oil rigs over a vast geographic area. The present invention provides a monitoring and reporting system that is referred to as a Health Check system. The present invention provides a variety of performance monitoring sensors at each oil rig in an oil recovery system, and, in certain aspects, for each shale shaker of an oil rig. The results of selected diagnostics, which are run on each oil rig and/or on each shaker, are reported to a central server. The central server automatically populates a database for the oil recovery system and displays a red/yellow/green/gray color-coded report for each rig and/or for an entire oil recovery system. The present invention also affirmatively alerts appropriate personnel of actions required to address events associated with an oil rig in an oil recovery system. The diagnostics performed at each oil rig are configurable at the individual rig. The central server need not change its reporting and display program when changes are made to a heath check at an oil rig. The present invention provides a dynamic oil rig status reporting protocol that enables construction and display of a tree node structure representing an entire oil recovery system status on a single screen. Preferably, top level information is presented on a single screen, and detailed information presented when one drills down in to other screens. Thus, the present invention enables rapid visual affirmation of a system Health Check.

A Health Check is an automated test that is running on the rig and monitoring something, e.g., but not limited to, a shale shaker or shakers, for acceptable performance, indication of problems, etc. These tests could be applied to equipments, drilling processes, or an operator's usage of particular drilling equipment, e.g., but not limited to, shaker(s). The results are then communicated to a central server located in a service center through a unique protocol, which allows automatic distribution and display of information and/or directly from a shaker to an Internet interface. A test program on a rig can be modified and that change will flow automatically through communication, storage and display of the resulting Health Check data for the rig.

The service center based web server allows secure access to Health Check results. The results are presented in "top down tree" mode with red/yellow/green/gray colors. The red color indicates the failure of a test or flagging an event of interest, the yellow color indicates that the health test has found some abnormality that may need attention, green indicates successful completion of a test, and gray color indicates inability to conduct a test. The bottom-most node of the "top down tree" contains the results of a Health Check. The workcase result is successively carried up to the next level, until topmost node (which in most cases is the drilling rig, group of rigs or oil recovery system) is reached.

Each Health Check result can be configured to generate a message (email, phone call, PDA, etc.) to alert single or multiple persons in case of test failure. The data transfer protocol is well defined, such that other development groups or third parties can easily develop Health Check tests, generate results and feed information to the central server. Test results are transferred from the rig to the server using a novel data protocol that dynamically defines the structure of the data, that is, the node tree structure of the data by the naming convention of the protocol. Thus, the results are simply stored and displayed using the structural definition provided in the communication protocol. This allows for extreme flexibility in the definition of new programs and results to run and report at oil rigs without requiring a change in the communication protocol, notification function or the display and storage functions at the central server. The bottom-most nodes in the tree structure contain test results. Each test comes into the central server as a record containing node information as to where the information fits within the tree structure, an identifier for the test, a test result (red/yellow/green/gray) and intermediate data such as error codes, operator entry data and test data description. Thus, no results processing need occur at the central server. The central server only archives and display results and issues affirmative (with acknowledgement) and regular notifications as required.

Events or conditions can be set for notification, thus, once the event or condition occurs and after it is set for notification, a notification is sent to a designated person reporting the event of condition. A list of persons can be associated with each oil rig and event or condition. A notification can be sent to a cell phone, PDA or other electronic device. A notification can comprise a text, audio or video message to a user. A notification tells the rig status color code, text, aural or video. A user can call into the central server to check the status of an oil rig or oil recovery system. The status returned is a notification message indicating that the rig is okay or that a problem or condition of interest has occurred. Thus, the Health Checks are different than alarms, although alarms (including those alarms generated by prior or legacy systems) can be used as inputs to a Health Check where the alarms are processed and considered by Health Check rather than sending an alarm immediately to oil rig personnel. Health Check may indicate that piece of equipment is out of range and should be replaced in the near future, however, supercritical alarms can be processed by Health Checks to generate an immediate notification.

In certain aspects, the present invention (and any and all steps and/or events described above for any scenario) is implemented as a set of instructions on a computer readable medium, comprising ROM, RAM, CD ROM, Flash or any other computer readable medium, now known or unknown, that when executed cause a computer or similar system to implement the method and/or step(s) and/or events of systems and methods according to the present invention, either on-site or remotely or both.

The present invention is described herein by the following example for use on drilling rigs, however, numerous other applications are intended as appropriate for use in association with the present invention.

The present invention provides a user interface, which, in one aspect, is preferably mounted to existing rig floor structure and also provides a pedestal mount with adjustable height, for convenient choke operation. A wireless version is also provided.

The present invention supports real-time two-way data communication, e.g., with Varco International, Inc.'s Rig-Sense and DAQ JVM, and with other commercially available information systems. In one aspect any sensors whose data is used by the present invention (for control and/or display) are directly connected to the present invention, including, but not limited to, sensors on a shale shaker or shakers.

In one aspect, when the RigSense system is present in an embodiment of the present invention, the RigSense system provides data archiving and expanded data displays functionality to the present invention. The present invention provides a user interface integrated into other systems such as the RigSense system, DAQ JVM and VICIS; Real-Time Well Control, supervisory control specific to well control tasks; and Automated well control, which may be entire process or selected sub-tasks. One of the primary impacts perceived on existing products and services in which integration and/or implementation of the present invention is performed is additional capability for taking control of and/or being in control of the choking operation via a distinct intervention, so that control is clearly being exercised by users at other stations and by automated controllers.

A key factor for efficient utilization and integration of the present invention into the operator's working environment is the present invention's provision of manual controls for high-frequency user control actions in lieu of touch screen control consoles. Additional automated functionality is provided such as automatic pressure-set control for use in association with the touch screen and provides benefit in the control area, particularly in emergency stations. In an alternative embodiment a touch screen user interface is provided.

In another embodiment, the present invention is implemented as a set of instructions on a computer readable medium, comprising ROM, RAM, CD ROM, Flash or any other computer readable medium, now known or unknown that when executed cause a computer to implement a method of the present invention.

The present invention provides a method and apparatus for remotely monitoring, analyzing and affirmatively notifying appropriate personnel of problems and events of interest associated with an oil recovery system comprising one or more, e.g. hundreds, of oil rigs over a vast geographical area or a single rig. The present invention provides a monitoring and reporting system that is referred to as a Health Check system. The present invention provides a variety of performance, process and equipment monitoring Health Checks and equipment sensors at each oil rig in an oil recovery system. The present invention provides a dynamic oil rig status reporting protocol that enables population and display of a tree node structure representing an entire oil recovery system or single oil rig status on a single screen. Thus, the present invention enables rapid visual or aural affirmation of a system Health Check.

Health Checks are not the same as alarms. An alarm is an immediate notification to an operator that a known unacceptable condition has been detected, requiring the operator's awareness of it and often some action by the operator. A Health Check may use alarms in its logic, but it is by nature different than an alarm. A heath check is more general and more diagnostic than an alarm, and does not require immediate action, at least not on the oil rig. In the present invention, a problem is reported to a central server for reporting and diagnosis to service personnel. A Health Check can apply to any equipment component or process, sensors, control systems, operator actions, or control processes, etc.

The Health Check system comprises software containing test logic. The logic is configurable so that inputs, outputs and logic can be selected by a user to test and look for any condition or event associated with an oil rig or oil recovery system. The overall system in certain aspects comprises Health Checks running in real time on a computer at an oil rig and a communications network connecting the oil rig to a central server to move data from the rig of a group of rigs to the server. The server displays the results in hierarchical form. The server sends commands, application programs and data to the rig from the server.

The Health Check system of the present invention further comprises, in certain aspects, a central database populated with dynamic status reported from oil rigs comprising an oil recovery system. The present invention further comprises a web page display for efficiently displaying Health Check results associated with a test, a rig, an area or an oil recovery system. The web page results can be displayed on a computer, cell phone, personal data assistant (PDA) or any other electronic display device capable of receiving and displaying or otherwise alerting (e.g., sound notification) a user of the status of the data. The preferred screen is a color screen to enable red/green/yellow/gray display results. Results can also be audio, video or graphically encoded icons for severity reports, e.g., an audio message may state audibly, "situation green", "situation red" or "situation yellow" or display a particular graphical icon, animation or video clip associated with the report to demonstrate a Health Check severity report.

The present invention enables drilling down (that is, traversing a hierarchical data structure tree from a present node toward an associated child or leaf node), into a tree of nodes representing diagnostic status, to a node or leaf level to access additional information regarding a color-coded report.

The present invention also provides a notification system to immediately inform service personnel of problems as necessary, such as a message or email to a cell phone or pager or computer pop up message. There is also a receipt affirmation function that confirms that a notification message was received and acknowledged. Secondary and tertiary notifications are sent when a primary recipient does not acknowledge an affirmative notification within a configurable time limit. A severity report associated with a given problem is represented by a blinking color when it is unacknowledged and remains a blinking color until the given problem is cleared and returns to green or clear status. Severity reports once acknowledged change from blinking to a solid color. Reports that have been acknowledged by one user may be transferred or reassigned to another user upon administrative permission by a system supervisor or by requesting permission to transfer a second user and receiving permission from the second user. A system supervisor can also display a list of users and severity reports being handled by the user, that is, a list of acknowledged and in progress severity reports assigned to a particular user to view and enable workload distribution to facilitate reassignments for balancing the work load.

A dispatch may assign a work order to a group of particular severity reports. Once the work order is completed the system checks to see if the nodes associated with the work order have been cleared. The work order provides a secondary method for determining if nodes associated with a work order have been cleared after a work is complete. The system administrator software program can also automatically check the work order against the node state for a system check.

The advantages provided to the customer of a preferred Health Check system are substantially less down time due to the present invention's Health Check's ability to find or anticipate problems earlier and fixing the problems faster, ideally before the customer becomes aware that a problem has occurred. The present invention reassures the customer that the Health Check system is always on the job and monitoring and reporting on the oil recovery system twenty-four hours a day, seven days a week. A customer or system user can always call in and confirm the status of an entire oil recovery system or single rig with a single call to the central server or a rig and receive a situation report, that is situation red, yellow, green or gray for the oil recovery system or single rig, as requested. The present invention enables more efficient use of operational service personnel. The present invention finds and reports problems, potential problems and trigger events of interest, which enables rapid response and recovery in case of actual and/or potential equipment or operator malfunctions or the occurrence of a particular event. The present invention also helps to find problems at an early stage when the problems are often easier to fix, before catastrophic failure, thus creating less impact on the customer's oil recovery system or individual oil rig. Health Checks according to the present invention provide a method and apparatus for providing an application program that acts as an ever-vigilant set of eyes watching an entire oil recovery system or single rig to ensure that everything is okay, that is, operational.

In certain embodiments, all results for each oil rig in an oil recovery system or individual oil rig or equipment, e.g., but not limited to, a shaker or shakers, are worst-case combined so that the worst-case severity report bubbles to the top of the reporting tree and is reported as the status for an entire oil recovery system, oil rig(s), event of interest, process, or equipment being analyzed. As discussed above, red is a worst-case severity report, followed by yellow severity report and then green is the least severe report. Gray indicates no data available. Thus, if one or more tests reporting a red status is received from an oil rig, the red status bubbles up past all yellow and green status reports and the status for the rig and the entire oil recovery system in which the rig resides is shown as red. Once the red report is cleared, yellow reports, if any, bubble up and the status of the oil recovery system, rig or equipment being viewed is shown as yellow, if a yellow report is in a node tree transmitted from any oil rig in an oil recovery system. The status for a single oil rig bubbles up the worst-case report as well, however, localized to the single rig or rigs under investigation, unless grouped. When grouped the worst-case status for the group is reported. For example, if three rigs were reporting the following scenario is possible: Rig 1 reports red, rig 2 reports yellow and rig 3 reports green. The status for a group selected to include rigs 1, 2 and 3 would be red. The status for a group selected to include rigs 2 and 3 would be yellow. The status for a group selected to include rig 3 only would be green. Subsections within a rig can also be selected for a color-coded status report. Preferably, the gray is not cleared. Usually, if the test were not conducted for any reason, the status would take gray color.

The present invention enables testing at the nodes of a bottom up tree structure representing an oil recovery system, a single rig therein, or an equipment in an oil rig, wherein the nodes carry the results to the top for easy visualization and use. The present invention also provides a dynamic reporting protocol for data transfers from an oil rig to a central server wherein level identifiers are provided to transfer data and its structure in a single packet transfer, thus enabling dynamic data base population and display of reports from an oil rig. The results are presented on a web page or reported to cell phones, computers, pagers, personal data assistants or otherwise affirmatively reported other wise to appropriate personnel. In a preferred embodiment, reports are acknowledged by a first recipient or a second recipient is selected for receipt of the report when the first recipient does not acknowledge receipt, and so on, until a recipient has received and acknowledged the report. Alternatively multiple recipients may simultaneously get the notification.

The present invention is automatically scaleable and extensible due to the modular and dynamic nature of its design. Tests can be easily created, added or deleted and parameters added or modified on an oil rig equipment test or Health Check without reprogramming or changing the central server's database population, data reporting and data display applications. The reporting can vary between broad coverage and specific coverage, that is, a status report can included data for an entire oil recovery system comprising over 100 oil rigs and/or specifically report status for a single oil rig of interest concurrently.

The present invention provides early warning of potential and actual failures and also provides confirmation of product performance and usage. A set of automated Health Checks and diagnostic tests is selected to run in real time on an oil rig. Status from the test is reported continuously via a communication link between the oil rig and a central server. The present invention provides insight and analysis of equipment, processes and equipment usage on an oil rig. The present invention monitors alarms and parameter limits to assess necessary action and perform affirmative notification of appropriate personnel.

The present invention provides quick response, real-time monitoring and remote diagnostics of the automation and control systems running on oil rigs comprising a fleet of oil rigs or an oil recovery system to achieve maximum rig performance while maintaining optimum personnel allocation. A service center is connected to the oil rigs through an Internet based network. System experts make real-time data and logged data from the oil rigs available for perusal and analysis in a central facility or at distributed locations. The web site of the present invention provides access to current operational status as well as to historical operation and performance data for each of the rigs comprising an oil recovery system.

Health Check tests are configurable so that new tests can be created, added or deleted and parameters changed for execution at an oil rig without the necessity of programming. A simple user interface is provided wherein a user at the central server or at an oil rig can select a test from a library of existing tests, or create a new test using a scripting language, natural language interface or pseudo language is provided which generates a script defining inputs, outputs and processing logic for a test. The script is compiled and sent to the rig for addition to existing Health Checks running on the rig. The user interface also enables modification or addition and deletion of parameters associated with a Health Check or test.

Notifications can be an immediate message when a problem is detected or an advisory notification. The notification is sent to expert service personnel associated with the central server or can be directed to a service manager or local service person closest to the rig needing service. For each rig and problem type, a particular person or service personnel category is designated for receipt of a notification. Secondary and tertiary backup personnel and personnel categories are designated as a recipient for each notification. Affirmative notifications must be acknowledged by the recipient so that the problem is acknowledged and someone has taken responsibility for the problem. If an affirmative notification is not acknowledged within a configurable time period, then a secondary or tertiary recipient is notified until the problem is acknowledged. Reliability reports are generated by the present invention showing performance summaries for oil rigs, comprising up time, response, problems detected and solutions provided. These reports provide an objective basis for formulating an evaluation of the Heath Check system's efficiency.

The results from a rig include processed inputs from the rig. No processing is required at the central server, other than display, storage and alerts to appropriate personnel. The oil rig Health Checks and tests are configurable so no programming is required to implement a new test or change logic or parameters for an existing test. A field engineer or central server personnel can add a new test without requiring a user to perform a programming change. The present invention provides a local or remote user interface, which provides a simple interface for describing a test and logic. The interface comprises an iconic presentation, pseudo language, script or a natural language interface to describe a test's input(s), processing logic and output(s). The user interface interprets a user's inputs and converts the user's input into a scripting language. The script language is compiled and sent to the rig on which the new or augmented test is to be performed. The new test is added to a library of tests from which a user may choose to have run at a rig. Test modules can be deleted, added, parameters changed, and updated from the oil rig, the central server or from a remote user via a remote access electronic device.

Figure 18:
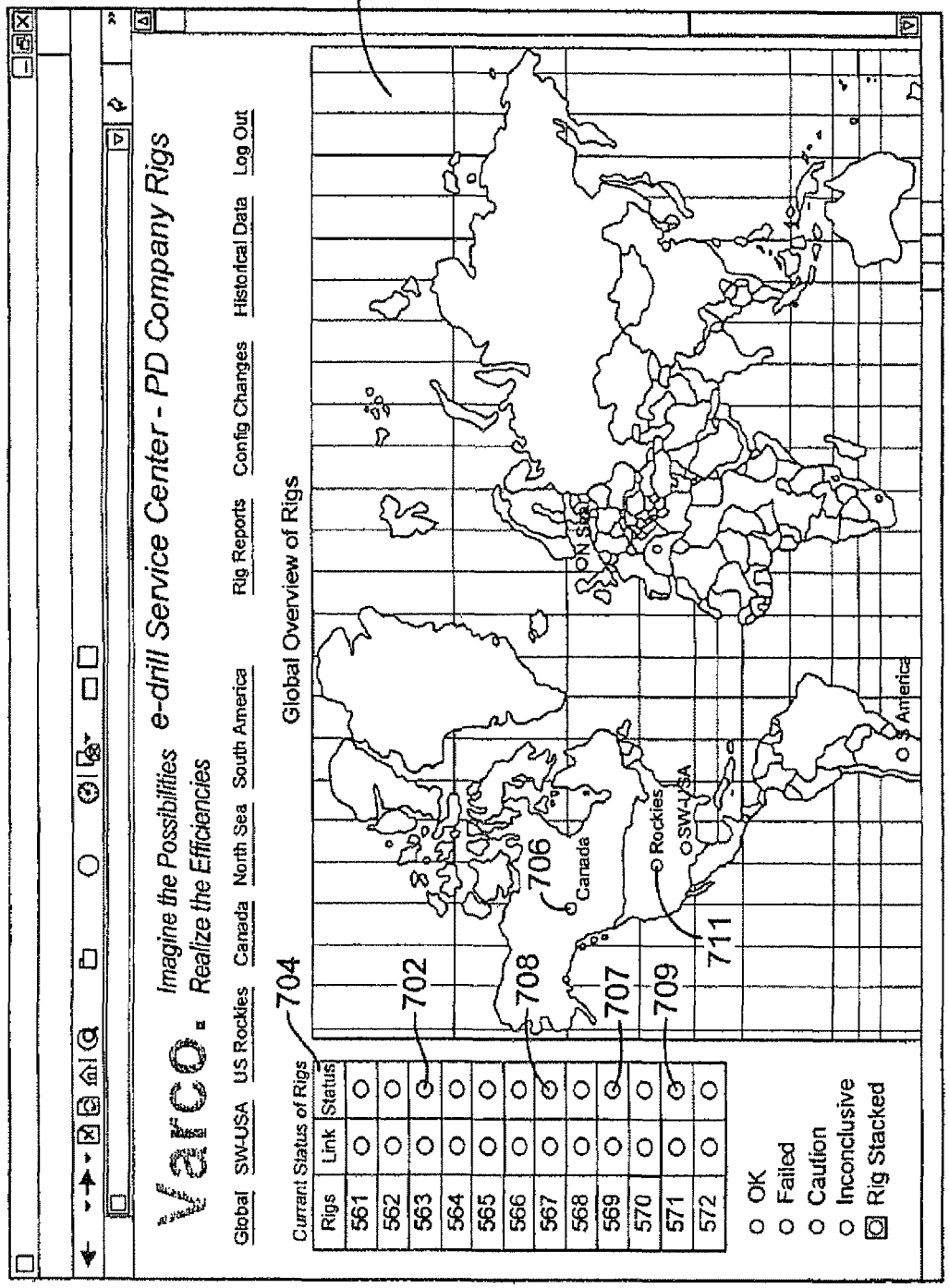
FIG. 18 is an illustration of a preferred status display for an oil recovery system showing status for individual rigs and aggregated worst-case status for geographical areas.
Figure 19:
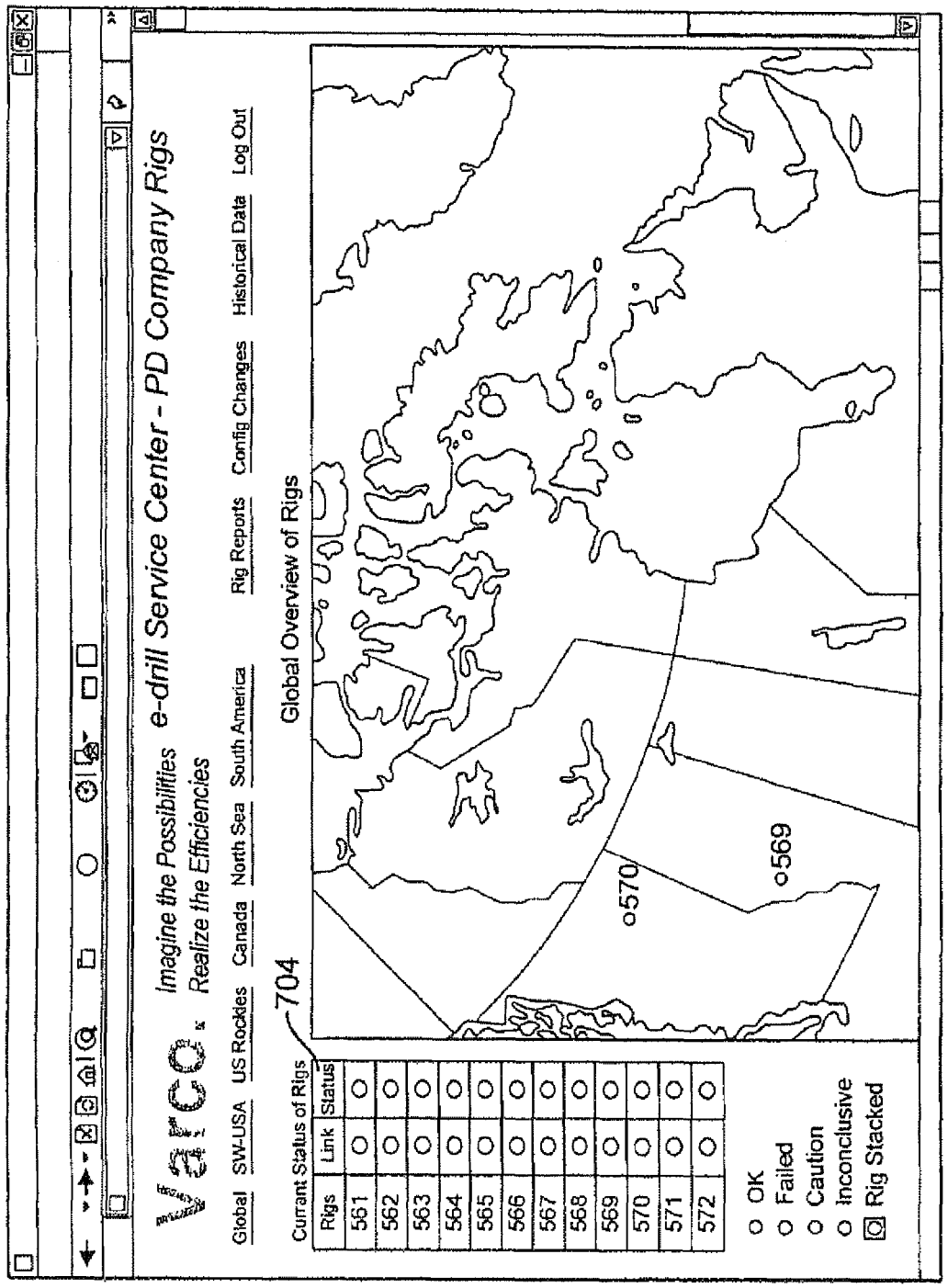
FIG. 19 is an illustration of a preferred status display for an oil recovery system showing status for individual rigs and aggregated worst-case status for a smaller geographical area including Western Canada.

Turning now to FIG. 18, a preferred embodiment of the present invention is shown illustrating a global overview 200 of all rigs comprising an oil recovery system. As shown in FIG. 18, a map pinpoints geographic locations of the rigs in the system of interest. A web page display is presented on a personal computer or PDA. The web page generated by the central server presents a geographic view of an oil recovery system. In FIG. 18, rig number 563 (70)2 and rig number 569 (707) are shown with a red status, indicating that a condition or reporting event of interest has occurred at rig number 563 and number 569. Rig number 569 (706) is in Canada and rig number 563 (711) is in the United States. Rig number 571 (709) has a yellow status and rig number 567 (708) has gray status. All other rigs shown in FIG. 18 have a green status. When a system user clicks on rig number 569 (707) or the Canadian region, the display of FIG. 19 appears. FIG. 19 shows the Canadian region, which includes rig number 569. Notice that rig number 570 has a green status is now displayed on the more detailed Canadian region display. The green status geographical indicator for rig number 570 is suppressed and not shown in the broader display of FIG. 18 so that the more severe red status of rig number 569 would be immediately visible and evident on the display of FIG. 18. Once a user implicitly acknowledges the red status for rig number 569 by clicking on rig number 569, the present invention displays the less severe status of rig number 570. Thus, the more severe status of rig number 569 bubbles up in the geographical display and is displayed first at a higher level in the geographical display hierarchy. Note that the green status indicator of rig number 570, however, is shown in the panel 704 of FIG. 18 and FIG. 19. Thus, the present invention presents a hybrid display in which all Health Check results are available in the panel 704, but worst case results are presented in the geographical displays of FIG. 18 and FIG. 19.

Turning now to FIG. 20, the status display 724 of FIG. 20 for rig number 569 is shown when a user clicks on rig number 569 in FIG. 18 or FIG. 19. FIG. 20 illustrates that a rig number 569 component, "RigSense" has a red indicator. The Magnifying Glass icon 722 shown adjacent red indicator 730 indicates that more information is available regarding the red indicator 730. Notice that there are also additional panel displays 716 and 718, which are configurable, which perform additional informative functions. A summary panel 720 is displayed for rig number 569. The summary status panel contains operator reports from the oil rig. These operator reports are useful in diagnosing status and formulating a plan of action or notification. An AutoDriller status panel is also displayed. Note that the Weight on Bit (WOB) indicator 717 is red in the AutoDriller status panel. A driller adjustable parameters panel 718 is also displayed.

Figure 21A:
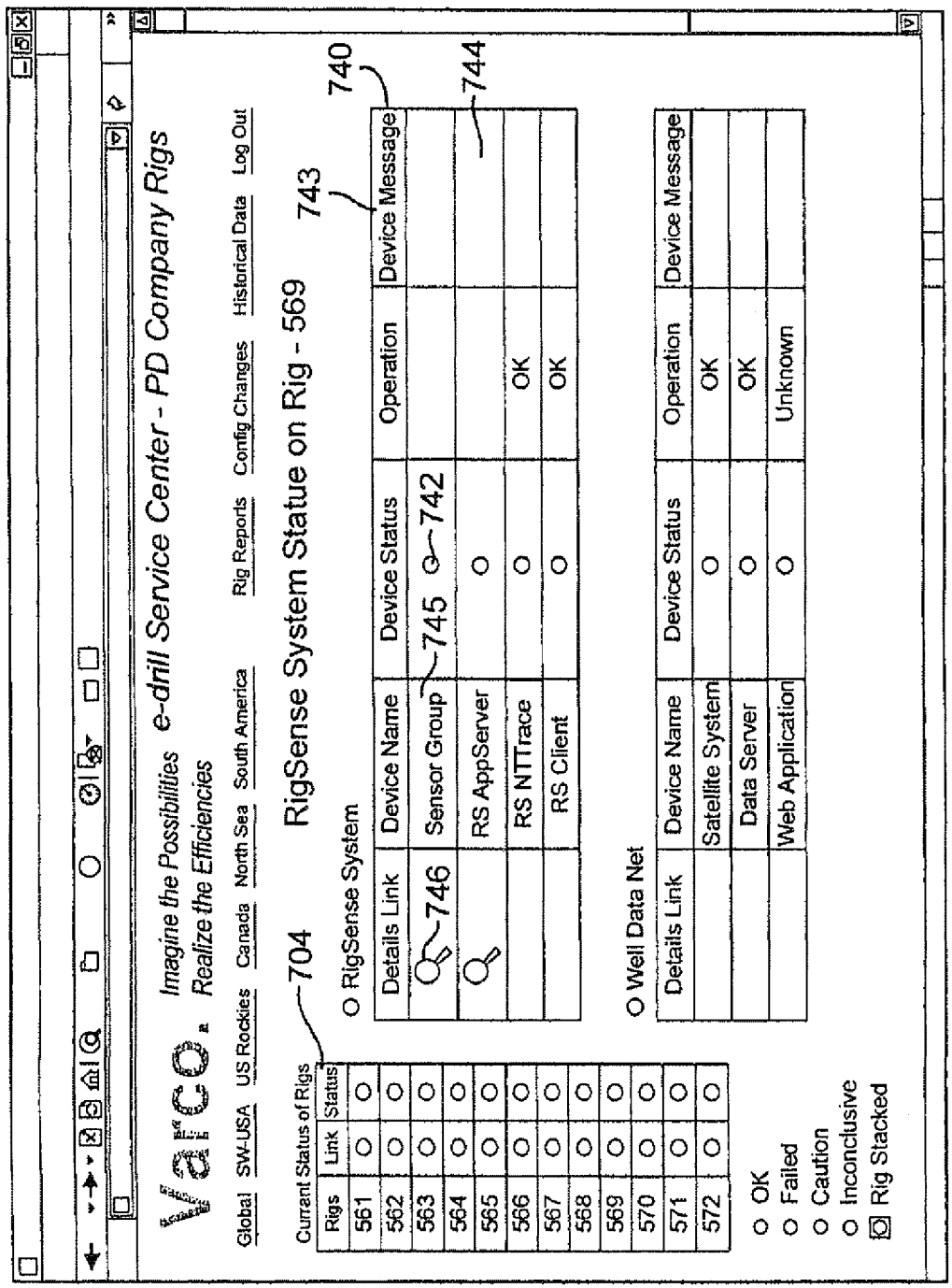
FIG. 21A is an illustration of a preferred status display for an oil recovery system and a sub status for an individual rig.

Turning now to FIG. 21A, continuing with rig number 569, clicking on the red indicator for RigSense status in FIG. 20, brings up the display for the RigSense system panel status 740 as shown in FIG. 21A. Note that the device message block 743 may contain a part number to expedite repair of a failure as reported. The particular part number and or drawing number necessary to perform a given repair associated with a given problem or severity report may be difficult to find in a vast inventory of parts and part numbers and drawings associated with a given failure. Otherwise, the recipient of a failure report may have to search via key words through a vast inventory of parts, part numbers and drawings associated with a given failure. Moreover, the user may not be familiar with a particular vendor's part numbering system, thus, provision of the part number is a valuable expedient to trouble shooting.

Figure 22:
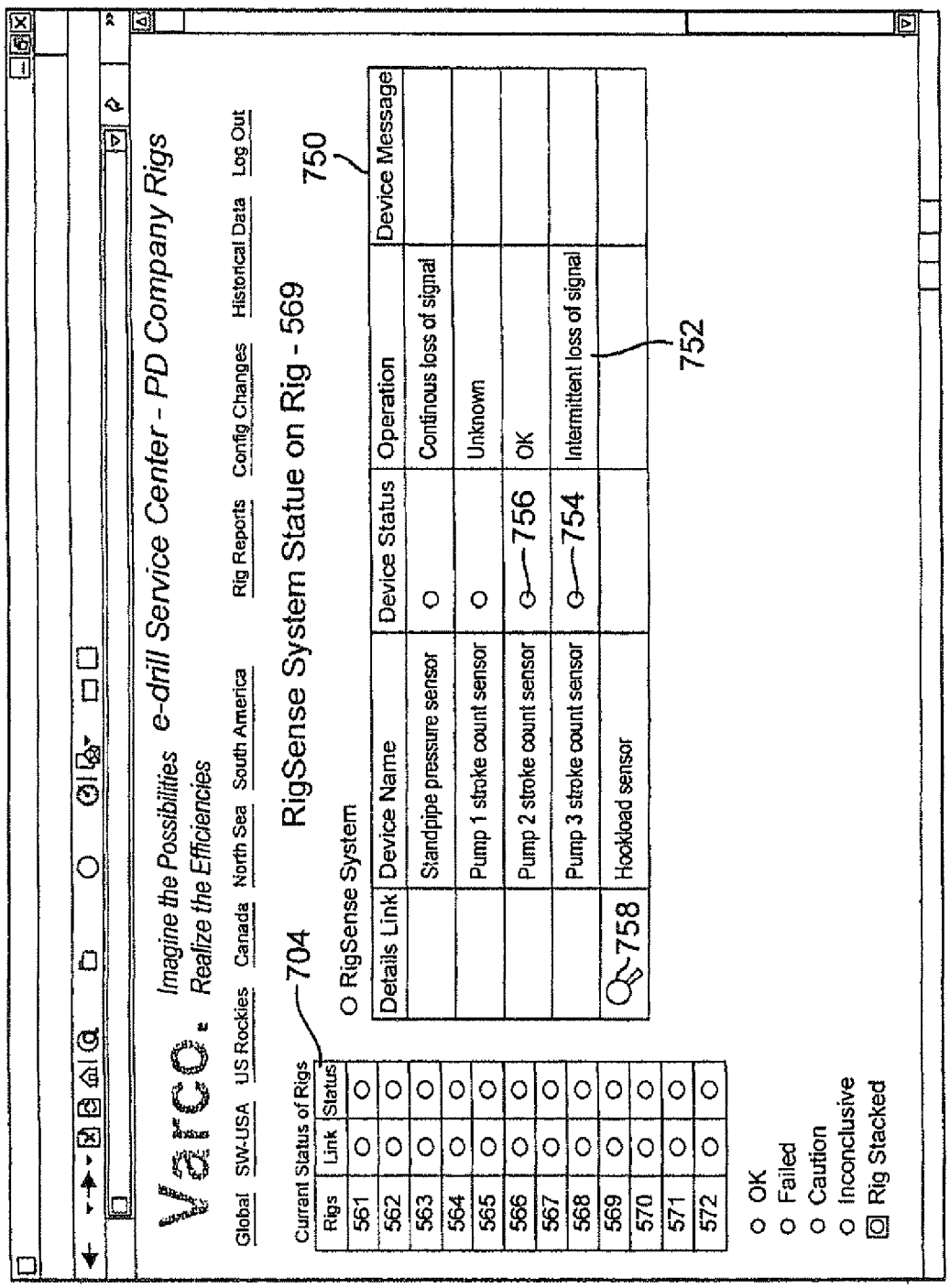
FIG. 22 is an illustration of a preferred status display for an oil recovery system and a lower level sub status for an individual rig.
Figure 23:
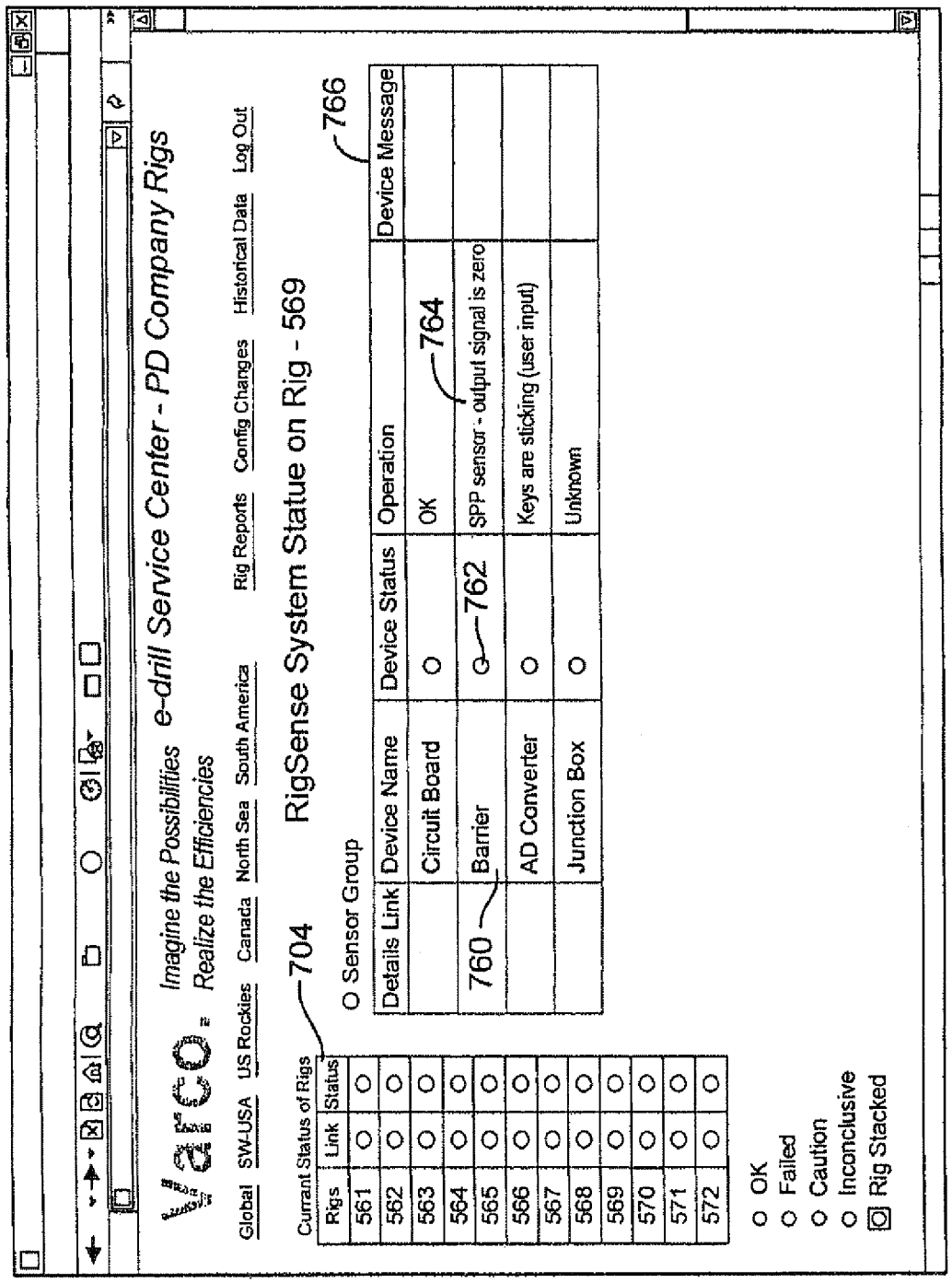
FIG. 23 is an illustration of a preferred status display for an oil recovery system and a lower level sub status for an individual rig.

FIG. 21A shows that the sensor group device status 742 is red with a Magnifying Glass icon 746 indicating that more information is available for the red sensor group device status indicator 742. In an alternative embodiment, as shown in FIG. 21B, a pop-up message 746a appears along with the Magnifying Glass stating "Click on Magnifying Glass for more details." Clicking on the red sensor group 744 device Magnifying Glass 746 brings up the display 750 of FIG. 22, showing a detailed status for the sensor group device status. Note that there are two red indicators shown in FIG. 22 for device status in the sensor group as follows: "Pump 3 Stroke Count Sensor" 756 and "Hookload Sensor" 754. Note that the Pump 3 red device status indicator has an informational comment 752 in the operation column of the display of FIG. 22, stating "Intermittent Loss of Signal." The Hookload Sensor red device status indicator present an adjacent Magnifying Glass icon 758 with a message indicating that more information is available for the device status of the Hookload sensor by clicking on the Magnifying Glass icon. Clicking on the Magnifying Glass indicator 758 for the Hookload sensor brings up the Hookload sensor panel 766 of FIG. 23, which shows that the device name "Barrier" 760 had a red device status indicator 762. The red device status for the Barrier displays an Operation message 764, stating, "Excessive ground current". Each colored indicator and accompanying operation message shown in the preferred displays illustrated in FIGS. 18-23 appeared in line of the Health Check performed at an oil rig and sent to the server in the structured protocol of the present invention.

Figure 26:
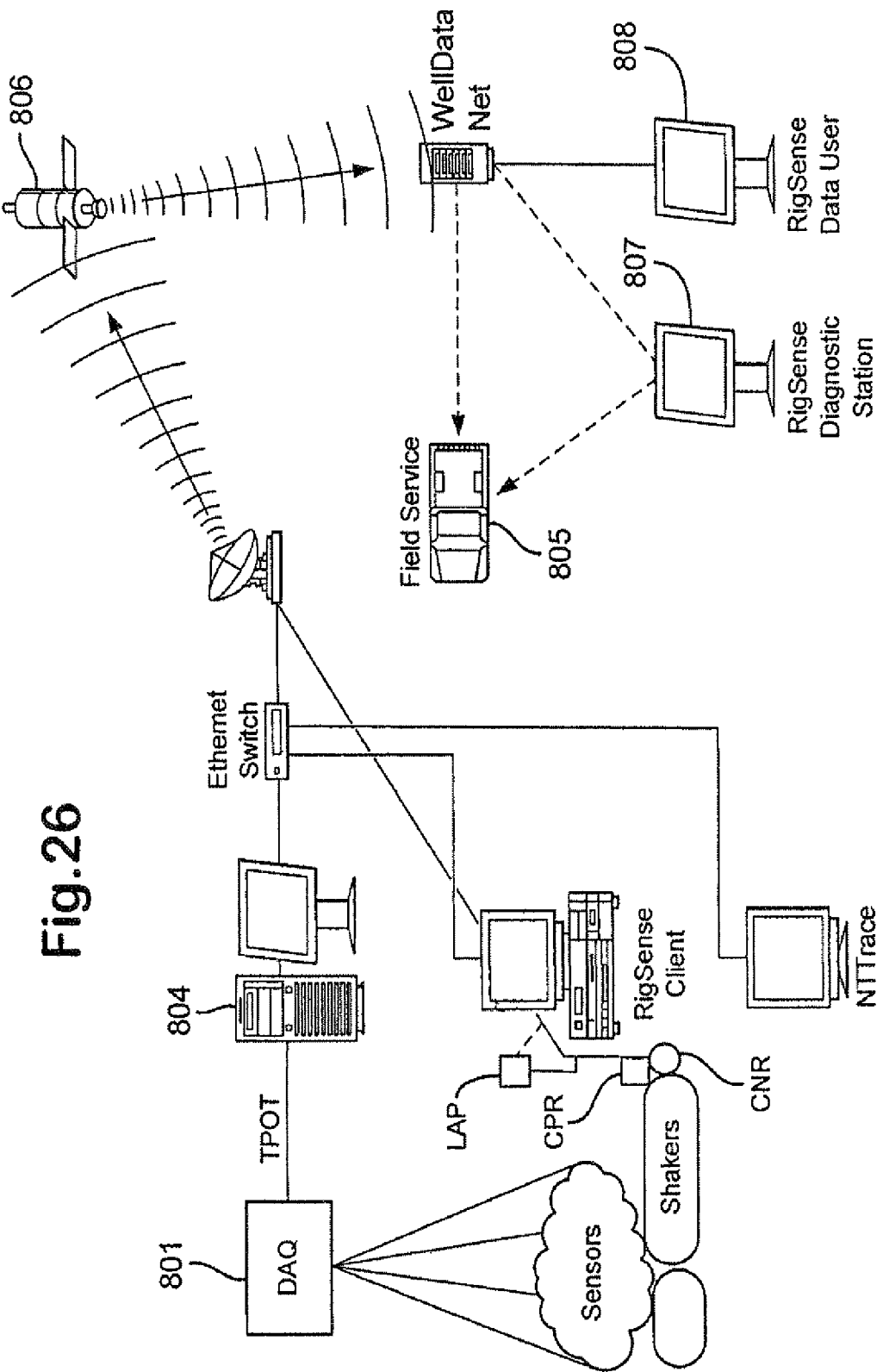
FIG. 26 is an illustration of a preferred health check system reporting health checks from an oil rig to a user via satellite.

FIG. 24 illustrates a Driller Adjustable parameters display 710 with two red indicators showing that Drill Low Set Point 712 and Upper Set Point 714 are Outside Range. A Drilling Tuning parameters panel 716 is also displayed. Both panels indicate the current value, changed indicator and outside range indicator for each parameter displayed in the respective panels of FIG. 24. The display of FIG. 24 is an alternative tabular display for rig status for a single rig. FIG. 25 illustrates a configuration or driller adjustable parameters status panel 810 for rig numbers 178-189. The display of FIG. 25 is an alternative tabular display for rig status for plurality of rigs, e.g., rigs 178-189. Turning now to FIG. 26, a data acquisition system 801 is shown in an oil rig environment connected to a plurality of legacy or Heath Check sensors ("SENSORS") which, in certain aspects, include sensors on a shaker or shakers, which gathers data from the group of sensors monitoring the rig equipment, parameters and processes. The data acquisition system 801 sends the acquired data from the sensors to a computer 804 on which the preferred Health Check application of the present invention is running. The application of the present invention performs Health Checks logic on the acquired data and reports the results in the structured protocol to a user via satellite 806 or some other form of electronic communication. A user may monitor health check status and receive notifications via an electronic receiver 808, diagnostic station 807 or mobile in field service vehicle 805. Alternatively the shaker(s) may have a direct connection from a shaker computer CPR to the data transmission system.

The present invention is also useful for Process Monitoring, that is, to determine that equipment is being used properly to perform a designated process. For example, if rig operators are using an "override" during a certain system state indicative of a certain process, which is supposed to be run automatically rather than manually overridden, the present invention can perform a health check to detect this event of interest and report it to the central server. Knowledge of this occurrence enables central server personnel to detect and correct the inappropriate action of the operators. Moreover, the test to detect the inappropriate override stays in the system so that if new operators recreate the problem or trained operators backslide into using the manual override inappropriately, the central server personnel will be notified so that the problem can be address again. Thus, the Health Check system builds a cumulative base of operational checks to insure that a process on a rig or oil recovery system runs in optimal fashion.

Figure 27:
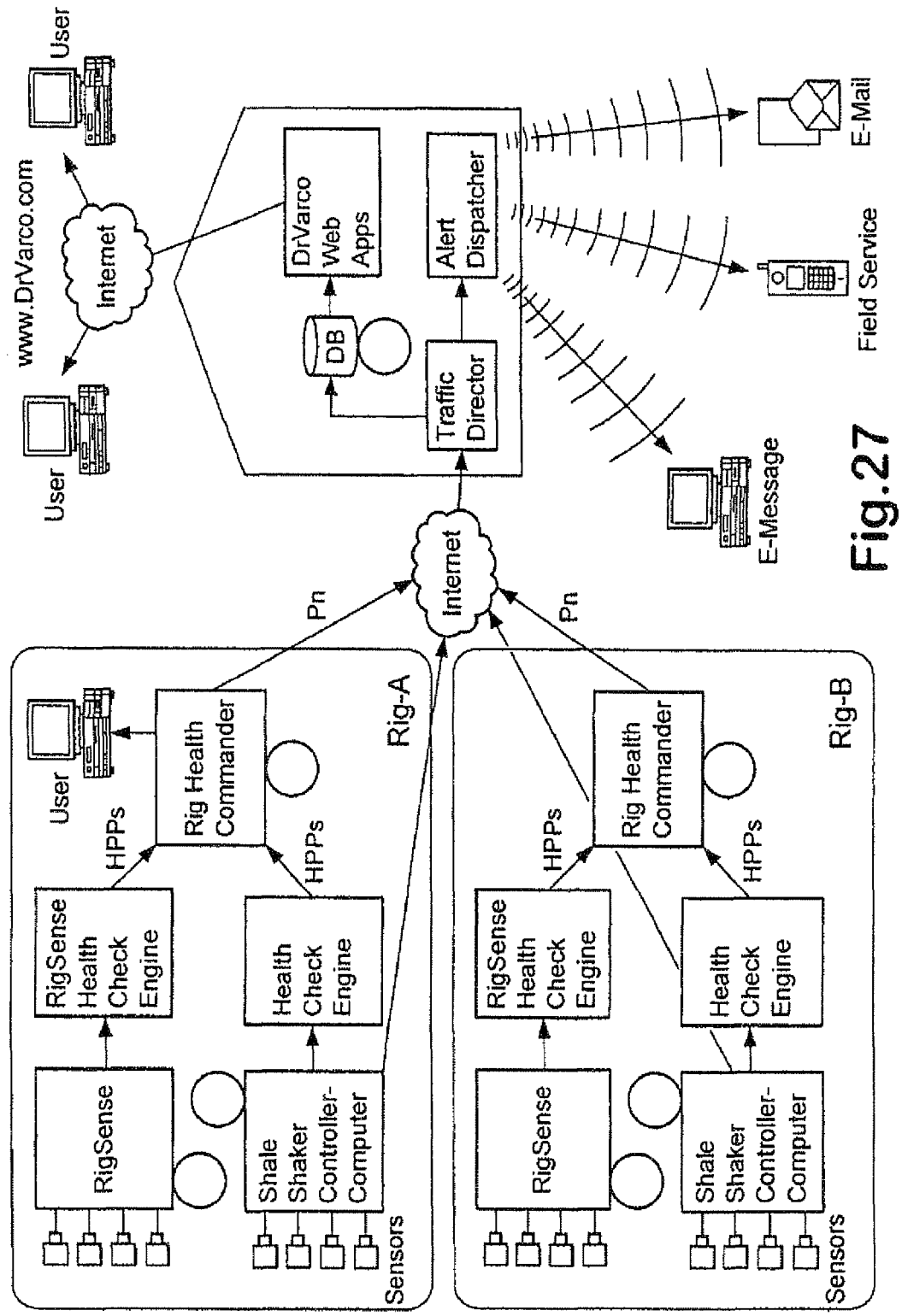
FIG. 27 is an illustration of a preferred health check system reporting health checks of multiple equipments, processes or systems from multiple oil rigs to a multiple users.

Turning now to FIG. 27, FIG. 27 is an illustration of a preferred Health Check system reporting health checks of multiple equipments, processes or systems from multiple oil rigs to multiple users. It is to be understood that any equipment's, device's, or apparatus's controller or associated computer may be employed for the system as shown in FIG. 27, but the specific item shown schematically is a controller and/or computer for a shaker. As shown in one aspect the shaker controller and/or computer is in communication with a Rig Health Commander, a Health Check Engine, and a user. Optionally, the shaker controller and/or computer can be in direct communication via the Internet or a similar network with another entity, device, and/or user.

Figure 28:
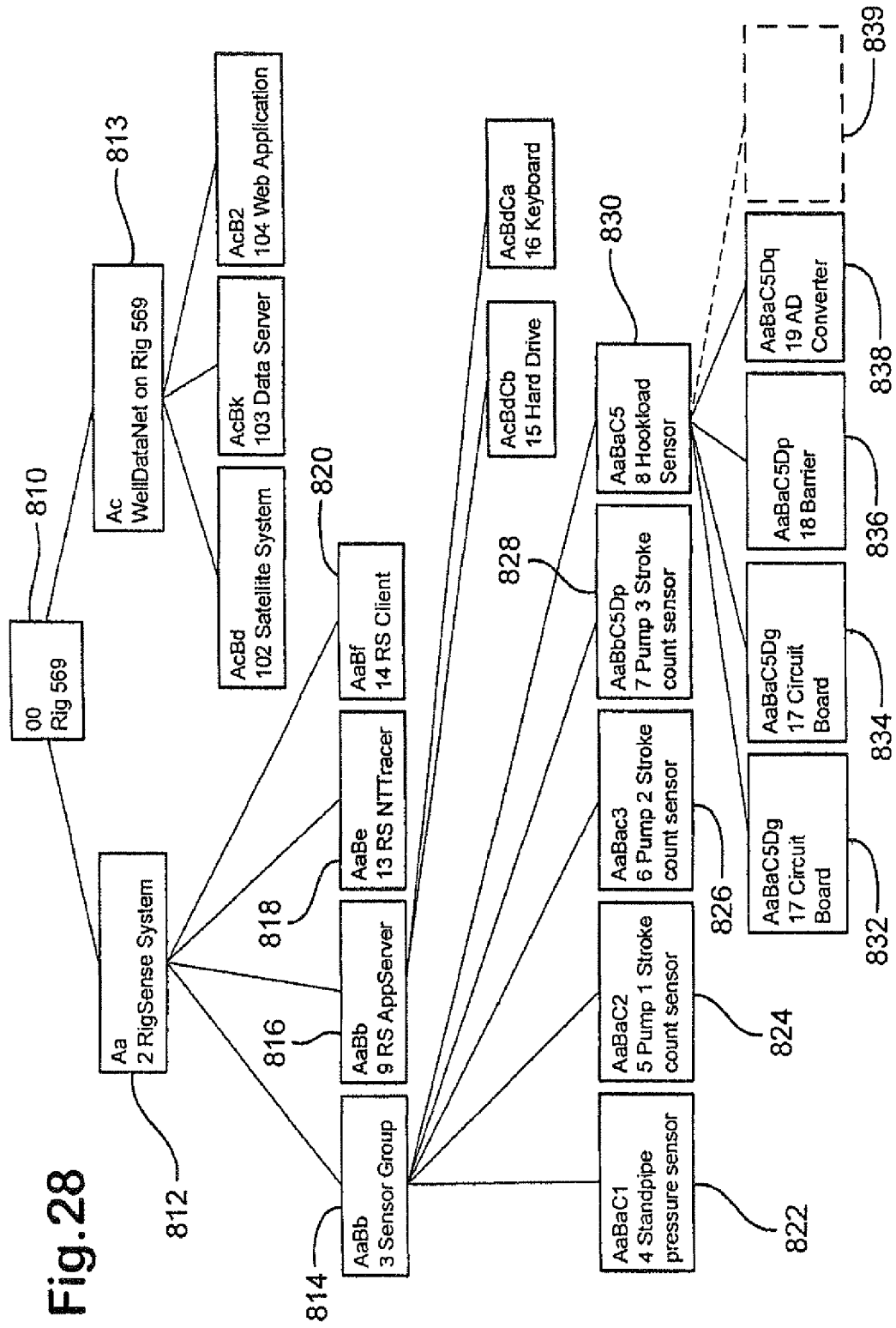
FIG. 28 is an illustration of a preferred protocol which defines an event reporting data structure for data base population and display.

Turning now to FIG. 28, the results of the tests are reported to the central server in a special protocol that contains heath check results data and describes the manner in which the data is constructed so that the data can be placed in a logical data structure or tree format and displayed. Note that the root node 810, usually an oil rig has a designation of "00". The first level of nodes 812, 813 etc. under the root node are named Aa, Ab, Ac, Ad, etc. Each subsequent layer of node is named with the name of the parent node followed by a designation of the current node. For example, as shown in FIG. 28, for a rig number 569, the root node 810 is named "00", the first level of children nodes under the root node are named Aa 812 and Ac 813. The children of node Aa 812 are named AaBa 814, AaBd 1116, AaBe 818 and AaBf 820 as shown. The children of child node AaBa are named AaBaC1 822, AaBaC2 824, AaBaC3 826 and AaBaC4 828. The children of node AaBaC5 830 are named AaBaC5Dg 832, AaBaC5Dp 834, AaBaC5Dq 836 and AaBaC5Ds 838. A new test could be added to rig 569 number and the Heath Check status could be reported under node AaBaC5Dx 840.

Changes to the Health Checks running on any or all rigs does not require changes to the display or data base population application because the preferred communication protocol defines the data base layout and display layout. The leaf nodes of the tree structure represent Health Check results. Each node contains a test identifier, test result (red/yellow/green/gray), intermediate data, user-entered data and test description. Trouble shooting comments are provided at the central server based on reported errors. Test error codes are included in the node so that messages associated with the error codes are displayed to the appropriate user. Alternately, trouble shooting and other information can also be generated and appended to the results of the tests at rig site. Thus, no processing to determine rig status is done at the central server. Notifications are sent when deemed necessary by the application. Notification logic is configurable by service personnel at the central server or at the oil rig. Notification logic dictates that notifications are sent when an event occurs and the event has been selected for reporting as a notification to a user. The notification logic and a list of appropriate notification recipients in order of priority, that is, who to contact first, is retained at the central server. The event can be a report on an equipment status, process execution or an operational item. A user can check in with the central server of present invention to obtain a real time report of the status of an oil rig or multiple oil rigs. The requesting user will receive a severity report message indicating the status of the rig, for example, "okay" or "red/yellow/green/gray."

FIGS. 29-32B illustrate computer screen displays for one embodiment of a control system for shakers and methods of their use according to the present invention.

Figure 29:
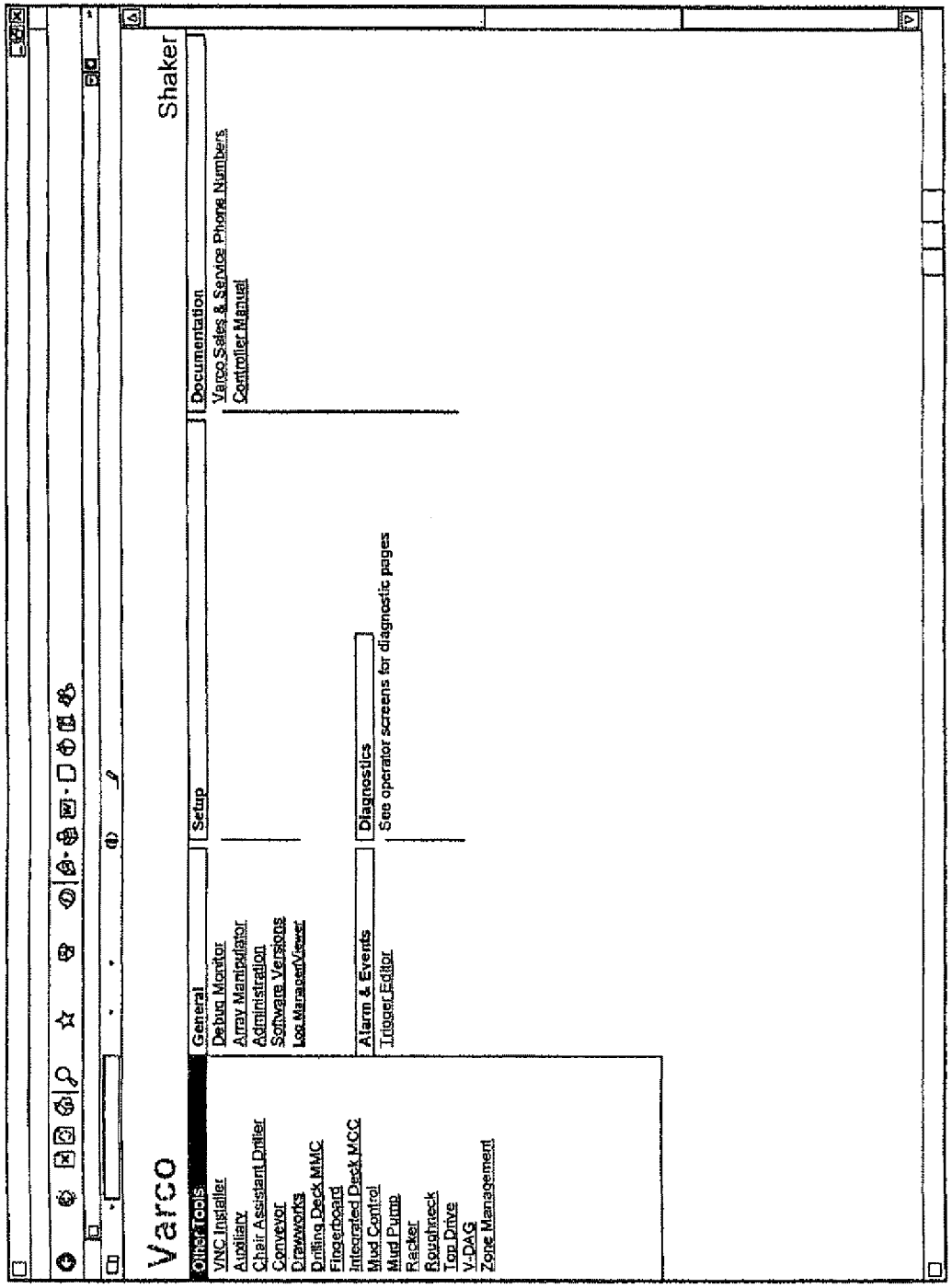
FIG. 29 is a screen display for a system according to the present invention.

FIG. 29 shows a display screen provided by a server, e.g. a web server on a computer on a shaker (e.g. like the computers 530, 630 and the shale shaker computer controller in FIG. 27). When this computer is connected to and in communication with a rig control system, interfaces with the rig control system are identified as "Alarms & Events," "Diagnostics," and "Documentation." From the "General" column, an operator can go to any of the five listed choices. Choosing "Debug Monitor" leads to a display screen as in FIGS. 32A and 32B that allows a user to monitor and modify shaker program variables. Choosing "Administration" leads to a display screen as in FIG. 30. "Array Manipulator" leads to a screen that shows the array of input/output channels. "Software versions" leads to a screen that displays the current software version. "Log Manager/Viewer" leads to a screen that allows the user to view and delete system log files.

Figure 30:
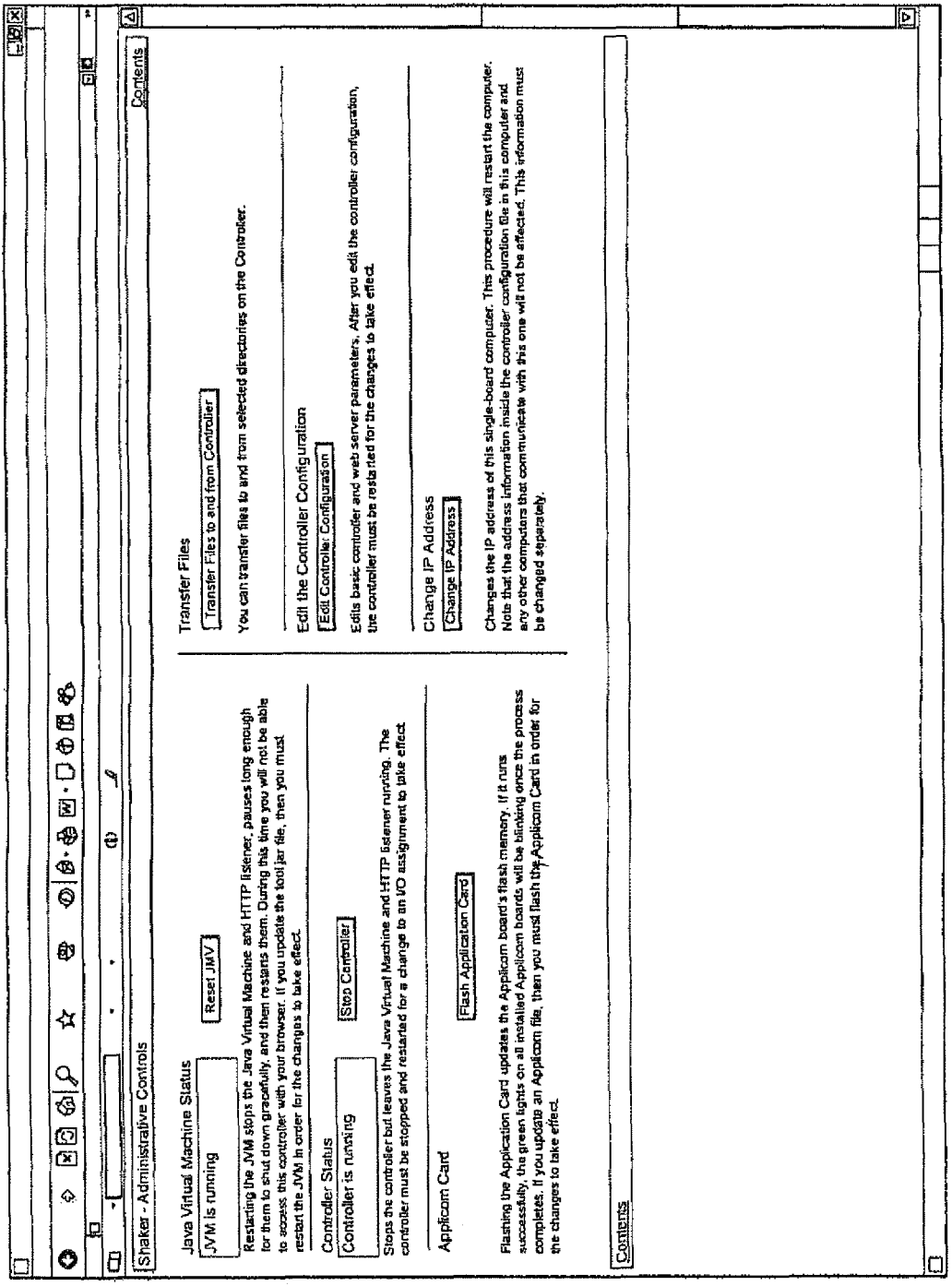
FIG. 30 is a screen display for a system according to the present invention.
Figure 31:
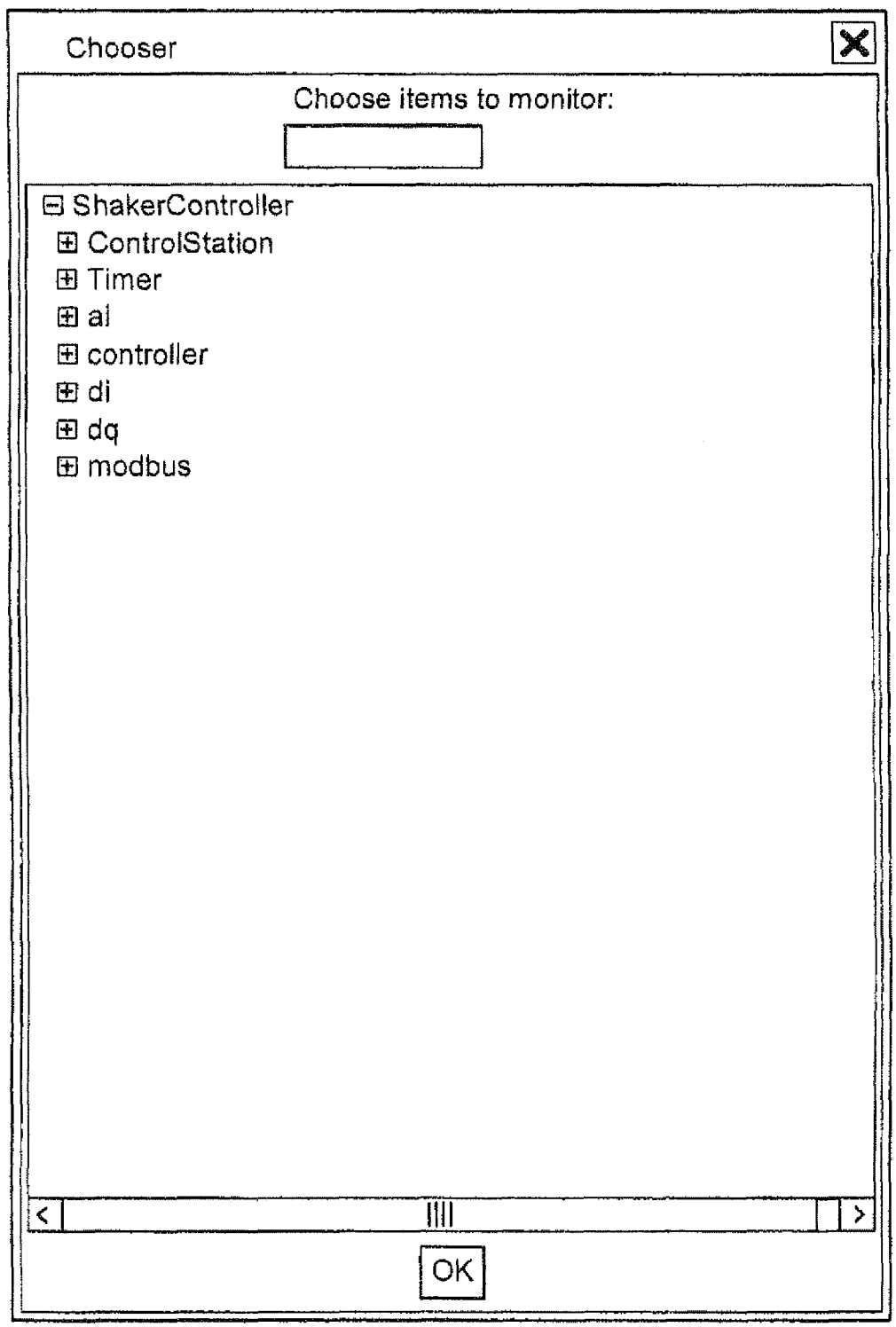
FIG. 31 is a screen display for a system according to the present invention.

The display screen of FIG. 30 [displayed by clicking on the "Debug Monitor" line, FIG. 29 illustrates a variety of administrative checks and tasks that can be done related to the shaker computer. "Restart JVM" is chosen to restart the computer software operating system on the shaker computer. The shaker control program is stopped by choosing "Stop Controller." This screen lets a user choose which parameters and variable are viewed (e.g. in screens like screens in FIGS. 32A and 32B). The general state of the shaker is displayed by choosing "ControlStation." Choosing "Timer" displays timer variables and states. The "ai" screen displays analog input variables and states, e.g. from the ultrasonic transducers, the measured distance to fluid on the screens. Controller variables and states are displayed by choosing "controller." Digital input variables and states [e.g. signals from a shaker's variable frequency drive] and those effected using user push buttons and switches (e.g. as in FIG. 14) are displayed by choosing "di." Digital output variables, e.g. valve opening and closing signals and signals to a VFD to run fast or fun normal, are displayed by choosing "dq." Parameters and variables of the protocol used to send and receive information is displayed by choosing "modbus."

Figure 32A:
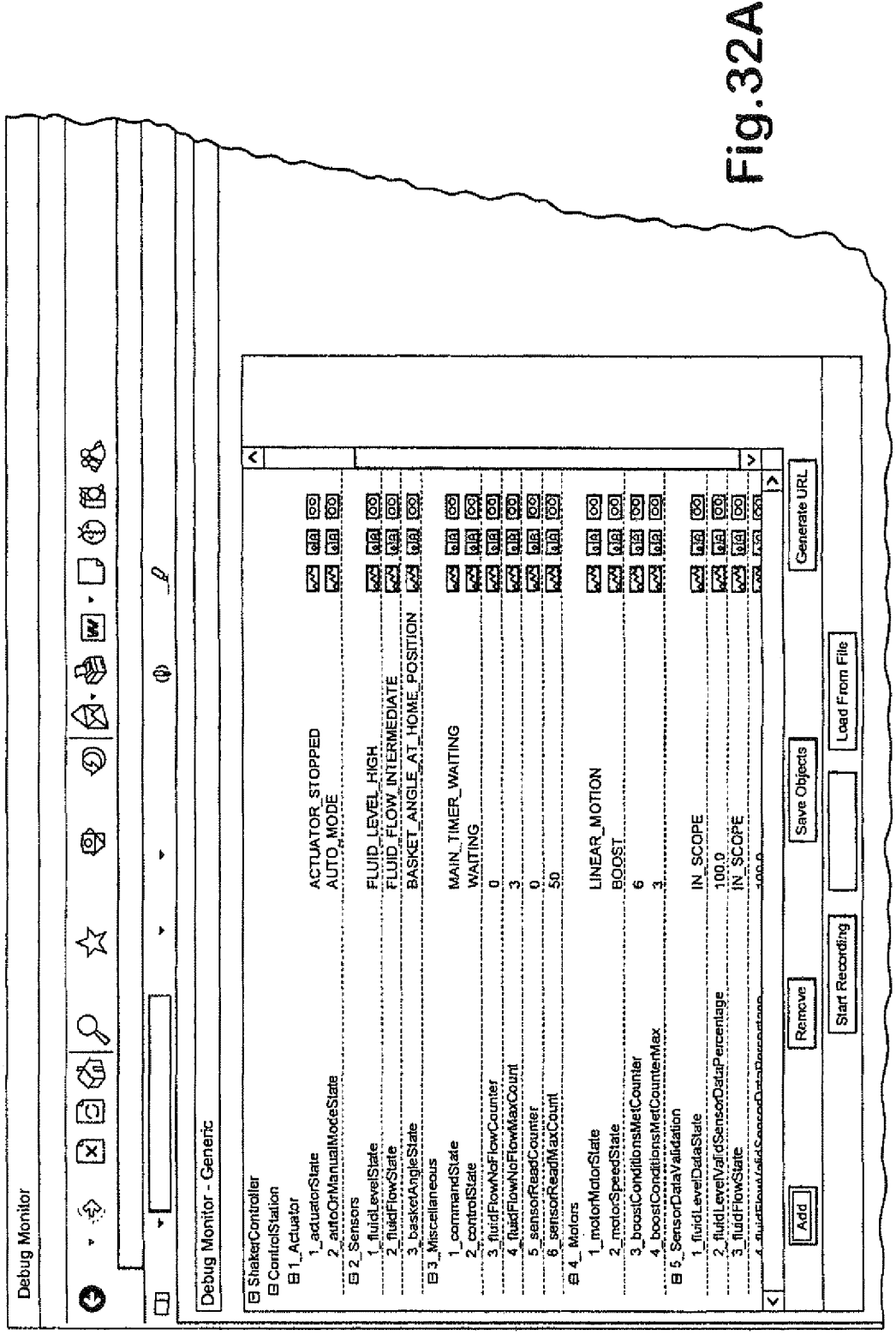
FIG. 32A is a screen display for a system according to the present invention.

In FIG. 32A the entries indicate the following:

| Entry | Indication |
|---|---|
| actuatorState | state of actuator (e.g. 636, FIG. 14) - moving up, moving down, stopped |
| autoOrManualModeState | auto control or user control of basket angle |
| fluidLevelState | pool depth on screen relative to desired position - high, low, desired |
| fluidFlowState | relative fluid flow rate onto shaker screens |
| basketAngleState | basket angle - home position, intermediate, high |
| commandState | command output sent to actuator system - main timer waiting, null, actuator moving up, actuator moving down |
| controlState | state of sensor reading timer cycle - waiting, reading |
| fluidFlowNoFlowCounter | number of consecutive times fluid flow sensor has measured a no-flow |
| fluidFlowNoFlowMaxCount | preset number of consecutive times flow sensor must measure no-flow before basket angle is moved to fully uphill position to prepare for next fluid rush |
| sensorReadCounter | current number of times sensors have been read |
| sensorReadCounterMaxCount | number of sensor readings to take, filter, and return a signal value |
| motorMotionState | current shaker motion - linear, elliptical, circular |
| motorSpeedState | speed of shaker motors - normal, boost |
| boostConditionsMetCounter | number of consecutive times boost conditions have been met |
| boostConditionsMetCounterMax | number of consecutive times boost conditions must be met before motor speed is automatically boosted |
| fluidLevelDataState | indication whether sensor reading are within expected range - in scope, out of scope |
| fluidLevelValidSensorDataPercentage | indicates % of sensor reading within expected range |
| fluidFlowDataState | whether sensor readings are within expected range - in scope, out of scope |
| fluidFlowValidSensorDataPercentage | indicates s$ of sensor reading within expected range |

Figure 32B:
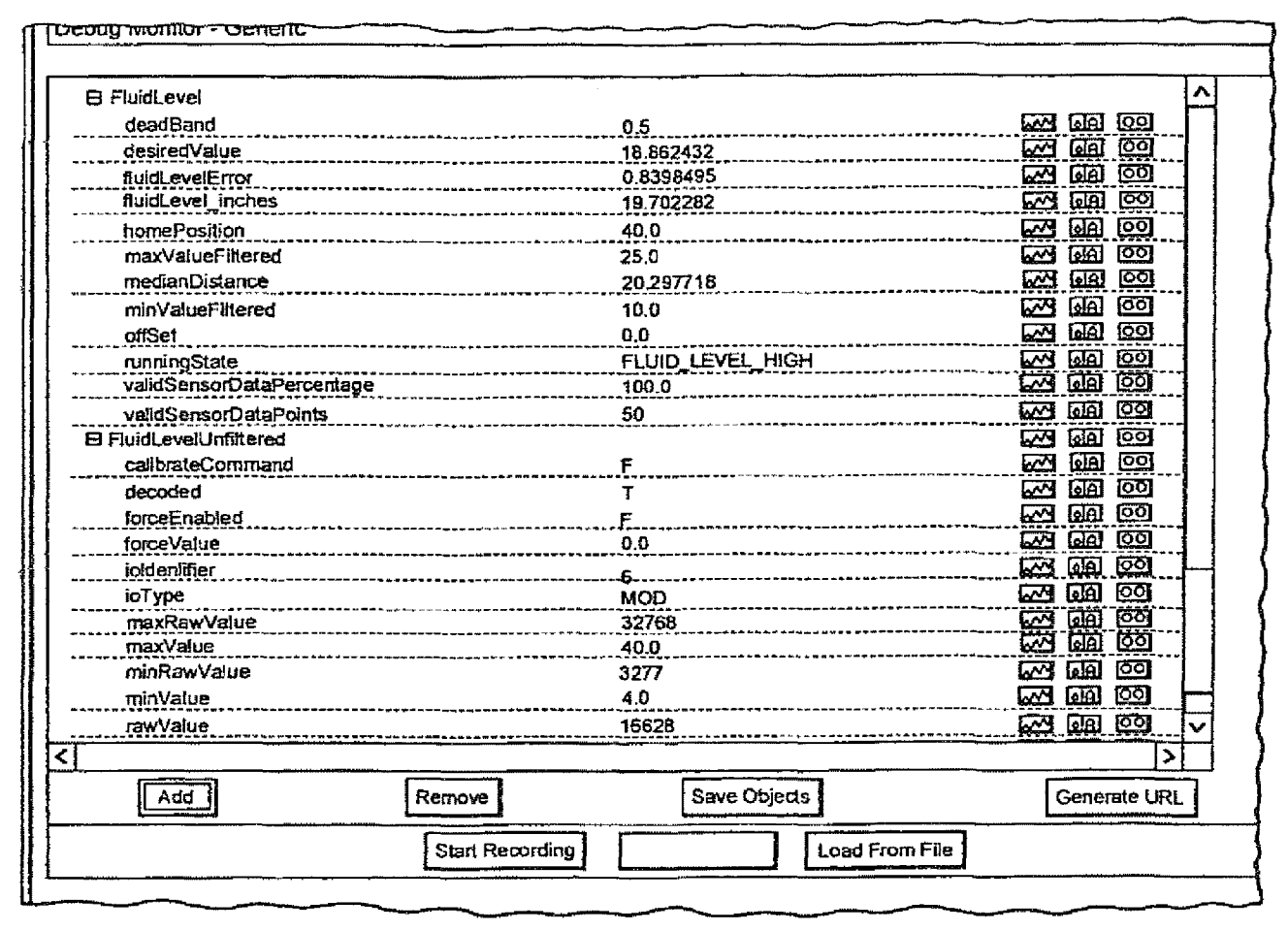

In FIG. 32B, the entries indicate the following for each of three different sensors (ultrasonic transducer apparatuses):

| Entry | Indication |
|---|---|
| deadband | distance above or below desired value that will not cause the actuator to move |
| desiredValue | desired fluid level |
| fluidLevelError | difference between desiredValue and fluidLevel_inches |
| fluidLevelInches | distance that represent fluid level |
| homePosition | distance to the bottom of the screen at the lowest basket angle |
| maxValueFiltered | maximum allowable filtered fluid level (medianDistance) |
| medianDistance | filtered fluid level |
| minValueFiltered | minimum allowable filtered fluid level (medianDistance) |
| offset | distance above the homePosition that represents a high flow |
| runningState | pool depth on the shaker screen relative to the desired position - high, low, at desired |
| validSensorDataPercentage | the % of sensor readings within the expected range |
| validSensorDataPoints | actual number of valid sensor readings |
| calibrateCommand | has the calibrate button been pushed |
| decoded | is the input used |
| forceEnabled | is the input value controlled by the Debug Monitor |
| forceValue | value to force the input to if forceEnabled is true |
| ioIdentifier | Modbus address of the input |
| ioType | (MOD) Modbus protocol |
| maxRawValue | maximum value that can be returned from the input |
| maxValue | measurement scale value corresponding to the maxRawValue for this input |
| minRawValue | minimum value that can be returned from the input |
| minValue | measurement scale value corresponding to the minRawValue for this input |
| rawValue | raw integer value returned from the input |

The present invention, therefore, in at least some, but not necessarily all embodiments, provides a vibratory separator including: a base; a basket movably mounted on the base and for supporting screen apparatus for treating material introduced into the vibratory separator, the basket on the base and pivotable with respect thereto; screen apparatus supported by the basket, the material flowing onto the screen apparatus for treatment; vibratory motor apparatus connected to the basket for vibrating the basket and the screen apparatus; variable frequency drive apparatus for selectively driving the vibratory motor apparatus at a selected speed; angle adjustment apparatus connected to the basket for adjusting angle of the basket; sensor apparatus connected to the vibratory separator for sensing a parameter indicative of operation of the vibratory separator for providing a signal corresponding to said parameter; and control apparatus for receiving signals from the sensor apparatus, for controlling the vibratory separator based on said signals, and for automatically signalling the variable frequency drive apparatus to change the speed of the vibratory motor apparatus so that force applied to the basket is changed. Such a vibratory separator may have one or some (in any possible combination) of the following: wherein the basket is tilted at a largest possible uphill angle; wherein the control apparatus includes timing apparatus that indicates the basket has been maintained at the largest possible uphill angle for a pre-set time period and actuation apparatus for actuating the variable frequency drive apparatus to increase the speed of the vibratory motor apparatus upon said pre-set time being achieved; wherein said actuating is done for a pre-set period of time or until a pre-set flow of material to the material introduction end is sensed by the sensor apparatus; wherein the vibratory separator is a shale shaker and the material is drilling fluid with drilled cuttings therein; wherein the vibratory apparatus comprises two motors for vibrating the basket, the two motors providing dual motion capability; wherein the sensor apparatus comprises a plurality of sensor apparatuses; wherein the measurement sensor apparatus is from the group consisting of electrical, optical, electromagnetic, ultrasonic, acoustic, and pulse-echo apparatus; flow sensor apparatus connected to the vibratory separator for sensing the flow of material onto the screen apparatus, the flow sensor apparatus controlled by and in communication with the control apparatus, and the control apparatus for adjusting shaker operation in response to signals from the flow sensor apparatus; the vibratory motor apparatus connectable to the basket at a plurality of locations so that a motion profile of the basket is selectively variable between linear, elliptical, and circular motion; wherein the motion profile of the basket includes a first shape at a material introduction end of the basket and a second shape at a material exit end of the basket; wherein the basket has a middle area between the material introduction end and the fluid exit end and the motion profile of the basket includes a thin ellipse shape at the material introduction end, a medium ellipse shape at the middle area, and a fatter ellipse shape at the material exit end; the vibratory motor apparatus including bearing apparatus for enhancing operation of the vibratory motor apparatus, the sensor apparatus including temperature sensor apparatus for sensing temperature of the bearing apparatus during operation, and the control apparatus for providing a notification to an operator of the vibratory separator that the bearing apparatus is to be greased; the control apparatus for monitoring total operational time of the vibratory separator and for providing a notification of said total operational time; the control apparatus including web interface apparatus for an interface between on-site personnel at a location of the vibratory separator and an entity remote therefrom; the vibratory separator on a drilling rig, the control apparatus for monitoring and analyzing a plurality of signals from the sensor apparatus and for transmitting signals indicative of information related to operation of the vibratory separator to a processor on the drilling rig, the processor including a set of health check rules for health checks comprising logical rules, inputs and outputs for defining events associated with the status of the vibratory separator, the processor for determining a severity code for each event and for reporting the events and severity codes to a central server, the events reported by the processor to the central server in a protocol defining a data structure, the data structure comprising a hierarchical tree node structure wherein results from application of the health check rules are a bottommost node of the tree node structure, and displaying the event severity codes on a display; the processor for providing to the central server the results as records containing node information regarding an appropriate location for the results in the tree node structure; and/or the control apparatus running the health checks in real time to provide results regarding on-going status of the vibratory separator to indicate a potential failure of the vibratory separator.

The present invention, therefore, in at least some, but not necessarily all embodiments, provides a vibratory separator including: a base; a basket movably mounted on the base and for supporting screen apparatus for treating material introduced into the vibratory separator, the basket on the base and pivotable with respect thereto; screen apparatus supported by the basket, the material flowing onto the screen apparatus for treatment; vibratory motor apparatus connected to the basket for vibrating the basket and the screen apparatus; sensor apparatus connected to the vibratory separator for sensing a parameter indicative of operation of the vibratory separator for providing a signal corresponding to said parameter; control apparatus for receiving signals from the sensor apparatus, for controlling the vibratory separator based on said signals; wherein the vibratory separator is a shale shaker and the material is drilling fluid with drilled cuttings therein; wherein the sensor apparatus comprises a plurality of sensor apparatuses; and the vibratory motor apparatus connectable to the basket at a plurality of locations so that a motion profile of the basket is selectively variable between linear, elliptical, and circular motion.

The present invention, therefore, in at least some, but not necessarily all embodiments, provides a method for treating material introduced to a vibratory separator, the method including introducing material to a vibratory separator according to the present invention, treating the material in the vibratory separator, and adjusting the angle of the basket, its motion profile, and/or its motor speed.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications identified herein are incorporated fully herein for all purposes. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

Whereas the present invention has been described in particular relation to the drawings attached hereto, it should be understood that other and further modifications apart from those shown or suggested herein, may be made within the scope and spirit of the present invention.

What is claimed is:

1. A method, comprising:
    introducing a material to be separated to a screen apparatus of a basket assembly operatively coupled to a vibratory separator and adapted to be vibrated so as to facilitate separation of said material to be separated;
    sensing a state of said material introduced to said screen apparatus by using at least one sensor apparatus operatively coupled to said vibratory separator;
    automatically adjusting said vibratory separator to vibrate said basket assembly at a first vibratory separator setting when said sensed state of said material is at a first sensed state, wherein vibrating said basket assembly at said first setting comprises automatically adjusting an acceleration of said basket assembly to a first preselected acceleration level based on said first sensed state; and
    automatically adjusting said vibratory separator to vibrate said basket assembly at a second vibratory separator setting different than said first vibratory separator setting when said sensed state of said material is at a second sensed state different than said first sensed state, wherein vibrating said basket assembly at said second vibratory separator setting comprises automatically adjusting said acceleration of said basket assembly to a second preselected acceleration level different than said first preselected acceleration based on said second sensed state.

2. The method of claim 1, wherein automatically adjusting said vibratory separator to vibrate said basket assembly at either of said first and second vibratory separator settings comprises sending a signal representing said sensed state of said material from said at least one sensor apparatus to a control apparatus.

3. The method of claim 2, further comprising controlling an excitation force used to accelerate said basket assembly by using said control apparatus to control an operation of a motor apparatus adapted to apply said excitation force to said basket assembly, based on said signal.

4. The method of claim 3, wherein controlling an operation of said motor apparatus comprises controlling a speed of a variable frequency drive operatively coupled thereto.

5. The method of claim 1, further comprising substantially maintaining said acceleration of said basket assembly at said first preselected acceleration level until said sensed state of said material is at said second sensed state.

6. The method of claim 5, wherein substantially maintaining said acceleration of said basket assembly comprises:
continuously sensing an actual acceleration of said basket assembly with an accelerometer operatively coupled thereto; and
continuously automatically adjusting an excitation force applied to said basket assembly based on said continuously sensed actual acceleration.

7. The method of claim 1, wherein sensing said state of said material introduced to said screen apparatus comprises sensing at least one of a flow rate of said material onto said screen apparatus and a level of said material above said screen apparatus.

8. The method of claim 1, wherein sensing said state of said material introduced to said screen apparatus comprises sensing at least one of a viscosity of said material, a specific gravity of said material, a solids content of said material, and a stickiness of solids present in said material.

9. The method of claim 1, wherein automatically adjusting said vibratory separator to vibrate said basket assembly at said second vibratory separator setting comprises continuously varying an acceleration of said basket assembly between said first preselected acceleration level and said second preselected acceleration level in response to a change in said sensed state of said material.

10. The method of claim 1, wherein vibrating said basket assembly at either of said first and second vibratory separator settings further comprises automatically adjusting at least one of a motion profile, a basket angle, and a vibration frequency of said basket assembly.

11. The method of claim 10, wherein adjusting said motion profile of said basket assembly comprises adjusting said basket assembly to vibrate using at least one of a linear, a circular, and an elliptical motion.

12. The method of claim 11, wherein adjusting said motion profile of said basket assembly further comprises adjusting a feed end of said basket assembly to vibrate using at least one of said linear, circular, and elliptical motions and adjusting said discharge end of said basket assembly to vibrate using a different one of said linear, circular, and elliptical motions.

13. The method of claim 1, further comprising automatically adjusting said vibratory separator to vibrate said basket assembly at a third vibratory separator setting different than said first and second settings when said sensed state of said material is at a third sensed state different than said first and second sensed states, wherein vibrating said basket assembly at said third vibratory separator setting comprises adjusting an acceleration of said basket assembly to a third preselected acceleration level different than said first and second preselected acceleration levels based on said third sensed state.

14. The method of claim 1, further comprising automatically adjusting said vibratory separator to vibrate said basket assembly at a third vibratory separator setting different than said first and second settings when at least one of a flow rate of said material onto said screen apparatus or a level of said material on said screen apparatus exceeds a predetermined magnitude, wherein vibrating said basket assembly at said third vibratory separator setting comprises boosting said acceleration of said basket assembly to a preselected boost acceleration level greater than said first and second preselected acceleration levels.

15. A method, comprising:
introducing a material to be separated to a screen apparatus of a shale shaker basket assembly, wherein said material to be separated comprises a mixture of drilling fluid and solids and said basket assembly is adapted to be vibrated so as to separate said drilling fluid from said solids;
sensing a state of said material introduced to said screen apparatus by using at least one sensor apparatus operatively coupled to said shale shaker;
operating said shale shaker at a first shale shaker setting to separate said drilling fluid from said solids, wherein operating said shale shake at said first shale shaker setting comprises vibrating said basket assembly at a first acceleration level and automatically adjusting an excitation force applied to said basket assembly to maintain said first acceleration level based on said sensed state of said material;
automatically adjusting said operation of said shale shaker to a second shale shaker setting different than said first shale shaker setting when said sensed state of said material exceeds a predetermined state, wherein automatically adjusting said operation of said shale shaker to said second shale shaker setting comprises automatically increasing said acceleration of said basket assembly to a predetermined second acceleration level greater than said first acceleration level.

16. The method of claim 15, further comprising:
after increasing said acceleration of said basket assembly to said predetermined second acceleration level, automatically adjusting an excitation force applied to said basket assembly to maintain said predetermined second acceleration level; and
automatically reducing said acceleration of said basket assembly from said predetermined second acceleration level to a third acceleration level when said sensed state of said material no longer exceeds said predetermined state, wherein said third acceleration level is based on said sensed state of said material.

17. The method of claim 15, wherein sensing said state of said material introduced to said screen apparatus comprises sensing at least one of a flow rate of said material onto said screen apparatus and a level of said drilling fluid above said screen apparatus, and wherein said predetermined state comprises at least one of a predetermined flow rate onto said screen apparatus and a predetermined level of said drilling fluid above said screen apparatus.

18. The method of claim 15, wherein automatically adjusting an excitation force applied to said basket assembly comprises:
continuously sensing an actual acceleration of said basket assembly with an accelerometer operatively coupled thereto;
continuously sending a signal representing said sensed actual acceleration from said accelerometer to a control apparatus; and
using said control apparatus to control an operation of a motor apparatus adapted to apply said excitation force to said basket assembly by controlling a speed of a variable frequency drive operatively coupled to said motor apparatus.

19. The method of claim 15, wherein operating said shale shaker at either of said first and second shale shaker settings comprises automatically adjusting at least one of a motion profile, a basket angle, and a vibration frequency of said basket assembly.

20. The method of claim 15, further comprising:
- monitoring at least one operating parameter of said shale shaker during said operation thereof;
- recording data reflecting said at least one monitored operating parameter;
- evaluating said recorded data of said at least one monitored operating parameter; and
- establishing at least one maintenance requirement for said shale shaker based on said evaluation of said recorded data of said at least one monitored operating parameter.

* * * * *